US010682750B2

(12) United States Patent
Zhong et al.

(10) Patent No.: US 10,682,750 B2
(45) Date of Patent: Jun. 16, 2020

(54) HAND-HELD POWER TOOL AND OPERATING METHOD THEREOF

(71) Applicant: Positec Power Tools (Suzhou) Co., Ltd., Suzhou (CN)

(72) Inventors: Hongfeng Zhong, Jiangsu Province (CN); Mingjian Xie, Jiangsu Province (CN); Shisong Zhang, Jiangsu Province (CN); Xiaoli Pang, Jiangsu Province (CN); Jian Wu, Jiangsu Province (CN); Jinping Zhang, Jiangsu Province (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 208 days.

(21) Appl. No.: 15/547,119

(22) PCT Filed: Jan. 29, 2016

(86) PCT No.: PCT/CN2016/072835
§ 371 (c)(1),
(2) Date: Feb. 20, 2018

(87) PCT Pub. No.: WO2016/119748
PCT Pub. Date: Aug. 4, 2016

(65) Prior Publication Data
US 2019/0009398 A1    Jan. 10, 2019

(30) Foreign Application Priority Data

Jan. 29, 2015  (CN) .......................... 2015 1 0044644

(51) Int. Cl.
*B25F 3/00* (2006.01)
*B23B 45/02* (2006.01)
(Continued)

(52) U.S. Cl.
CPC .............. *B25F 3/00* (2013.01); *B23B 45/02* (2013.01); *B25B 21/00* (2013.01); *B25F 5/02* (2013.01)

(58) Field of Classification Search
CPC .................................................... B23B 39/205
See application file for complete search history.

(56) References Cited

U.S. PATENT DOCUMENTS 3,432,152 A * 3/1969 Sweeney ................ F02M 69/22
                                                         261/34.2
5,054,563 A * 10/1991 Zapf ....................... B25B 21/00
                                                         173/217
(Continued)

FOREIGN PATENT DOCUMENTS

CN        1942276 A       4/2007
CN      201086279 Y       7/2008
(Continued)

OTHER PUBLICATIONS

International Search Report for International Application No. PCT/CN2016/072835, dated May 6, 2016.
(Continued)

*Primary Examiner* — Andrew M Tecco
*Assistant Examiner* — Eyamindae C Jallow
(74) *Attorney, Agent, or Firm* — Marshall, Gerstein & Borun LLP

(57) ABSTRACT

The present invention provides a handheld power tool and an operation method thereof. The handheld power tool comprises a housing, a handle, a switch, a motor, an output shaft and a working component; the working component comprises at least two working chucks; the at least two working chucks respectively comprise a working shaft, the handheld power tool further comprises a control mechanism locking the working component relative to the position of the housing, the control mechanism comprises a control part
(Continued)

adjacent to the switch and movably disposed relative to the housing, and the control part operably removes the position locking of the working component and controls the output shaft to be dis-matched and disconnected with one of the working shafts; and the position conversion of the working chucks can be finished by means of other body parts of an operator through one hand, and the operation is convenient and reliable.

18 Claims, 43 Drawing Sheets

(51) Int. Cl.
  *B25B 21/00* (2006.01)
  *B25F 5/02* (2006.01)

(56) References Cited

U.S. PATENT DOCUMENTS

| | | | | |
|---|---|---|---|---|
| 5,083,620 | A * | 1/1992 | Fushiya | B25F 5/02 173/217 |
| 5,140,754 | A * | 8/1992 | Martenson | B27G 19/04 30/390 |
| 6,506,002 | B1 | 1/2003 | Cummins | |
| 7,367,757 | B2 * | 5/2008 | Phillips | B23B 45/003 173/214 |
| 7,997,835 | B2 * | 8/2011 | Whitehead | B23B 39/205 408/16 |
| 2003/0165365 | A1 * | 9/2003 | Eriksen | B23B 45/003 408/35 |
| 2006/0147283 | A1 * | 7/2006 | Phillips | B23B 45/003 408/35 |
| 2009/0022557 | A1 * | 1/2009 | Whitehead | B23B 39/205 408/35 |
| 2009/0114410 | A1 * | 5/2009 | Van Der Linde | B23B 31/001 173/20 |
| 2011/0000688 | A1 * | 1/2011 | Iwata | B25B 21/00 173/1 |

FOREIGN PATENT DOCUMENTS

| | | |
|---|---|---|
| CN | 101460275 A | 6/2009 |
| CN | 101511544 A | 8/2009 |
| CN | 204603478 U | 9/2015 |

OTHER PUBLICATIONS

European Patent Office Examination Report for EP Application No. 16742810.1, dated Sep. 3, 2019.
Office Action, European patent application No. 16742810.1, dated Feb. 3, 2020.

* cited by examiner

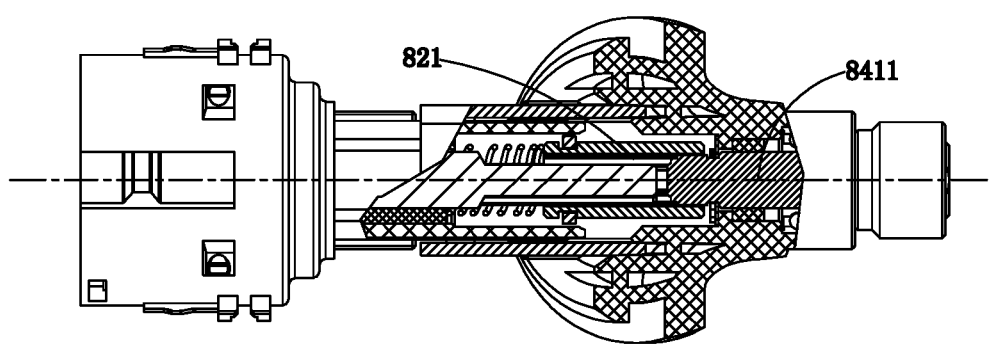
FIG. 37
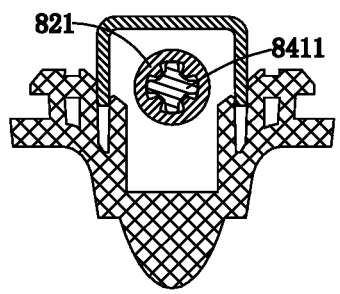 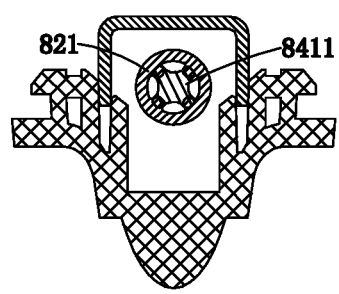
FIG. 38  FIG. 39

HAND-HELD POWER TOOL AND OPERATING METHOD THEREOF

CROSS-REFERENCE TO RELATED APPLICATIONS

This is the United States national phase of International Patent Application No. PCT/CN2016/072835, filed Jan. 29, 2016, which claims the benefit of priority of CN 201510044644.5, filed Jan. 29, 2015, the entire contents of both of which are hereby incorporated herein by reference.

TECHNICAL FIELD

The present invention relates to a handheld power tool, in particular to a handheld power tool having at least two working chucks and an operation method of such handheld power tool.

BACKGROUND

As a handheld power tool, for example, an electric drill, is used for drilling a workpiece such as a plank, and a used work head is a drill bit; and for example, a screwdriver can be used for screwing or unscrewing a bolt, and the used work head is a screwdriver bit. A spindle of such type of handheld power tools is usually provided with a working chuck that is used for clamping a type of work heads required in clamping work, and such type of work heads can have different standards. When the work head needs to be replaced for other work, the original work head is required to be detached at first to be replaced with different work heads. This operation process of replacing the work heads is very troublesome.

At present, some drilling tools with double working chucks are emerged on the market, and can be selected or converted between the two types working chucks for use according to needs. In prior art, a tri-jaw type chuck is used to clamp the drill bit, this working chuck is made of metal and is complex in structure, and is thus large in weight; while the other working chuck is used to clamp a screwdriver bit, torque adjustment is required when the screwdriver bit executes the work of bolt screwing, generally the output end of a machine body close to an output shaft is provided with a mechanical control mechanism for realizing torque adjustment, when these functional parts complex in configuration and large in weight are applied to a gun-drill tool with the double working chucks, the gravity center of the whole machine is deviated to one side of the working chucks, and a horizontal distance still exists between the gravity center and a handle holding part, as a result, the wrist of an operator bears a torque in an execution operation process and fatigue is easily generated.

In addition, before the working chuck is subjected to position conversion, the matching between the working chuck and the output shaft or locking between the working chuck and a housing is required to be removed at first, in the prior art, the operator needs one hand to operate to remove the locking, generally, such a pressing action needs to be kept for such operation part till the position conversion of the working chuck is finished, for the tool whose position conversion of the working chuck needs to be carried out manually, the operator has to finish the conversion action with the hand that originally holds the handle, thus, the operator will frequently change hands for operation, the operation is very inconvenient, and such operation is unsafe for specific working occasions, for example, high altitude.

GENERAL DESCRIPTION

In order to solve the technical problems above, the present invention provides a handheld power tool which is labor-saving to operate and good in controllability.

The present invention is realized as follows: a handheld power tool comprises a housing, comprising a handle holding part; a motor, disposed in the housing, an output shaft, driven by the motor to rotate; a working component, comprising at least two working chucks; and a switch disposed on the handle holding part and used to control the motor; the at least two working chucks respectively comprise a working shaft, the handheld power tool further comprises a control mechanism which locks a position of the working component relative to the housing, the control mechanism comprises a control part adjacent to the switch, the control part is disposed by moving relative to the housing, and the control part moves along a direction away from the working component to remove the position locking of the working component and control the output shaft to be dis-matched and disconnected with one of the working shafts.

Preferably, the working component is movably connected to the housing such that each of the at least two working chucks can be converted between a working position and a nonworking position, one of the at least two working chucks is in the working position, the working shaft of such working chuck is axially matched and connected with the output shaft, the rest working chucks in the at least two working chucks are in the nonworking position, and angles are formed between the working shafts of the rest working chucks and the output shaft.

Preferably, the working shaft is provided with a hexagonal containing hole for being matched and connected with a work head.

Preferably, the axes of the working shafts are coplanar. Angles are formed among the axes of the working shafts, and a range of the angles is from 60 degrees to 130 degrees.

Preferably, the working component is disposed in a pivoting manner relative to the housing, and a pivoting axis of the working component and the axis of the output shaft are coplanar and are at angle. The at least two working chucks are fixedly connected, and are symmetrically disposed relative to the pivoting axis of the working component.

Preferably, a moving direction of the control part is parallel with the output shaft. The control mechanism comprises a locking part in linkage with the control part, and the locking part is selectively disengaged from or matched and connected with the working component.

Preferably, the control mechanism further comprises an elastic part abutted against the control part, and the elastic part provides an elastic force for the control part to drive the locking part to move close to the working component.

Preferably, the handheld power tool further comprises a clutch device in linkage with the locking part, one end of the clutch device is movably matched and connected with the output shaft, and the other end is selectively disengaged from and matched and connected with one of the working shafts. The control mechanism further comprises a connector connected to the locking part and the clutch device, and a reset spring is disposed between the clutch device and the output shaft.

Preferably, the housing comprises a longitudinally extending main body, the working component is connected to one end of the main body, the motor is away from the working component and is disposed in the main body, the handle holding part and the main body are at an angle, the handheld power tool further comprises a battery pack which is connected to the handle and away from the main body, and the gravity center of the handheld power tool is located on the handheld holding part.

Preferably, the main body comprises a main body portion for containing a speed reduction box and a front end portion close to the working component, and a distance from the longitudinal axis of the main body to the top of the front end portion is smaller than that from the longitudinal axis of the main body to the top of the main body portion. When one of the at least two working chucks is in the working position, a distance from the longitudinal axis of the main body to the top of such working chuck is smaller than that from the longitudinal axis of the main body to the top of the front end portion.

Preferably, the handheld power tool further comprises an in-place reminding mechanism, the in-place reminding mechanism has a meshing state and a separating state, during the meshing state, one of the at least two working chucks reaches the working position, and during the separating state, the at least two working chucks get away from the working position. The in-place reminding mechanism comprises a positioning pin disposed on one of the housing and the working component, a positioning groove disposed on the other of the housing and the working component and an elastic part abutted against the positioning pin, and the positioning pin is selectively matched and connected with or disengaged from the positioning groove.

The control part of the handheld power tool is adjacent to the switch and is movably disposed relative to the housing, the control part can move along a direction away from the working component, that is, can remove the position locking of the working component, and can also control one of the output shaft to be dis-matched and disconnected with one of the working shafts, therefore, one key operation of the control part can realize two actions, and operation is convenient. The operation of the control part is consistent with a moving direction of the switch, which accords with an operation habit of the user, such that the handheld power tool is good to control and safer to operate. Since the gravity center of the handheld power tool is located on the holding part of the handle, the user's wrist cannot generate torque due to uneven weight distribution of the tool, and the operation is laborsaving.

Preferably, the housing comprises a longitudinally extending main body, the working component is connected to one end of the main body, the motor gets away from the working component and is disposed in the main body, the handle holding part and the main body are disposed at an angle, the handheld power tool further comprises a battery pack connected to the handle and away from the main body, and the gravity center of the handheld power tool is located on the handle holding part.

Preferably, a projection of the gravity center of the handheld power tool on a longitudinal axis of the main body is away from the working chucks and located between five tenth to eight tenth of the longitudinal length of the main body; preferably, a projection of the gravity center of the handheld power tool on a longitudinal axis of the main body is away from the working chucks and located in the seven tenth position of the longitudinal length of the main body.

Preferably, the control mechanism comprises a control part, a locking part and a clutch device, the locking part is selectively matched and connected with or disengaged from the working component, and the clutch device is selectively matched and connected with or disengaged from one of the working shafts; the locking part is matched and connected with the working component to lock the working component relative to the housing; and the locking part is disengaged from the working component and the clutch device is disengaged from the working shaft and allows the working component to move relative to the housing.

Preferably, the axis of the output shaft and the axis of the motor shaft are coincided. The locking part extends along a direction of the output shaft. The housing comprises a main body portion containing a speed reduction box and a front end portion containing the output shaft, the locking part comprises a first end capable of being matched and connected with the working component and a second end capable of being matched and connected with the speed reduction box. The first end has a U-shaped end surface. The working component is provided with a groove capable of being matched and connected with the U-shaped end surface.

Preferably, a projection of the locking part along the axial direction of the output shaft and the output shaft are at least partially overlapped. The locking part comprises a pair of side plates axially extending along the output shaft and connected to each other. The connector is located on the inner side of the locking part, and the connector comprises a pair of side arms parallel with the side plates.

Preferably, the clutch device comprises a clutch sleeve slidably sleeving the output shaft, and the clutch sleeve axially moves to be matched and connected with or disengaged from one of the working shafts.

Preferably, the power tool further comprises a guiding device guiding the locking part to move, and the guiding device is disposed on a speed reduction box of the front end portion. The guiding device comprises a guiding plate extending along an axial direction of the output shaft and a pair of guiding columns.

Preferably, the handheld power tool further comprises an electronic torque control device, which is used to operably adjust an output torque of at least one working shaft. The electronic control device comprises a control panel and a control button electrically connected to the control panel, and the control button operably adjusts torque output of at least one working chuck in a preset range. The control button is disposed on one end of the handle away from the working component. The control panel comprises a resistor or capacitor, and the control button operably controls a value change of the resistor or capacitor so as to control torque output of the at least one working chuck.

One embodiment of the present invention discloses a control method controlling torque of a working shaft, a handheld electric tool comprises an electromotor and a controller, the controller outputs a first drive signal to control the electromotor, and the control method comprises a first working stage and a second working stage; in the first working stage, the electromotor is operated with a rotary speed predetermined value, one electromotor parameter when the electromotor is shutdown is detected, and the controller sets a current threshold according to the electromotor parameter; in the second working stage, the electromotor is restarted, an electromotor current is detected in real time, when the electromotor current electromotor reaches the current threshold, the electromotor current is controlled to be not lager than the current threshold.

Further, the handheld electric tool has a working stage diverter switch, and the working stage diverter switch is operated to control the handheld electric tool to enter the first working stage or the second working stage.

Further, the in the first working stage, the electromotor current is detected, the controller calculates voltage required for keeping the rotary speed predetermined value according to the detected electromotor current and the rotary speed predetermined value, and adjusts an actual voltage of the electromotor to the calculated voltage.

Further, the controller takes the calculated voltage as a reference voltage, detects the actual voltage of the electromotor in real time, and adjusts the first drive signal output by the controller according to a difference between the actual voltage and the reference voltage of the electromotor.

Further, a current during shutdown of the electromotor is detected, the controller calculates the current when the electromotor current is the current during shutdown of the electromotor and a torque when the electromotor rotary speed is the rotary speed predetermined value, and then calculates a zero speed electromotor current corresponding to the torque and when the electromotor rotary speed is 0, and determines the zero speed electromotor current as the current threshold.

Further, in the second working stage, a current value of the electromotor is kept to be the current threshold, so that the electromotor current is controlled to be not larger than the current threshold.

Further, the handheld electric tool comprises a comparator, which compares the detected electromotor current with the current threshold, outputs an ON signal when the electromotor current is smaller than the current threshold, and outputs an OFF signal when the electromotor current is larger than or equal to the current threshold, and the ON/OFF signal is loaded into the first drive signal output by the controller, such that the electromotor current value is kept to be current threshold.

Further, in the second working stage, the electromotor rotary speed is kept to be the rotary speed predetermined value, the electromotor current is detected, and when the electromotor current reaches the current threshold, the controller controls the electromotor to be shut down, so that the electromotor current is controlled to be not larger than the current threshold.

The present invention further provides a method for setting a current threshold of a handheld electric tool, the handheld electric tool comprises an electromotor and a controller, and the method for setting a current threshold comprises the following steps: keeping the electromotor rotary speed to be a rotary speed predetermined value; detecting an electromotor current during shutdown of the electromotor; calculating, by the controller, the current when the electromotor current is the current during shutdown of the electromotor and a torque when the electromotor rotary speed is the rotary speed predetermined value, and then calculating a zero speed electromotor current corresponding to the torque and when the electromotor rotary speed is 0, and setting the zero speed electromotor current as the current threshold The present invention further provides a handheld electric tool, comprising a housing; a housing; a working component, movably connected to the housing and comprising at least two working chucks; a control mechanism locking or releasing the working component relative to the position of the housing; an electromotor located in the housing; and a transmission mechanism driven by the electromotor and a control circuit for controlling the electromotor; the handheld electric tool is characterized in that the control circuit comprises an electromotor switch, the electromotor being shutdown when the electromotor switch is disconnected; a current detecting unit, used to detect an electromotor current; a controller connected to the current detecting unit, the controller setting a current threshold according to the electromotor current when the electromotor current is shutdown; a storage unit connected to the controller and used for storing the current threshold; an electronic switch connected to the electromotor, the controller outputting a first drive signal to the electronic switch; and a current limiting unit connected to the current detecting unit and the controller, the current limiting unit controlling the electromotor current to be not larger than the current threshold when the electromotor current reaches the current threshold.

Further, the handheld electric tool has a working stage diverter switch connected to the controller, and the working stage diverter switch is operated to control the handheld electric tool to enter the first working stage or the second working stage, in the first working stage, the controller sets the current threshold according to the shutdown electromotor current, and in the second working stage, when the electromotor current reaches the current threshold, the current limiting unit controls the electromotor current to be not larger than the current threshold.

Further, the control circuit further comprises a voltage detecting unit for detecting an electromotor voltage, in the first working stage, the controller calculates voltage required for keeping the rotary speed predetermined value according to the detected electromotor current and the rotary speed predetermined value, the calculated voltage is taken as a reference voltage, and the first drive signal is adjusted according to a difference between a detected actual voltage and the reference voltage.

Further, the storage unit prestores a data relation among the electromotor current, the torque and the electromotor rotary speed, in the first working stage, the controller calculates the current when the electromotor current is the current during shutdown of the electromotor and a torque when the electromotor rotary speed is the rotary speed predetermined value, and then calculates a zero speed electromotor current corresponding to the torque and when the electromotor rotary speed is 0, and determines the zero speed electromotor current as the current threshold.

Further, the current limiting unit has a comparator, which is connected to the current detecting unit and the controller, in the second working stage, the comparator compares the detected electromotor current with the current threshold, and outputs an ON signal when the electromotor current is smaller than the current threshold, and outputs an OFF signal when the electromotor current is larger than or equal to the current threshold, and the comparator loads the ON/OFF signal into the first drive signal.

The handheld electric tool and a torque control method thereof of the present invention have a first working stage and a second working stage. In the first working stage, a parameter threshold is set according to a first electromotor parameter during shutdown; in the second working stage, when a second electromotor parameter reaches the parameter threshold, the second electromotor parameter is controlled to be not larger than the parameter threshold, such that workpieces reach consistent depth, and it is convenient for a user with less experience to operate the handheld electric tool.

Another embodiment of the present invention discloses a handheld power tool capable of being operated by one hand and an operation method thereof.

A handheld power tool comprises a housing; a drive mechanism, disposed in the housing and used to drive a work head to rotate and comprising an output shaft and an electromotor, wherein the electromotor is connected to the output shaft and used to drive the output shaft to rotate; a switch disposed on the housing and used to control the drive mechanism to work; a working component, comprising at least two working chucks for fixing the work head and movably connected to the housing, each working chuck can be converted between a working position and a nonworking position, the handheld power tool further comprises a control mechanism locking/releasing the working component relative to the position of the housing, and the control mechanism comprises a locking part and a control part; the locking part has a first position and a second position; when the locking part is located in the first position, the locking part locks the position of the working component and enables the output shaft to be matched and connected with the working component; the control part operably moves to control the locking part to move to the second position from the first position; when the locking part is in the second position, the locking part removes position locking of the working component and enables the output shaft to be dis-matched and disconnected with the working component, and the control part can be moved to be reset.

The control part has a third position and a fourth position; while the control part moves to the fourth position from the third position, the locking part is controlled to move to the second position from the first position; when the locking part is in the second position, the control part is allowed to be reset to the third position from the fourth position.

Preferably, the control part is movably disposed relative to the locking part.

Preferably, a reserved space is set between the control part and the locking part, and the control part can use the reserved space to be automatically reset to the third position from the fourth position.

Preferably, the locking part comprises a containing opening, the control part has a bulge part capable of moving in the containing opening, and the bulge part is matched with the edge of the containing opening so as to drive the locking part to move to the second position from the first position.

Preferably, the containing opening is a notch and disposed on the edge of the locking part.

Preferably, the notch is U-shaped.

Preferably, the locking part comprises a limiting part, the position of a working part corresponding to the limiting part has a limiting groove, and the limiting groove is located in the limiting part by the limiting part, such that the working component is locked in position.

According to the handheld electric tool mentioned above, the reserved space of the locking part can be used, such that the control part can use the reserved space to be automatically reset without an influence whether the working chuck is converted to a preset position, and the misunderstanding problem for an operator that the working head is not converted to the preset position since the handheld power tool cannot be reset because of an unlocking switch caused by the fact that the output shaft of an electric drill and the working shaft of the work head are not totally meshed that is avoided.

An operation method of a handheld power tool is provided. The handheld power tool comprises a housing which has a handle holding part; a drive mechanism; an output shaft driven by the drive mechanism to rotate; a working component, comprising at least two working chucks; and a switch disposed on the handle holding part; the at least two working chucks respectively comprise a working shaft, the handheld power tool further comprises a control mechanism locking/releasing the working component relative to the position of the housing, and the control mechanism comprises a movably disposed control part; an operation method of the handheld power tool comprises the following steps: moving the control part to allow the working component to be moved relative to the housing; rotating the working component to enable the working component to be locked relative to the housing; and releasing the control part to move and reset the control part.

Preferably, the method further comprises the following step: after the control part is released, triggering the switch to start the drive mechanism, such that one of the working shafts is matched and connected with the output shaft.

The control part of the present embodiment can be automatically preset, even in an actual operation process, after one working chuck in the working component is rotated to a preset position, the working shaft is not totally meshed with the output shaft of the drive mechanism, as a result, the locking cannot be reset, the reset of the control part will be not be affected, in this way, the misunderstanding that the work head is not converted to the preset position is not caused for a worker, and as long as the worker controls the output shaft of the drive mechanism to rotate through the switch, the output shaft will be meshed with the working shaft of the working chuck in the working position, and normal working of the tool is not affected.

The embodiment of the present invention further provides a handheld power tool, having better accessibility.

The present invention is realized as follows: a handheld power tool comprises a main body, longitudinally extending; a motor, disposed on the main body; an output shaft, driven by the motor to rotate; a working component, movably disposed relative to the main body and comprising at least two working chucks, wherein the working chucks respectively comprise a working shaft, and the working shafts are alternatively in a position capable of being matched and connected to with the output shaft; the power tool sequentially comprises a first zone containing the motor, a second zone containing the output shaft and a third zone containing the working shafts along the longitudinal direction, the first zone and the second zone have a height difference to form a first step, and the second zone and the third zone have a height zone to form a second step. The height of the third zone is smaller than that of the second zone, and the height of the second zone is smaller than that of the first zone.

The embodiment of the present invention further provides a handheld power tool, which is comfortable to operate, laborsaving and good in balance, and accords with requirements of humanized operation.

The present invention is realized as follows: a handheld power tool comprises a main body, longitudinally extending; a motor, disposed on the main body; an output shaft, driven by the motor to rotate; a working component, movably disposed relative to the main body and comprising at least two working chucks, wherein the working chucks respectively comprise a working shaft, and the working shafts are alternatively in a position capable of being matched and connected to with the output shaft; the power tool sequentially comprises a first zone containing the motor, a second zone containing the output shaft and a third zone containing the working shafts along the longitudinal direction, a length ratio of the second zone to the first zone is between 2:5 and 3:5, and a length ratio of the third zone to the second zone is smaller than 3:5.

The handheld power tool of the embodiment of the present invention is good in coordination of a whole machine body and light and easy to operate and during package, the size in a width direction can be most effectively saved and used.

The present invention is realized as follows: a handheld power tool comprises a longitudinal extending part; a handle connected to the extending part at an angle; a motor disposed on the extending part; an output shaft driven by the motor to rotate; a working component, comprising at least two working chucks, wherein the working chucks respectively comprise a working shaft, and the working shafts are alternatively in a position capable of being matched and connected to with the output shaft; and a length width ratio of the extending part is between 3 to 4.5.

BRIEF DESCRIPTION OF THE DRAWINGS

The present invention is further described in detail in combination with drawings.

FIG. 37 is a section structural diagram of a control mechanism in FIG. 36 along F-F;

FIG. 38 is a section first state structural diagram of the control mechanism in FIG. 36 along G-G;

FIG. 39 is a section second state structural diagram of the control mechanism in FIG. 36 along G-G;

DETAILED DESCRIPTION

Figure 1:
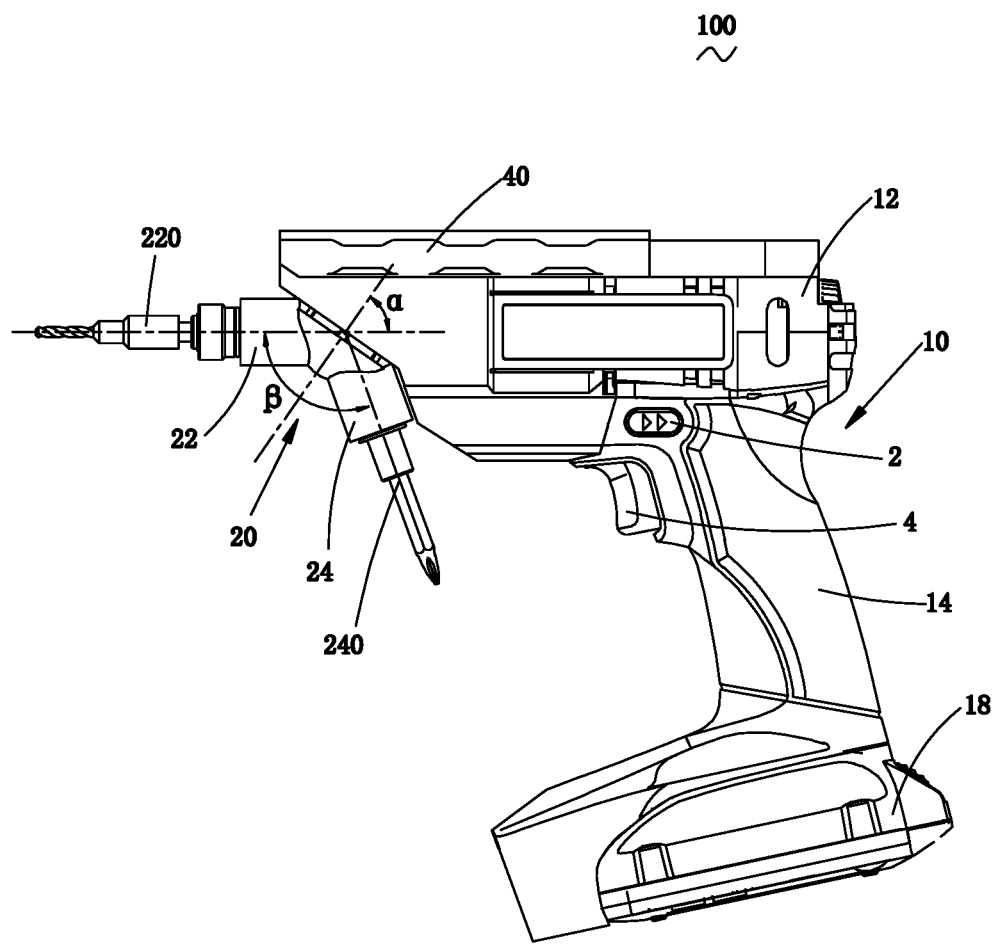
FIG. 1 is a main view of a handheld power tool of an embodiment of the present invention.
Figure 2:
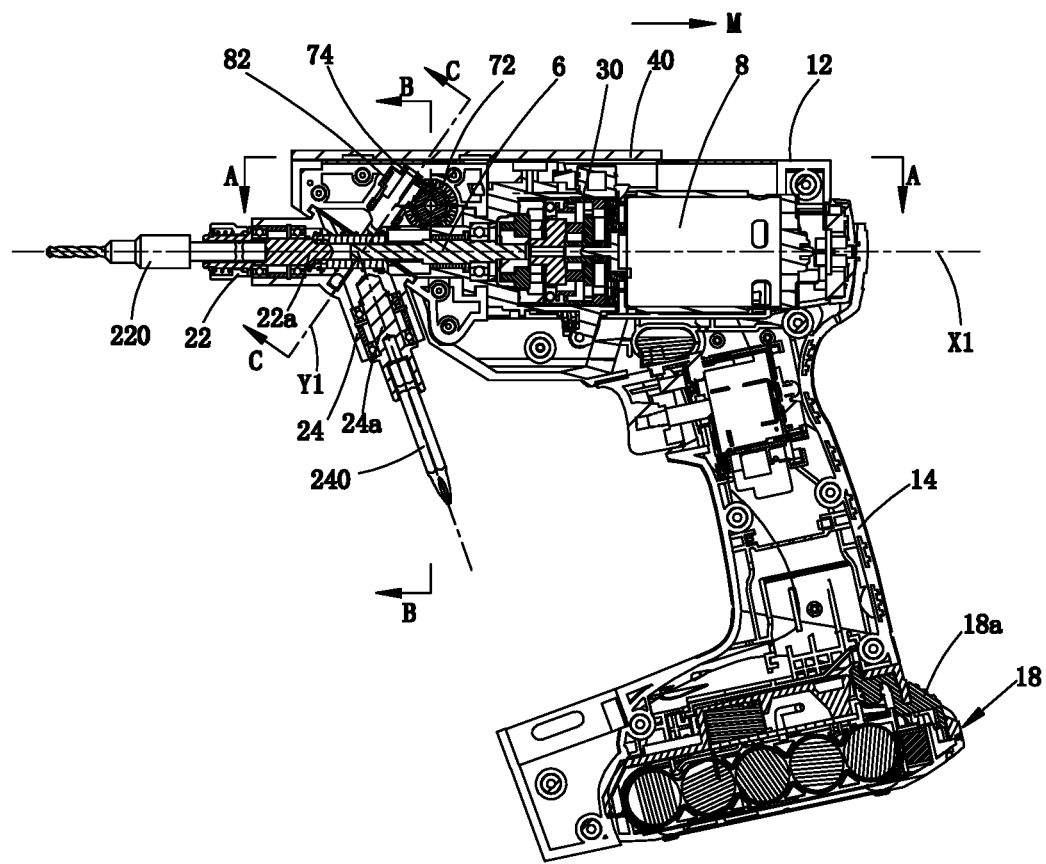
FIG. 2 is a section view of a main view direction of the handheld power tool as shown in FIG. 1.
Figure 3:
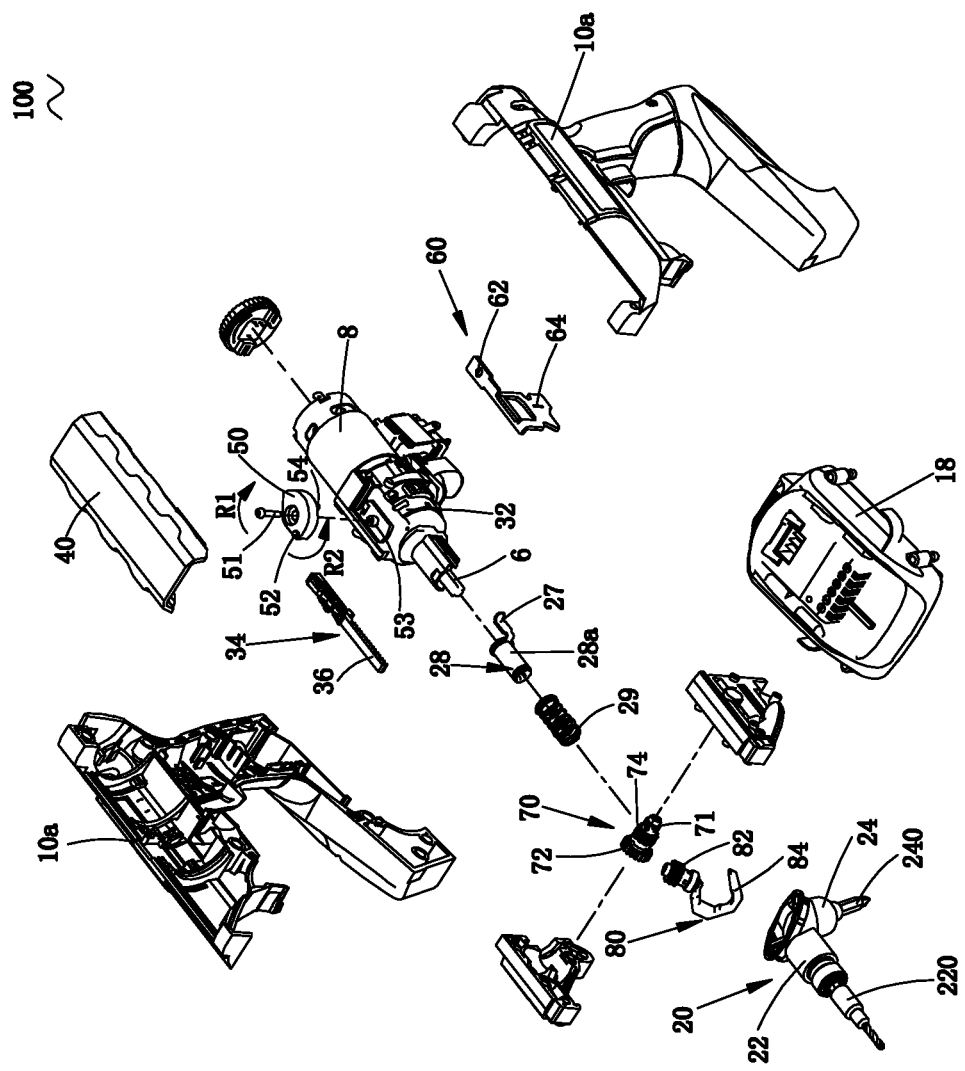
FIG. 3 is a stereoscopic exploded schematic diagram of the handheld power tool as shown in FIG. 1.

Referring to FIGS. 1-3, a handheld power tool 100 of the present invention is provided with a housing 10, wherein the housing 10 is formed by two Half-type semi housings 10a. A power system comprises a motor 8 contained in the housing 10, the motor 8 of the present invention adopts an electric motor, and can also be replaced by using other types of motors, such as a pneumatic motor, a fuel motor, and the like. The housing 10 comprises a main body 12 containing the motor 8 and a handle 14 connected to the main body 12, the main body 12 extends along a longitudinal direction, and the handle 14 and the main body are disposed at an angle. According to a multifunctional electric drill 100 of the present invention, the main body 12 is approximately vertical to the handle 14. One end of the handle 14 away from the motor 8 is provided with an energy unit for providing energy for the motor 8, the energy unit in the present embodiment adopts a battery pack 18 detachably connected to the handle 14, the batter pack 18 comprises a plurality of chargeable batteries contained in a battery pack housing 18a, and the battery preferably adopts a lithium battery. The part on the handle 14 close to the main body 12 is provided with a switch 4 for manually controlling the motor 8 and a reversing trigger 2. The motor 8 of the present embodiment can also be selectively disposed on the handle 14.

An output shaft 6 driven by the motor 8 to rotate is disposed in the main body 12, and in the present embodiment, an axis X1 of the output shaft longitudinally extends along the main body 12 and is coincided with the motor axis; in other optional solutions, the axis X1 of the output shaft and the motor axis can be disposed in parallel or at an angle. A transmission device 30 for speed reduction is disposed between the output shaft 6 and the motor 8, and the speed reduction transmission device 30 is contained in a speed reduction box 32; and the speed reduction transmission device 30 in the present embodiment is a gear mechanism, and preferably a planetary gear mechanism.

The handheld power tool 100 comprises a working component 20 movably connected to the housing 10; in the present embodiment, the working component 20 is located on one end of the main body 12 away from the motor 8, the working component 20 is disposed in a pivoting manner relative to the main body 12, wherein an angle α is formed between a pivoting axis Y1 of the working component 20 and the axis X1 of the output shaft, and the pivoting Y1 and the axis X1 of the output shaft are constantly in a coplanar state, wherein the angle α is an acute angle and is between a range from 30 degrees to 65 degrees, preferably, the range of the angle α is from 45 degrees to 65 degrees. The working component 20 comprises two working chucks 22 and 24, the working chuck 22 and the working chuck 24 are fixedly connected and are symmetrically disposed on both sides of the pivoting axis Y1, the working chucks 22 and 24 are respectively provided a working shaft 22a and a working shaft 24a, and an angle β which is two times of the angle α is formed between the axes of the working shafts 22a and 24a. When one of the working chucks 22 and 24 is in a working position, the axes of the working shafts 22a and 24a, the pivoting axis Y1 and the axis X1 of the output shaft are in the same plane. One ends of the working shafts 22a and the 24a are selectively matched and connected to the output shaft 6, and the other ends are connected to the work heads. The working component 20 is disposed in such manner that when it is pivoted relative to the housing 10, at least one of the working chucks 22 and 24 can rotate to a position where the working shaft is matched with the connected to the output shaft 6, such that the output shaft 6 drives the working shaft of the working chuck to rotate. In the present embodiment, the working component 20 rotates in a reciprocating manner around the pivoting axis Y1 relative to the housing 10, such that the working shafts of the working chucks 22 and 24 are selectively or alternately converted to be matched and connected with the output shaft 6, and the output shaft 6 alternatively drives the work heads clamped on the working chucks 22 and 24 for rotation.

One of the working chucks 22 and 24 is disposed to clamp a drill bit 220, and the other working chuck is designed according to actual needs, for example, is disposed to clamp a screwdriver bit, and can also be disposed to clamp a small grinding head, etc., for sanding, etc. In another optional solution, one of the working chucks 22 and 24 is disposed to clamp the screwdriver bit 240, and the other working chuck is designed according to an actual working object. In the present embodiment, the working chuck 22 is used to clamp the drill bit 220, and the working chuck 24 is used to clamp the screwdriver bit 240.

The multifunctional electric drill 100 comprises a control part 40 movably disposed relative to the housing 10 and a transmission system disposed between the control part 40 and the working component 20, through the transmission system, the movement of the control part 40 operably drives two working chucks 22 and 24 to be interchanged between a working position and a containing position, that is to say, the movement of the control part 40 operably enables the output shaft to be selectively matched and connected with the working chucks 22 and 24. The control part 40 is disposed on the outer side of the main body 12, the control part 40 of the present embodiment can perform linear movement along the axial direction of the output shaft relative to the housing 10, operably moves on the top of the main body 12 in a sliding cover manner, and can be used to cover at least part of a movement mechanism located in the housing 10. Of course, those skilled in the art can set the control part into other manners such as an operation button.

The transmission system comprises a first transmission mechanism and a second transmission mechanism, linear movement of the control part 40 operably controls one of the working chucks 22 and 24 to be matched and connected with or separated from the output shaft 6 through the first transmission mechanism, meanwhile, the linear movement of the control part operably controls the working component to pivot relative to the housing 10 through the second transmission mechanism.

The first transmission mechanism is used to alternatively control the working chucks 22 and 24 to be matched and connected with or separated from the output shaft 6, and the second transmission mechanism is used to control the working component 20 to rotate relative to the housing 10.

The first transmission mechanism comprises a drive part 50 driven by the control part 40 to rotate, a driven part 60 driven by the drive part, and a linkage part 28 driven by the driven part 60, one end of the linkage part 28 is connected to the output shaft 6, and the other end is selectively matched and connected or disengaged from one of the working chucks 22 and 24, that is to say, one end of the linkage part 28 is connected to the output shaft 6, and the other end is selectively matched and connected or disengaged from one of the working chucks 22 and 24.

Referring to FIG. 3, the control part 40 is provided with a first drive portion, and the drive part 50 is provided with a transmission portion matched and connected with the first drive portion. The first drive portion is of a groove 42 disposed in the inner surface of the control part 40 (referring to FIG. 4), the drive part 50 can rotates forwards or backwards around a fixed pivoting axis, the drive part 50 is located between the control part 40 and the speed reduction box 32, the drive part of the present embodiment adopts a cam 50, the cam 50 is rotatably disposed in a guiding column 53 of the speed reduction box 32 through a bolt 51, and the cam 50 takes the central line of the guiding column 53 as a pivoting axis. The transmission portion is a first connecting pin 52 disposed on a first end on the cam 50 close to the control part 40, the first connecting pin 52 is meshed, matched and connected with the groove 42, the second end surface on the cam 50 opposite to the first end surface is provided with a connecting pin 54, and the connecting pin 54 and the connecting pin 52 extend along opposite directions.

The driven part 60 is disposed between the speed reduction box 32 and the main body 12, one end on the driven part 60 close to the cam 50 is provided with a first connecting part matched and connected with the connecting pin 54, and the first connecting part is configured in a manner of receiving a connecting hole 62 that the connecting pin 54 is inserted. The driven part 60 is provided with a second connecting part, configured in a manner of a clamping groove 64. Through the connecting pin 54, rotational movement of the drive part can be converted into movement of the driven part along the axis of the output shaft. The drive part forwards rotates to drive the driven part to move away from the working component 20 along the axial direction of the output shaft, and the drive part backwards rotates to drive the driven part to move to the working component 20 along the axial direction of the output shaft.

The linkage part 28 is disposed between the working component 20 and the output shaft 6, and can axially move along the axial direction of the output shaft 6, the linkage part comprises a main body portion 28a and a clamping part 27 matched and connected with the main body portion 28a, the main body portion 28a is matched and connected with one end of the output shaft 6 in a sliding manner in a sleeve manner, and the other end is alternatively matched and connected with the working shafts 22a and 24a of the working chucks 22 and 24. An elastic part is disposed at the periphery of the main body portion 28a, the elastic part of the present embodiment adopts a pressure spring 29; one end on the clamping part 27 connected on the main body portion 28a and close to the output shaft 6 is used to be matched and connected with the clamping groove 64 of the driven part 60, the clamping part 27 movably sleeves a peripheral surface of the main body portion 28a, the end part of the main body portion 28a is provided with a snap ring (not shown) for limiting, and the clamping part 27 can be limited on the main body portion 28a without being separated from the main body portion 28a; when the main body portion 28a is in an initial position, the clamping part 27 is abutted against the snap ring under an action of the elastic part 29.

Figure 4:
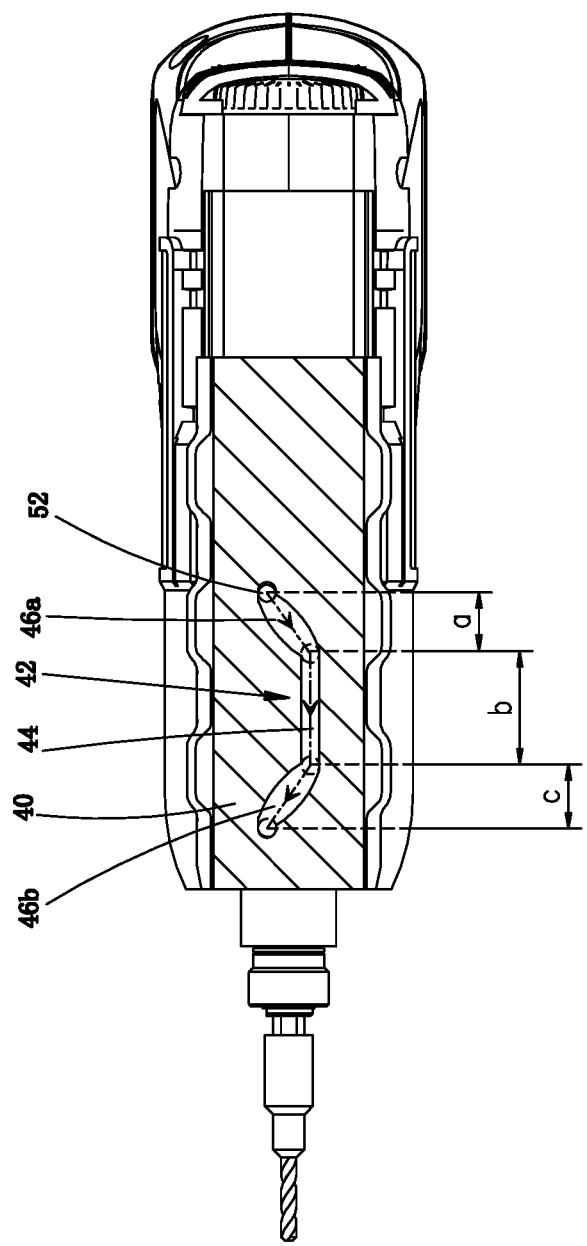
FIG. 4 is a section schematic diagram along an A-A direction in FIG. 2.

Referring to FIG. 2 and FIG. 4, a groove 42 is in the inner side surface of the control part 40, and the connecting pin 52 is slidably meshed in the groove 42. The groove 42 of the present embodiment is disposed into a □-shaped groove along an extending direction of the main body 12, and the □-shaped groove comprises a cross groove part 44 in the center and chute parts 46a and 46b located on two parts of the cross groove part 44 and are symmetrically distributed. The connecting pin 52 capable of sliding in the groove is contained in the groove 42, and in an initial state, the connecting pin 52 is in blind ends of the chute parts 46a and 46b and is abutted against the groove walls.

When the control part 40 in the initial position moves along a direction of the main body 12 as shown by an arrow M and parallel with an axis of the output shaft, the connecting pin 52 meshed in the groove 42 moves along the chute part 46a of the groove 42, the connecting pin 52 passes by a movement stroke a, the cam 50 is pivoted in the direction by an arrow R1 around the axis of the guiding column 53, the connecting pin 54 correspondingly rotates along with the cam 50, and the rotation of the connecting pin 54 drives the driven part 60 matched and connected therewith to move away from the working component 20 along the axial direction of the output shaft; in the present embodiment, the driven part 60 and the control part 40 are consistent in movement direction. Because of the movement of the driven part 60, the clamping part 27 matched and connected with the clamping groove 64 drives the main body portion 28a to move along with the driven part 60, as a result, one end of the main body portion 28a matched and connected with the working shaft 22a of the working chuck 22 originally is disengaged from the working shaft 22a. Once the main body portion 28a is separated from the working shaft 22a, the working component 20 is allowed to pivot relative to the housing 10; when moving in the chute part 46a, the connecting pin 52 is descended to the cross groove part 44 from the top of the chute part 46a, the stroke a that the connecting pin 52 walks is the unlocking stroke of the control part 40. When the connecting pin 52 meshed in the groove 42 moves along the cross groove part 44 of the groove 42, the cam 5 does not rotate. When the connecting pin 52 meshed in the groove 42 moves along the chute part 46b of the groove 42, the connecting pin 52 is ascended to the top of the chute part 46b from the cross groove part 44, and at this point, the cam 5 oppositely rotates along the direction shown by the arrow R2.

The second transmission comprises a rack device driven by the control part 40, a gear component 70 connected to the rack device and a transmission component 80 driven by the gear component 70 to rotate, and the transmission component 80 is used to drive the working component 20 to rotate relative to the housing 10.

Figure 5:
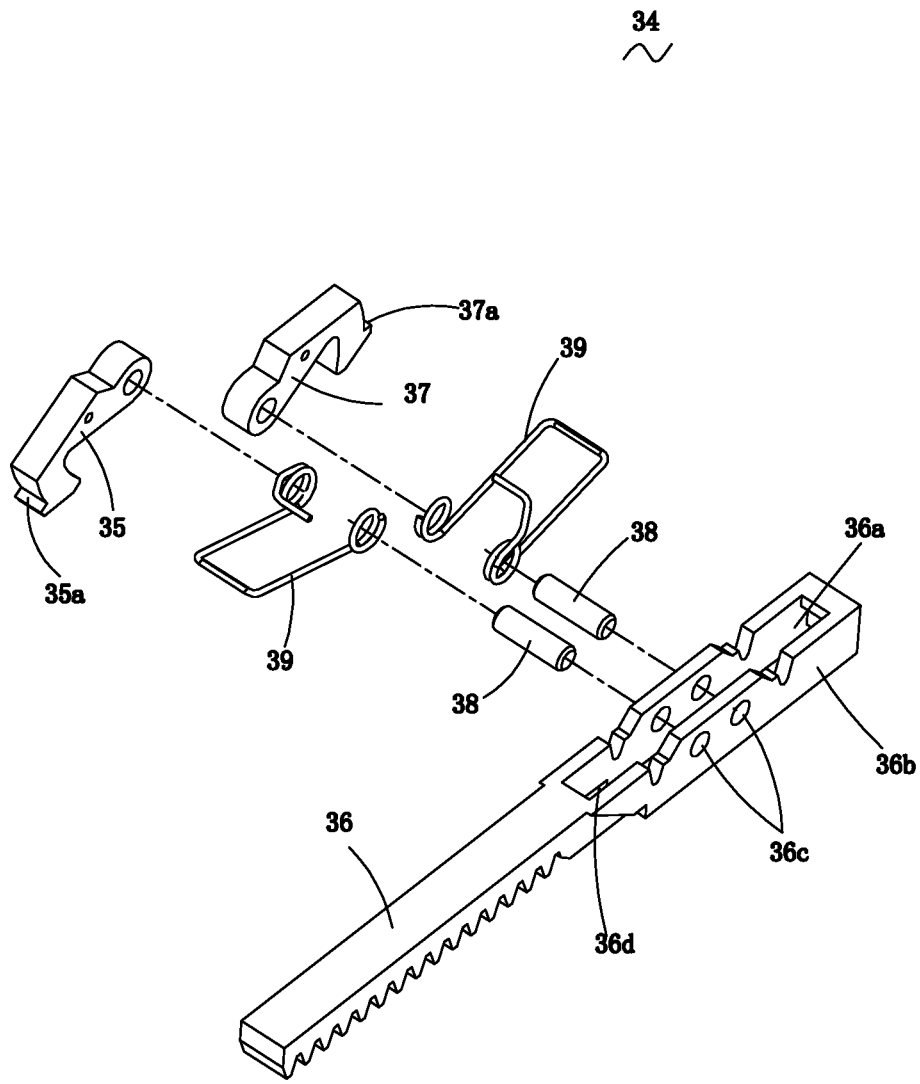
FIG. 5 is a stereoscopic exploded schematic diagram of a rack device in FIG. 3.
Figure 6:
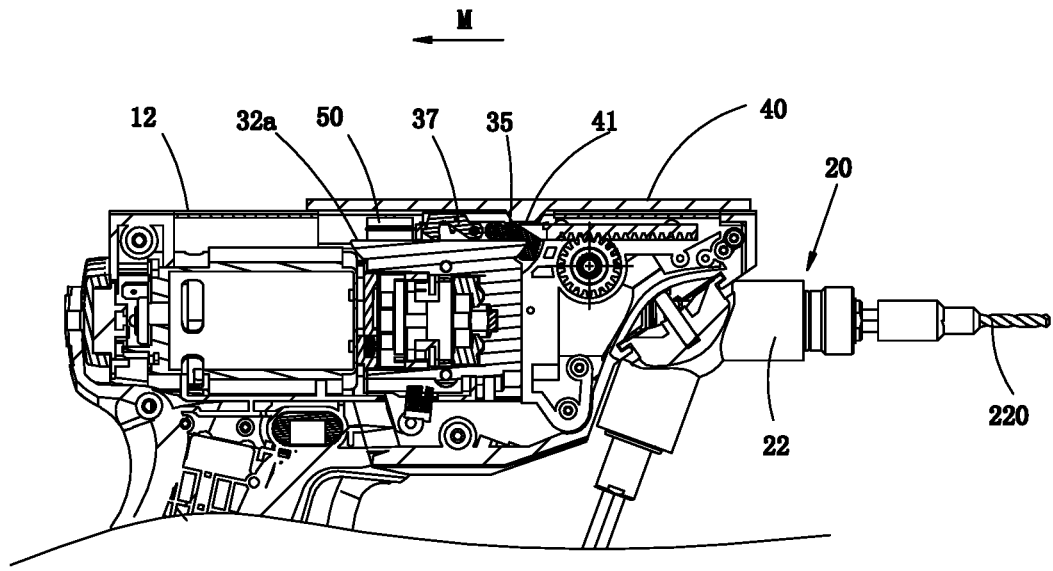
FIG. 6 is a local section schematic diagram of a main view direction of the handheld power tool as shown in FIG. 1.

Referring to FIG. 5 and FIG. 6, the control part 40 is further provided with a second drive part, the second drive part of the present embodiment is a drive arm 41 disposed on the control part 40, the rack device 34 is disposed between the control part and the speed reduction box 32 and comprises a keeping component matched and connected with the drive arm 41 and a rack 36 used for supporting a movement device, the keeping component has a locking state and a releasing state, when the keeping component is in the releasing state, the drive arm 41 drives the rack device to move along the axial direction of the output shaft, and when the keeping component is in the locking state, the drive arm 41 cannot drive the rack device to move along the axial direction of the output shaft. The keeping component of the present embodiment comprises a pair of clamping hook parts 35 and 37 rotatably disposed on the rack 36, the clamping hook parts 35 and 37 are distributed along the axial direction of the output shaft, and the drive arm 41 operably moves along the axial direction of the output shaft.

The clamping hook parts 35 and 37 have a locking position and a releasing position, when the clamping hook parts 35 and 37 are in the releasing position, the control part 4 drives the rack device 34 by the drive arm 41 to move in parallel with the axis of the output shaft, when one of the clamping hook parts 35 and 37 is in the locking position, the control part cannot drive the rack device 34 to move by the drive arm 41. The end part of the rack 36 is provided with a notch 36a along an extending direction of the rack, openings 36c are formed in two side walls 36b of the notch 36a respectively, and the clamping hook parts 35 and 37 are rotatably disposed in the notch 36a in one end of the rack 36 by a pivoting shaft 38 penetrating through the openings 36c of the side walls 36*b* of the rack. The clamping hook parts 35 and 37 are respectively provided with an elastic part, and the elastic part in the present embodiment adopts a torsional spring 39.

Referring to FIG. 6, the drive arm 41 is disposed on the inner side surface of the control part 40 and is protruded to the interior of the housing 10. Under the action of the torsional spring 39, the clamping hook parts 35 and 37 have a prestress of being protruded out of the notch 36*a* to the direction of the control part 40. When the control part 40 is in an initial state, the clamping hook part 35*a* of the first clamping hook part 35 is abutted by the drive arm 41 to overcome an action force of the torsional spring 39 to rotate to the inner side to extend out of the notch 36*a*.

Figure 7:
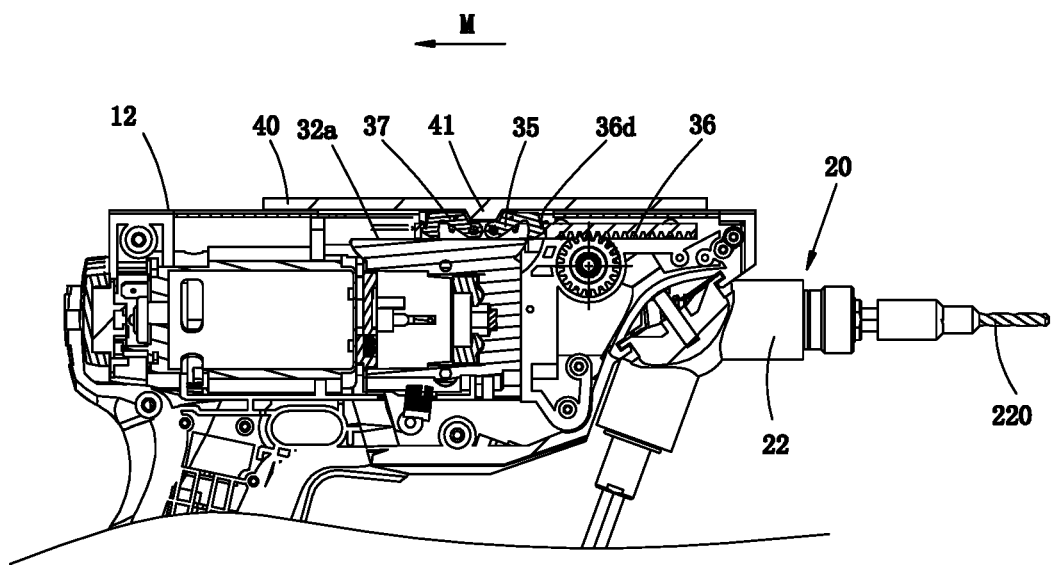
FIGS. 7 to 9 are section schematic diagrams of respective states when a control part of the handheld power tool as shown in FIG. 6 moves to different positions.

Referring to FIG. 4 to FIG. 7, when the control part 40 moves relative to the housing 10 along a direction as shown by an arrow M and parallel with the axis of the output shaft, the drive arm 41 moves along with the control part 40, in the process that the drive arm 41 moves relative to the rack device 34, the pushing force for the first clamping hook part 35 is smaller till the clamping hook part 35*a* of the first clamping hook part 35 rotates back to the notch 36*a* under the action of the torsional spring 39 and is meshed and clamped with an end wall 36*d* of the rack notch 36*a*. At this point, the control part 40 further moves along the direction as shown in by the arrow M, the first and second clamping hook parts 35 and 37 are supported on a support surface 32*a* of the speed reduction box 32, and the drive arm 41 acts between the first and second clamping hook parts 35 and 37 to drive the whole rack device 34 to move to the direction as shown by the arrow M. As mentioned above, the control part 40 moves relative to the housing 10, when the connecting pin 52 in the first chute part 46*a* moves to a position it is intersected with the cross groove part 44, the unlocking stroke a is finished, and the working component 20 is allowed to pivot relative to the housing 10. A current position of the control part 40 in FIG. 7 is an initial position where the drive arm 41 begins to drive the whole rack device 34 to move. At this point, further the control part 40 moved along the direction shown by the arrow M, the drive arm 41 approaches to the second clamping hook part 37.

Figure 8:
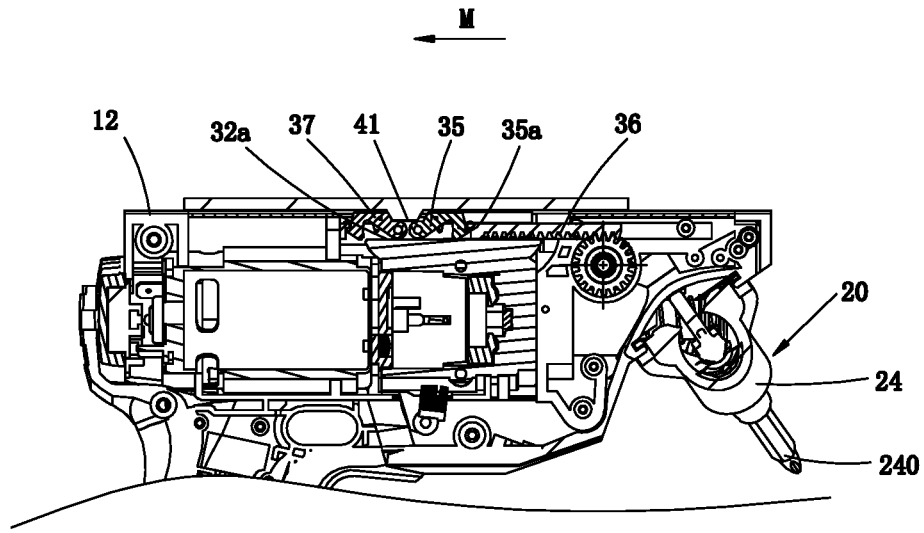

Referring to FIG. 4 and FIG. 8, in a position where the first chute part 46*a* and the cross groove part 44 are intersected, the connecting pin 52 begins to move in the cross groove part 44 and approaches to the second chute part 46*b*, a movement stroke b of the connecting pin 52 in the cross grove 44 is a switching stroke of the control part 40, and the working component 20 rotates around the pivoting axis Y1 relative to the housing 10*s*. When the control part 40 further moves along the direction shown by the arrow M, the drive arm 41 pushes against the second clamping hook part 37 to enable the same overcome an elastic force to protrude to the inner side of the rack notch 36*a*, and the clamping hook part 37*a* is separated from the support surface 32*a*. When the connecting pin 52 reaches the position where the cross groove part 44 and the second chute part 46*b* are intersected, the drive arm 41 of the control part 40 is disengaged from the clamping hook part 37*a*, and the control part 40 does not drive the whole rack device 34 to move any more. The movement stroke b of the connecting pin 52 in the cross groove part 44 does not result in further rotation of the cam 50 around a central line of the guiding column 53 and further movement of the moving member 60, while the working component 20 is rotated for 180 degrees relative to the housing 10.

Figure 9:
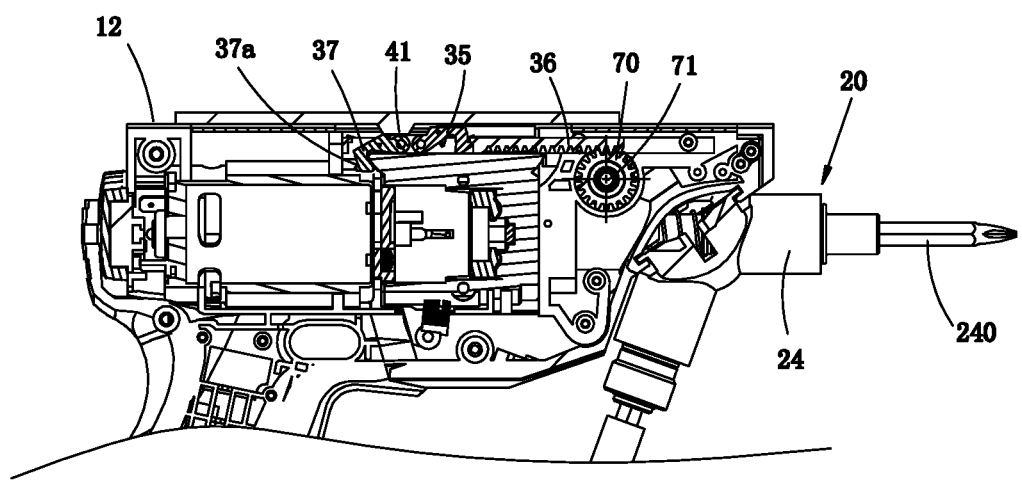

Referring to FIG. 4 and FIG. 9, when the working component 20 rotates to rotate its working chuck 24 to the working position, at this point, the working shaft 24*a* rotates to a position where it is basically aligned with the main body portion 28*a*. Further, the control part 40 is further moved to a limit position of the moving direction along a direction as shown by the arrow M, the connecting pin 52 slides into the second chute part 46*b* from a position where the cross groove part 44 and the second chute part 46*b* are intersected and is abutted against the end wall of the second chute part 46*b*, a movement stroke c of the connecting pin 52 in the second chute part 46*b* is a locking stroke of the control part 40, and in the movement stroke c, the control part 40 does not drive the rack device 34 to move any more. Since the second chute part 46*b* and the first chute part 46*a* are symmetrically disposed about the cross groove part 44, when the connecting pin 52 moves in the second chute part 46, the connecting pin 52 drives the cam 50 to rotate back along an R2 direction around the central line of the guiding column 53. The rotation of the cam 50 drives the driven part 60 to move along a direction opposite to the moving direction of the control part 40. The driven part 60 pushes the clamping part 27 to overcome an action of the pressure spring 29 and drives the main body portion 28*a* to move together to a direction close to the working chuck, such that the main body portion 28*a* is recovered to a position where the output shaft 6 is matched and connected with the working shaft 24*a* of the working chuck 24 from a position where the main body portion is disengaged from the working shaft 22*a* of the working chuck 22. Once the output shaft 6 is matched and connected with the working shaft 24*a* in place, that is, one time position conversion between the working chucks 22 and 24 is finished, the output shaft 6 drives the working chuck 24 matched and connected therewith to rotate. While the working chuck 22 rotates to a nonworking position, and thus cannot be driven by the output shaft 6 to rotate.

The pressure spring 29 of the present embodiment meanwhile plays a role of a reset spring, and the main body portion 28*a* has a function of torque transmission after being matched and connected with the working shaft 24*a*, therefore the matching and connecting end of the working shaft is usually set into a spline tooth, while the matching and connecting end of the main body portion 28*a* is correspondingly set into a spline groove containing the spline tooth (referring to FIG. 11), the spline tooth and the spline groove are possible in angle misplacement for the reasons of tolerance and the like in a process of being returned to be matched and connected with the working shaft 24*a*, that is to say, the spine tooth on the matching and connecting end of the working shaft 24*a* is not contained in the spline groove of the main body portion 28*a*, but under the action of a spring 29, the spline groove on the matching and connecting end of the main body portion 28*a* is abutted against the spline tooth of the working shaft, once the motor 8 is started, the output shaft 6 drives the main body portion 28*a* to rotate, the spline groove of the main body portion 28*a* rotates for an angle relative to the spline tooth, the main body portion 28*a* enables the spline groove to be meshed with the spline tooth under the action of an elastic force of the spring 29, that is to say, the main body portion 28*a* is automatically reset to a position where it is matched and connected with the working shaft 24*a*.

The control part 40 moves to the limit position from the initial position along a moving direction, such that the output shaft 6 is disengaged from one of at least two working chucks 22 and 24, and the other of the at least two working chucks 22 and 24 is pivoted to a position where it is matched and connected with the output shaft 6. In the process that the control part 40 moves to the limit position from the initial position, the output shaft 6 is disengaged from one of at least two working chucks 22 and 24 at first, then the working component 20 is pivoted relative to the housing 10, and finally, the output shaft 6 is matched and connected with the other of at least two working chucks 22 and 24.

Those skilled in the art can conceive that the control part 40 finishes one time complete unidirectional sliding along the arrow M relative to the housing 20, that is, the conversion of the at least two working chucks 22 and 24 in different positions is finished. The control part 40 moves to the limit position away from the working component 20 from the initial position close to the working component 20 along a direction parallel with the output shaft, such that the output shaft 6 is disengaged from one of the at least two working chucks 22 and 24, and the other of the at least two working chucks 22 and 24 is pivoted to a position where it is matched and connected with the output shaft 6. In the process that the control part 40 moves to the limit position from the initial position, the output shaft 6 is disengaged from one of the at least two working chucks 22 and 24, then the working component 20 is pivoted relative to the housing 10, and finally, the output shaft 6 is matched and connected with the other of the at least two working chucks 22 and 24.

If the control part 40 moves along a direction opposite to the direction as shown by the arrow M and parallel with the axis of the output shaft, one time complete sliding is finished, by the first transmission mechanism and the second transmission mechanism, the positions of the working chucks 22 and 24 can be converted again, that is, the working chuck 22 instead of the working chuck 24 is matched and connected with the output shaft 6 and driven by the output shaft 6 to rotate, which is not repeated here.

Figure 10:
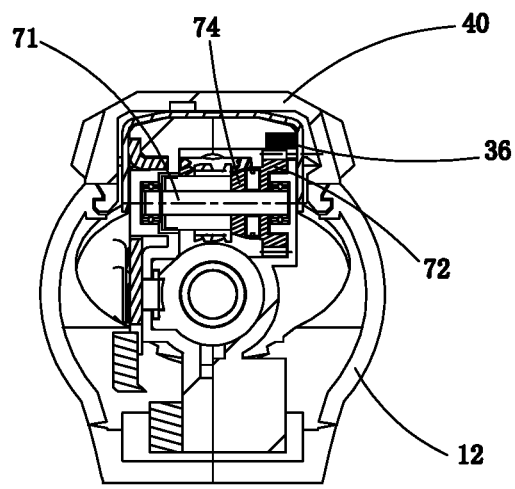
FIG. 10 is a section schematic diagram along a B-B direction in FIG. 2.
Figure 11:
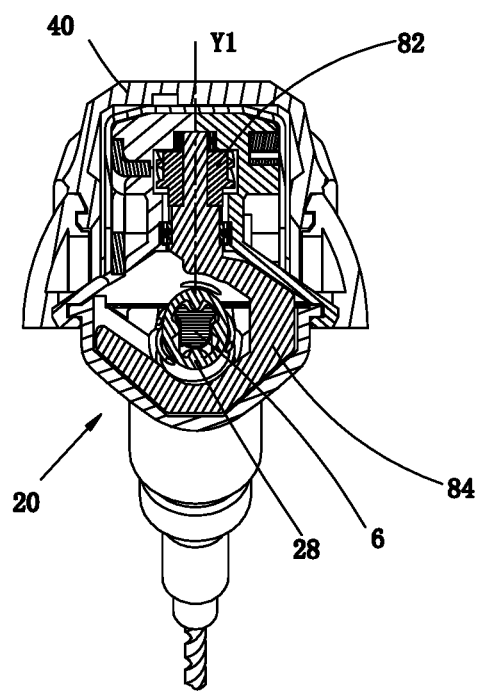
FIG. 11 is a section schematic diagram along a C-C direction in FIG. 2.
Figure 12:
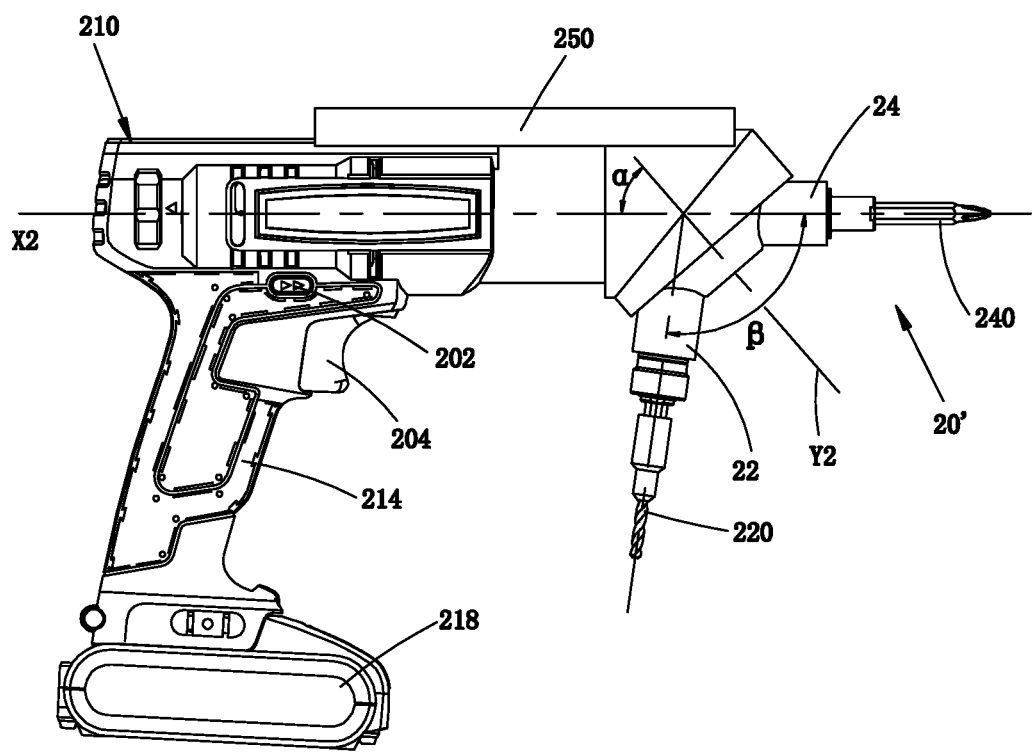
FIG. 12 is a main view of a handheld power tool of a second embodiment of the present invention.
Figure 13:
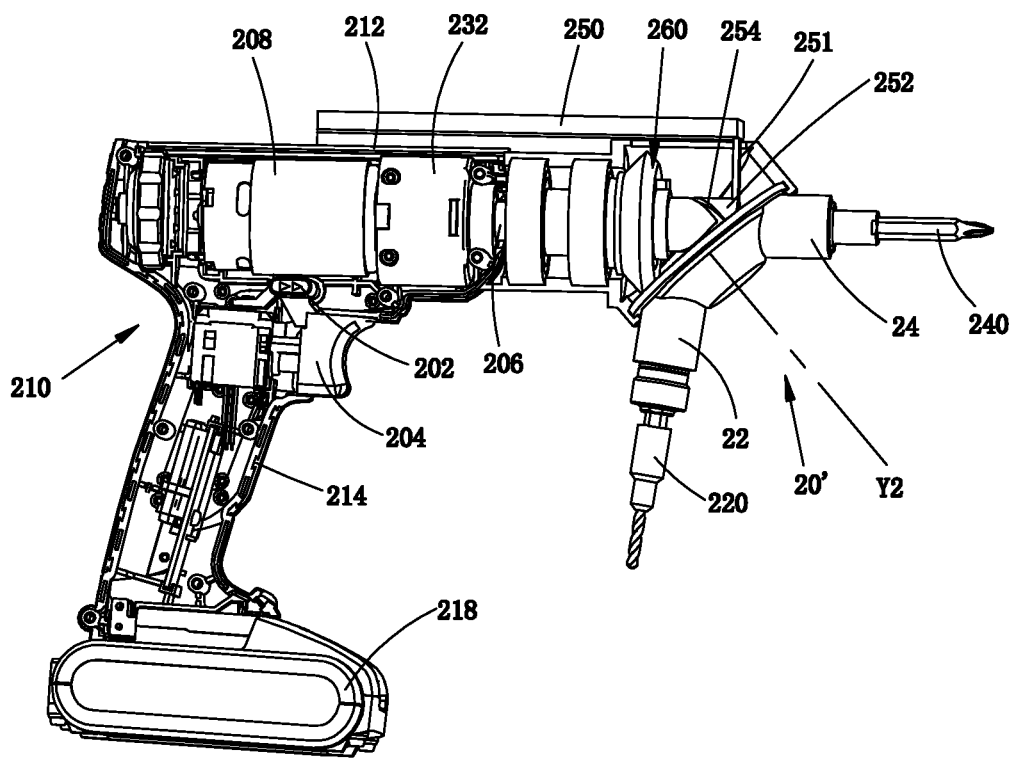
FIG. 13 is a main schematic diagram of a display internal structure after a half housing is removed from the handheld power tool as shown in FIG. 12.

Referring to FIG. 3, FIG. 10 and FIG. 11, the gear component 70 is disposed in the main body 12, and the transmission component 80 is disposed between the main body 12 and the working component 20. The gear component 70 comprises a main 72 gear meshed with the rack 36 and a pinion 74 coaxially and fixedly disposed with the main gear 72 through a connecting shaft 71, and the pinion 74 of the present embodiment is set into a spiral gear. The transmission component 80 comprises a transmission gear 82 in meshing transmission with the pinion 74 and a transmission arm 84 connected to the transmission gear 82, wherein the transmission gear 82 is also set into a spiral gear, spiral angles of the pinion 74 and the transmission gear 82 are both set to be 45 degrees to realize space alternating axis transmission. The transmission arm 84 is connected to the working component 20 such that when the rack 36 drives the main gear 72 to rotate, the pinion 74 generates corresponding rotation, so as to drive the transmission 82 to rotate around its axis, the transmission gear 82 rotates to drive the transmission arm 84 and the working component 20 to rotate around the axis of the transmission gear 82, and in the present embodiment, the axis of the transmission gear 82 and the pivoting axis Y1 of the working component 20 are coaxial, and the transmission arm 84 is set into a transmission hook.

Referring to FIG. 12 to FIG. 15, a handheld power tool 200 of a second embodiment of the present invention and the first embodiment have a similar structure, and in order to facilitate expression, the same structures are not repeated, and different structures are specifically described hereinafter.

The handheld power tool 200 has a housing 210, which is formed by two Half type semi housings 210a, a motor 208 is contained in the main body 212, and one end of the handle part 214 and the main body 212 are disposed at an angle, which is about 90 degrees; the other end of the handle part 214 is detachably connected to a battery pack 218, comprising a plurality of chargeable batteries; and the part on the handle part 214 close to the main body 212 is provided with a switch 204 for manually controlling the motor 208 and a reversing switch 202.

The output shaft 206 driven by the motor 208 is disposed in the main body 220, and the axis X2 of the output shaft and the motor axis are coincided. The output shaft 206 and the motor 208 are provided with a transmission device 230 for speed reduction, and the transmission device 230 is contained in a speed reduction box 232.

The handheld power tool 200 comprises a working component 20' movably connected to the housing 210; the working component 20' is pivoted relative to the main body 212. The pivoting axis Y2 of the working component 20' and the axis X2 of the output shaft are at an angle α. Two working chucks 22 and 24 of the working component 20' are fixedly connected and are symmetrically disposed on two sides of the pivoting axis Y2, the working chucks 22 and 24 are respectively provided with working shafts 22a and 24a, and central lines in an extending direction of the working shafts 22a and 24a are disposed at an angle β. The working chuck 22 is used for clamping a drill bit 220 and the working chuck 24 is used for clamping a screwdriver bit 240.

The main body 212 is provided with a sliding component, the sliding component comprises a control part movably disposed outside the main body 212 and a sliding part disposed in the main body 212. A transmission system is disposed between the control part and the working component 20', through the transmission system, the movement of the control part operably drives the working component 20' to pivot, and position mutual position of the two working chucks 22 and 24 is realized.

The transmission comprises a sliding part driven by a control part and a rotary part driven by the sliding part to rotate, one end of the sliding part is matched and connected with the output shaft 206, and the other end is selectively disengaged or matched and connected with one of the working chucks, and the rotary part is used for driving the working component 20' to pivot relative to the housing.

The control part 250 of the present embodiment can be movably disposed on the top of the main body 212 in a sliding cover manner, and the sliding part is movably disposed in the main body 212 in a manner of a sleeve 252. The rotary part 260 is driven by the sleeve 252 to rotate, wherein the sleeve 252 is fixedly connected to the control part 250 through a connecting part 251. The sleeve 252 is provided with a guiding groove 254 along the peripheral direction, the sleeve 252 and the output shaft 206 are in clearance fit, such that when the output shaft 206 is driven by the motor 208 to rotate, the sleeve 252 does not rotate along with the output shaft 206.

The output shaft 206 of the present embodiment comprises a first shaft 2061 and a second 2062, the first shaft 2061 is provided with a groove hole 206a, the second shaft 2062 is provided with a key tooth 206b, through the key tooth 206b and the groove hole 206a, the first shaft 2061 and the second shaft 2062 are movably matched and connected together, the first shaft 2061 rotates to drive the second shaft 2062 to rotate together, and the second shaft 2062 can linearly move relative to the first shaft 2061 along the output shaft axis X2. The first shaft 2061 and the second shaft 2062 are respectively provided with protruded shaft parts 2061a and 2062a in approximate middle positions in the extending direction, the rotary part 260 sleeves outside the protruded shaft parts 2061a and 2062a of the output shaft and is in clearance fit with the output shaft 206, and rotation of the output shaft 206 cannot drive the rotary part 260 to rotate.

The rotary part 260 comprises a gear part 263 and a support cover 264 fixedly matched and connected with the gear part 263, and positioning ribs 265 outwards protruded along the radial direction are disposed on the peripheral surface of the support cover 264. The periphery of the support cover 264 is further provided with a pair of positioning bearings 268 playing a supporting role, the positioning bearings 268 are meshed with the main body 212 such that the positioning bearings 268 can rotate but cannot move relative to the main body 212, the positioning bearings 268 are disposed on the same side of the positioning ribs 265, one of the positioning bearings 268 is abutted against the positioning ribs 265 so as to limit the rotary part 260 from moving relative to the main body 212, but the rotary part 260 can rotate relative to the main body 212.

The gear part 263 is set to be annular and sleeves the end part of the support cover 264, the support cover 264 and the annular gear part 263 are fixedly connected by a pin 267, and one end of the pin 267 extends into an annular hole 266 of the gear part 263 to be meshed with the guiding groove 254 of the sleeve 252.

The sleeve 252 is matched and connected on a connecting part 2062b of the second shaft 2062 through a snap ring 256, that is to say, the sleeve 252 is fixed between the protruded shaft part 2062a of the second shaft 2062 and the snap ring 256; when the control part 250 is in an initial position, the sleeve 262 is matched and connected with one of the working shafts 22a and 24a of the working chucks such that the motor 208 can drive a working chuck matched and connected with the sleeve 252. When the control part 250 drives the sleeve 252 to start moving from the initial position, the sleeve 252 drives the second shaft 2062 to move together relative to the first shaft 2061, the moving result is that the sleeve 252 is dis-matched and disconnected with one of the working shafts 22a and 24a at first, and the control part 250 further moves to enable the rotary part 260 to pivot around the axis X2 of the output shaft relative to the main body 212. Since the working component 20' is correspondingly provided with a gear part (not shown) in meshing transmission with the gear part 263, because of such structure, the rotary part 260 drives the working component 20' to rotate around the pivoting axis Y2 when rotating around the axis X2 of the output shaft.

Figure 14:
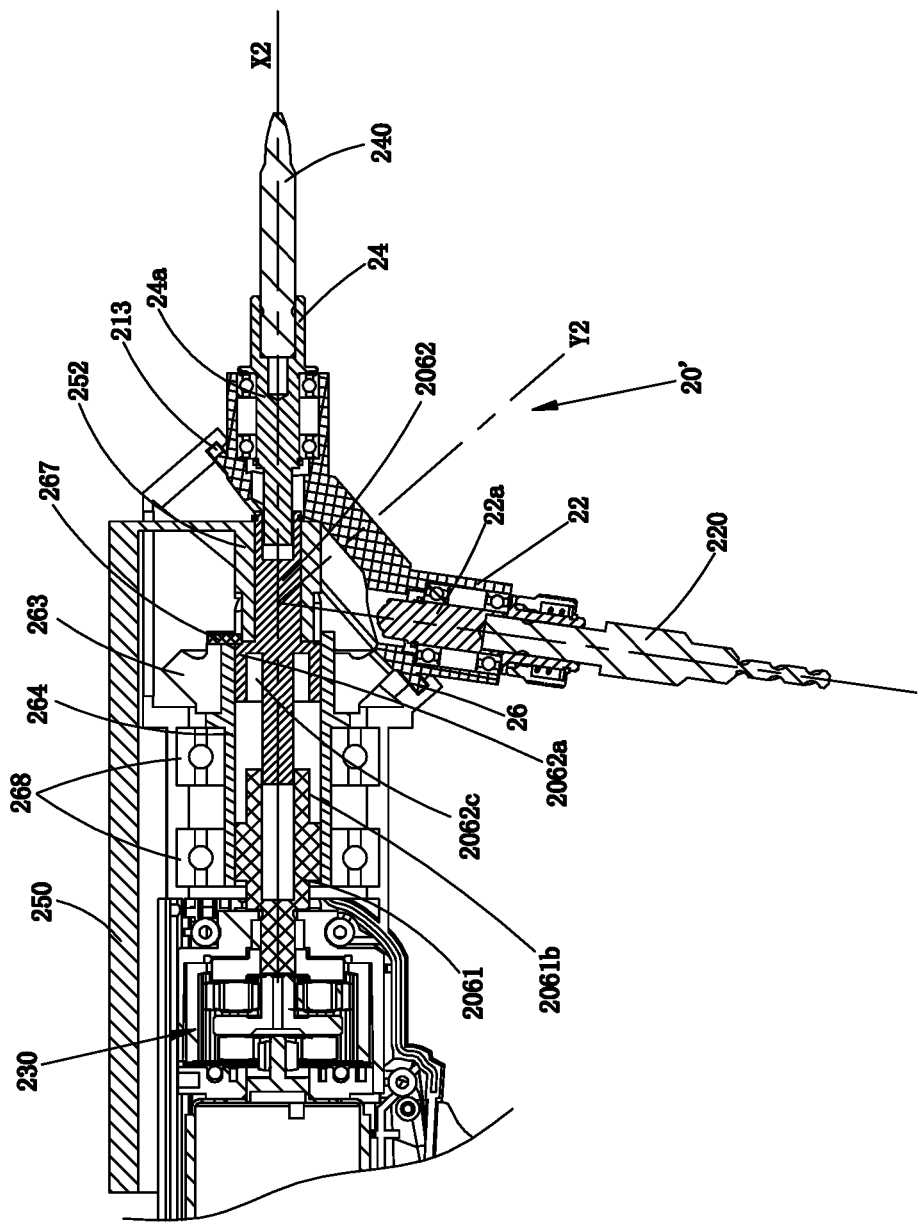
FIG. 14 is a section schematic diagram of a main view direction of the handheld power tool as shown in FIG. 12.

Referring to FIG. 14, the protruded shaft part 2062a of the second shaft 2062 of the output shaft is provided with an annular groove 208, which plays a role that the connecting part 2061b of the first shaft 2061 can extend into the annular groove 2062c when the second shaft 2062 moves and approaches relative to the first shaft 2061, because of such design, an extending length of the main body 212 can be reduced, the whole volume is reduced, the weight is reduced and the handheld power tool is lighter and easier to operate.

Figure 15:
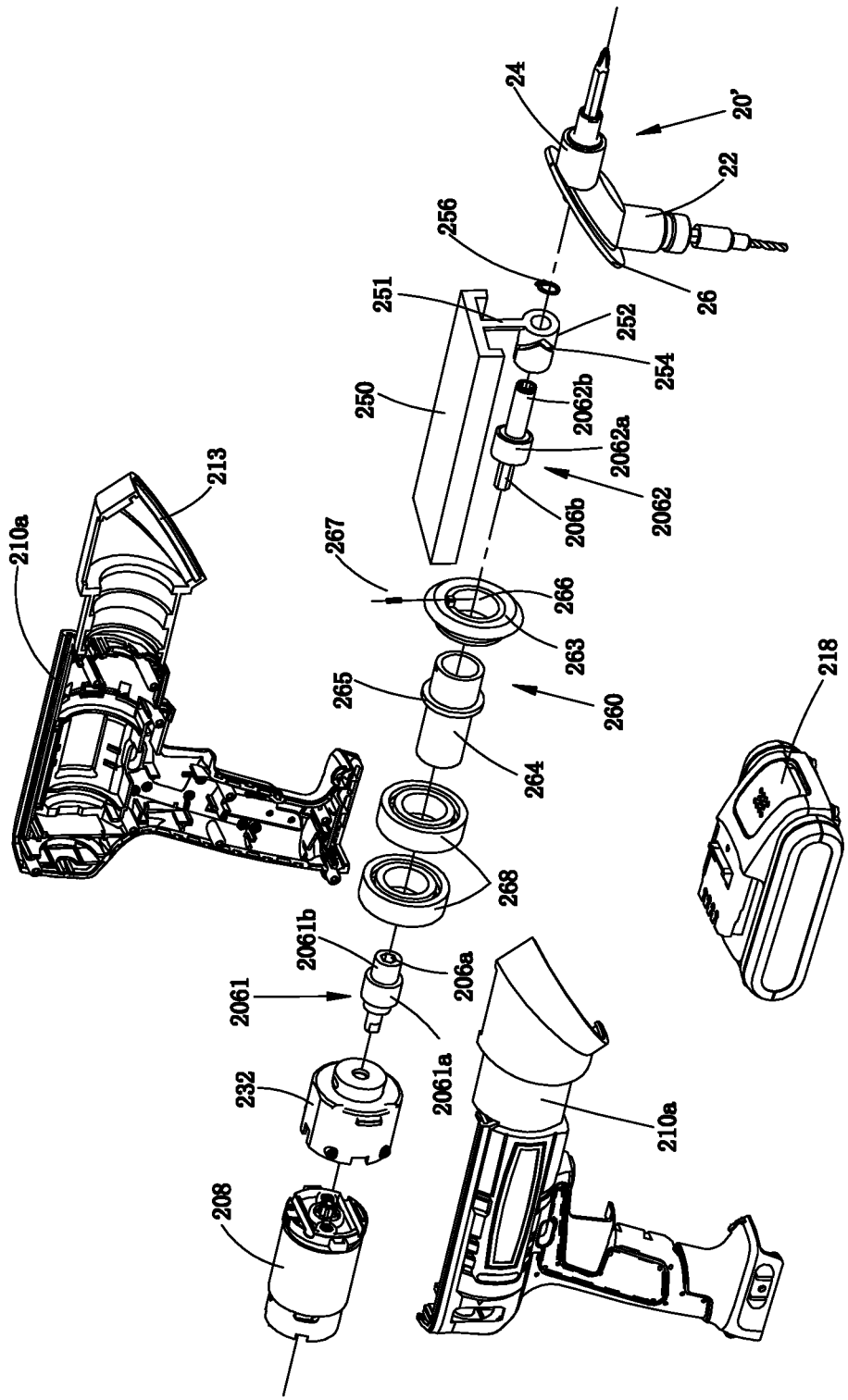
FIG. 15 is a stereoscopic exploded view of the handheld power tool as shown in FIG. 12.

Referring to FIG. 14 and FIG. 15, the part on the main body 212 close to the working component 20' is provided with an annular groove 213, the working component 20' is provided with a mounting plate 26 meshed and clamped in the guiding groove 213, and when the working component 20' rotates around the pivoting axis Y2, the mounting plate 26 rotates in the annular guiding groove 213, and such structure enables the rotation to be more flexible.

Figure 16:
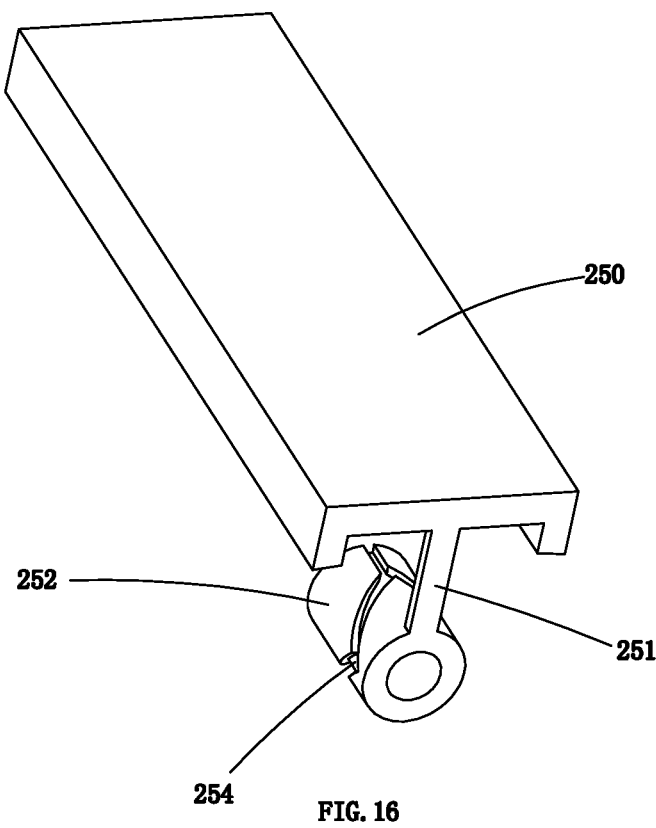
FIG. 16 is a stereoscopic schematic diagram of a sliding component in FIG. 15.
Figure 17:
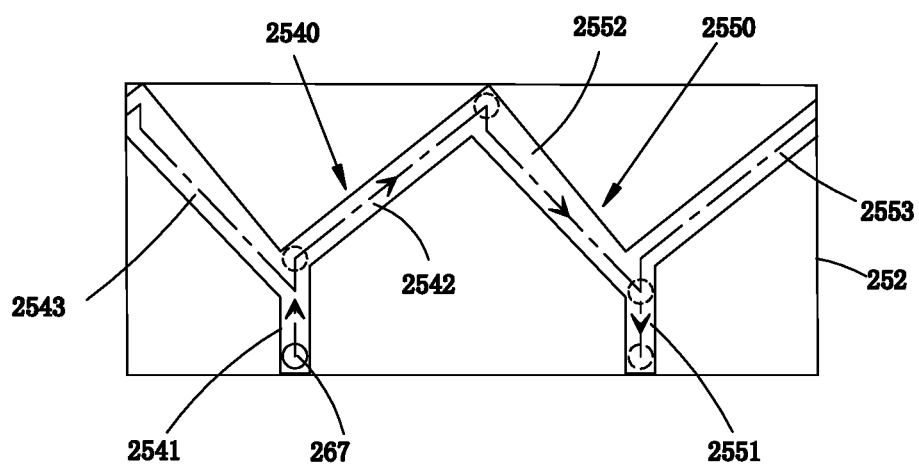
FIG. 17 is a structural schematic diagram after a sliding sleeve in FIG. 16 is flattened.

Referring to FIG. 16 and FIG. 17, the guiding groove 254 of the present embodiment consists of two parallel and communicated Y-shaped grooves 2540 and 2550. The first Y-shaped groove 2540 comprises a linear groove 2541 and chutes 2542 and 2543 extending to two sides from the linear groove 2541, the second Y-shaped groove 2550 comprises a linear groove 2551 and two chutes 2552 and a 2553 extending to two sides from the linear groove 2551. The extending tail end of the chute 2542 is communicated with that of the chute 2552, and the extending tail end of the chute 2553 is communicated with that of the chute 2543.

Figure 18:
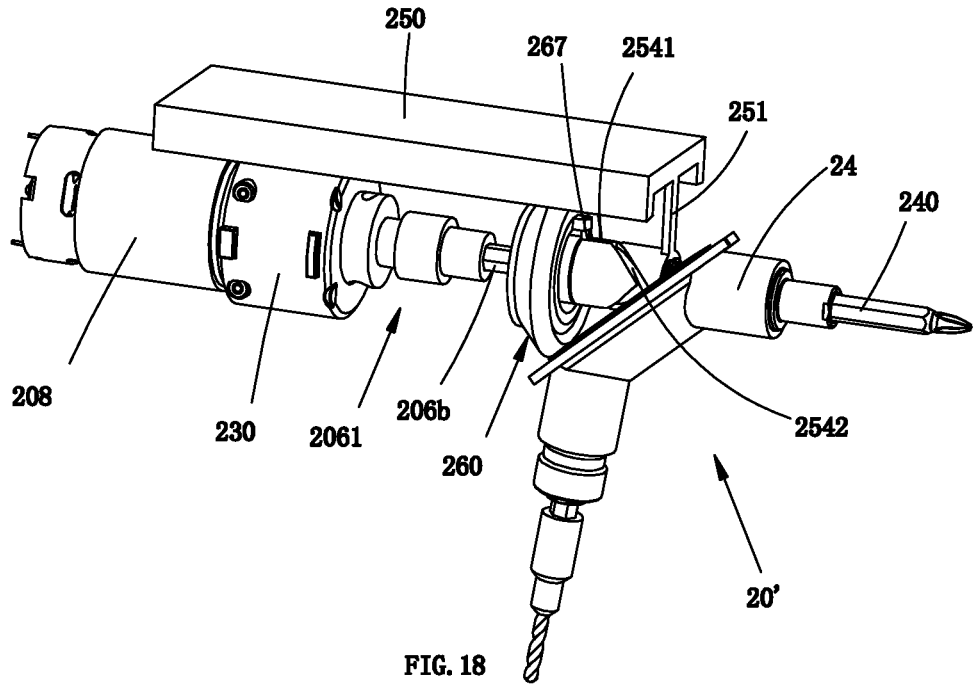
FIGS. 18 to 22 are state schematic diagrams that a control part of the handheld power tool of the second embodiment of the present invention moves to different positions.

Referring to FIG. 17 and FIG. 18, when the control part 250 is in the initial position, the pin 267 is meshed at the initial end of the linear groove 2541, at this point, the working chuck 24 is in a working position, that is, the sleeve 252 is matched and connected with the working shaft 24a of the working chuck 24 (referring to FIG. 14).

Figure 19:
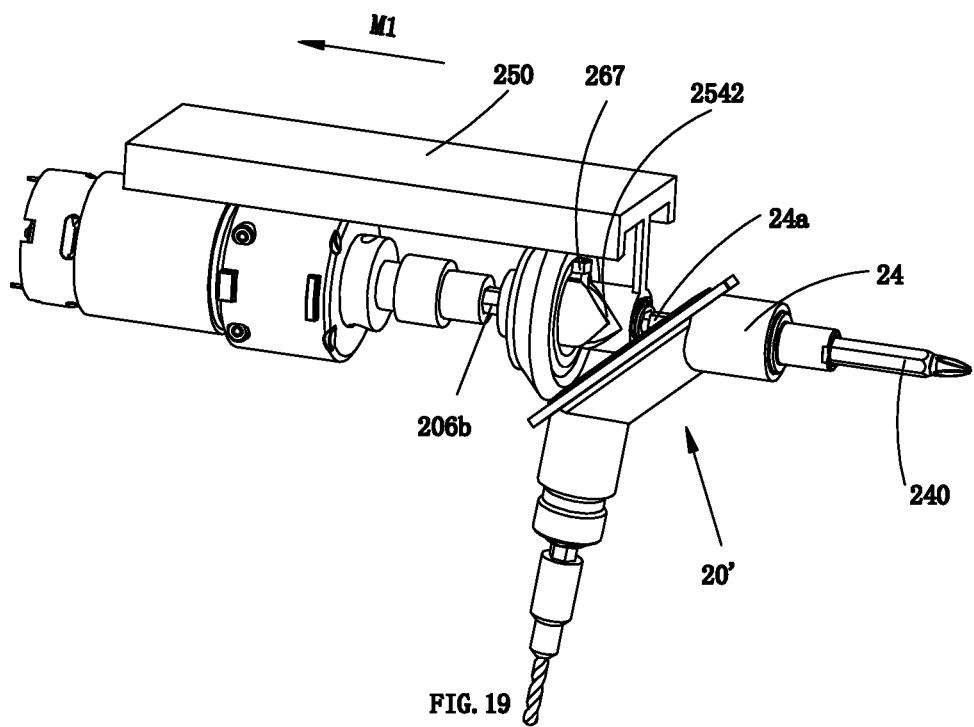

Referring to FIG. 17 and FIG. 19, when the control part 250 moves along the direction as shown by an arrow M1 and parallel with the axis of the output shaft, the sleeve 252 is driven to move, the pin 267 slides to the final end of the linear groove 2541 from the initial end of the linear groove 2541, when the pin 267 slides to the final end of the linear groove 2541, the sleeve 252 is dis-matched and disconnected with the working shaft 24a of the working chuck 24, and in this process, a driven 260 is kept still relative to the main body 212.

Figure 20:
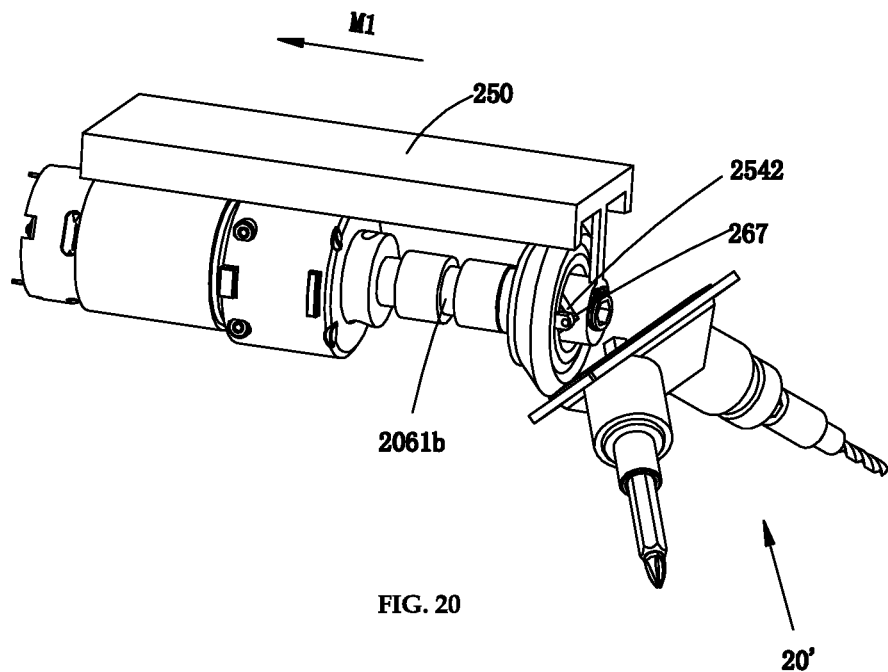
Figure 21:
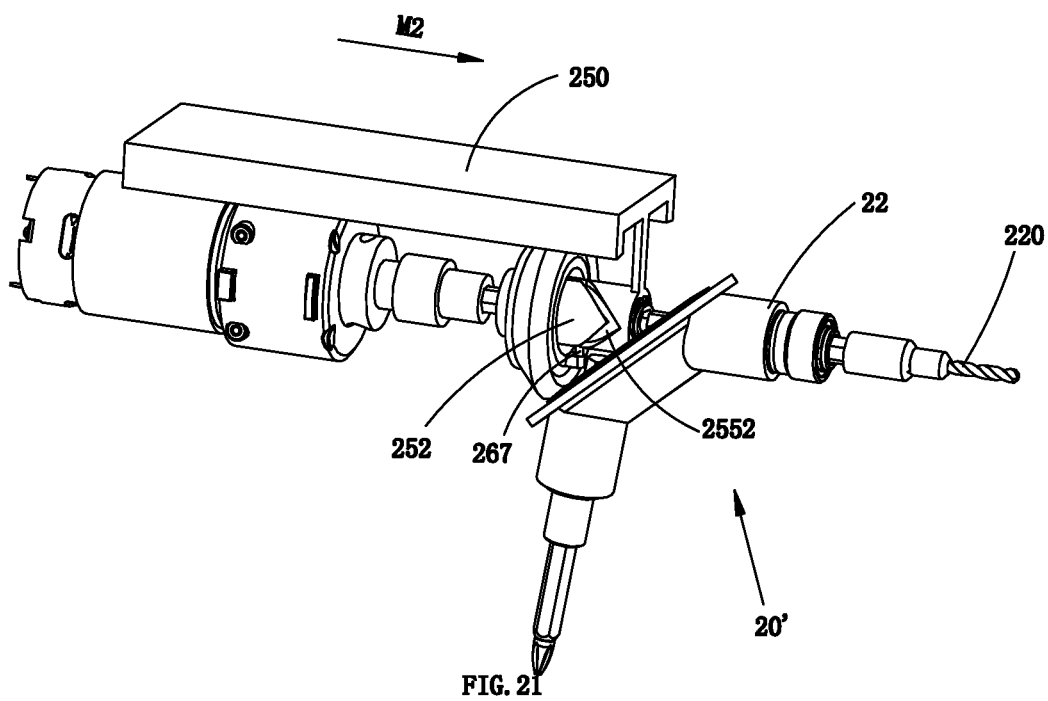

Referring to FIG. 17 and FIG. 20, the control part further moves to a limit position along the direction as shown by the arrow M1, the pin 267 slides into the chute 2542 at the final end of the linear groove 2541 and approaches to the final end of the chute 2542, and in this process, the sleeve 252 drives the rotary part 260 to rotate around the axis X2 of the output shaft. Since the sleeve 252 is dis-matched and disconnected with the working shaft 24a of the working component 20', the rotary part 260 drives the working component 20' to rotate around the pivoting axis Y2 through the gear part 263, in this process, the working component 20' rotates for 90 degrees around the pivoting axis Y2, while the control part 250 at this point has moved to the preset limit position where it can move relative to the main body 212.

Referring to FIG. 17 to FIG. 21, in order to rotate the working chuck 22 to the working position, the working component 20' needs to be further rotated for 90 degrees around the pivoting axis Y2. At this point, the control part 250 is moved along the direction opposite to the arrow M1, i.e., the direction shown by an arrow M2, the pin 267 slides into the chute 2550 at the final end of the chute 2542 and approaches to the final end of the chute 2550, the sleeve 252 drives the rotary part 260 to further rotate around the axis X2 of the output shaft, the working component 20' rotates for 90 degrees again around the pivoting axis Y2, that is, the working component 20' rotates for 180 degrees in total around the pivoting axis Y2, and the working chuck 22 rotates to the working position.

Figure 22:
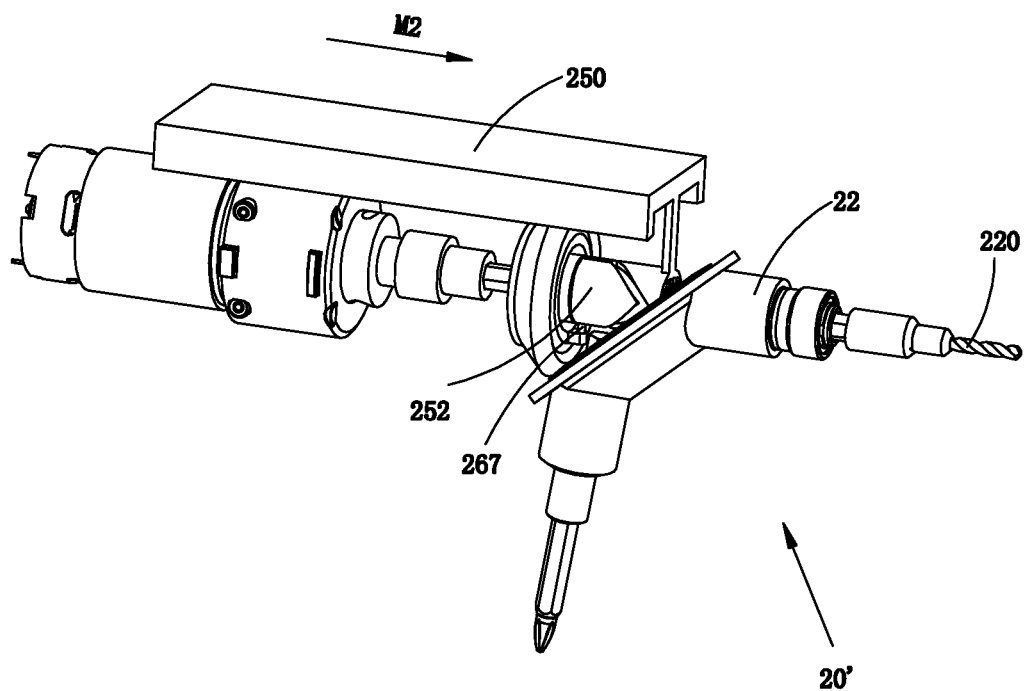
Figure 23:
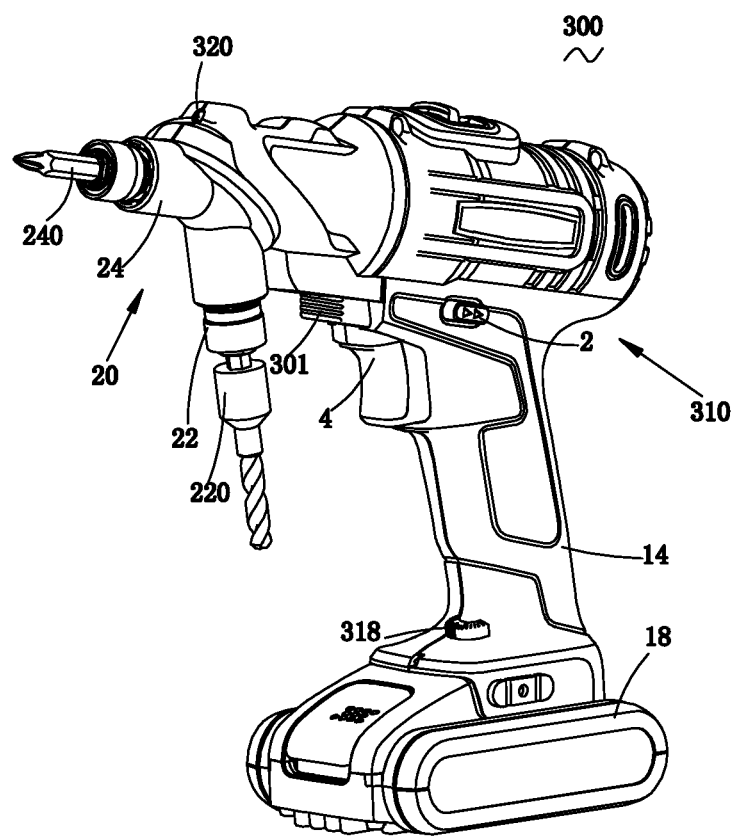
FIG. 23 is a stereoscopic schematic diagram of a handheld power tool of a third embodiment of the present invention.

Referring to FIG. 17 and FIG. 22, when moving along the direction as shown by the arrow M2 and parallel with the axis of the output shaft, the control part 250 is moved to return to the initial position, the pin 267 slides into the linear groove 2551 at the final end of the chute 2550 and approaches to the final end of the linear groove 2551, at this point, the sleeve 252 moves to the initial position along with the control part 250, the sleeve 252 is matched and connected with the working shaft of the working chuck 22, and in this process, the driven part 260 is kept still relative to the main body 212.

In conclusion, when the control part 250 moves in a reciprocating manner for one time in a direction parallel with the axis of the output shaft, the at least two work heads of the working component 20' are converted in different positions. Those skilled in the art can conceive that the control part 250 moves to the limit position from the initial position along the axis of the output shaft and moves to the initial position from the limit position along the opposite direction such that the output shaft 206 is disengaged from one of the at least two working chucks 22 and 24, the other of the at least two working chucks 22 and 24 is pivoted to a position where it can be matched and connected with the output shaft 206. In the process that the control part 250 moves to the limit position from the initial position, the output shaft 206 is disengaged from one of the at least two working chucks 22 and 24a at first, and then the working component 20 is pivoted relative to the housing 10; in the process that the control part 250 moves to the initial position from the limit position, the working component 20 is pivoted relative to the housing 10, and the output shaft 206 is matched and connected with the other of the at least two working chucks 22 and 24.

Referring to FIGS. 23-33, the handheld power tool 300 of a third embodiment of the present invention is another transformation of the first embodiment. In order to facilitate expression, the similar structures are expressed by the same numbers and are not repeated, and different structures will be described in detail hereinafter.

Referring to FIGS. 23-26, the handheld power tool 300 comprises a control mechanism 330, which is used to lock a position of the working component 20 relative to the housing 310. Only when the control mechanism 330 removes locking of the working component 20, the working component 20 can rotate relative to the housing 310 around a pivoting axis Y3, such that the working chucks 22 and 24 are converted between a working position and a nonworking position, and when one of the working chucks 22 and 24 is in the working position where it is axially matched and connected with the output shaft 316, the other of the working chucks 22 and 24 is in a nonworking position where it forms an angle with the axial direction of the output shaft.

The housing 310 comprises a main body 312 longitudinally extending, a handle 14 connected to the min body 12, the working component 20 is movably disposed on one end of the main body 312, the motor 8 is disposed in the main body 312 away from the working component 20, the output shaft 316 longitudinally extends into the main body 312, and the axis X1 of the output shaft and the motor axis are coincided. The handheld power tool 300 is further provided with a working lamp 320, the working lamp 320 of the embodiment of the present invention is disposed on the part on the top of the main body 312 close to the working component 20, the working lamp 320 can is used for illuminating a working region in front of the handheld power tool 300 in a case of insufficient illuminating conditions, and the working lamp preferably adopts an LED lamp. In the present embodiment, the working lamp 320 is controlled by a switch 4 to work; and of course, the working lamp 320 can be independently controlled by other manners, and can be selectively opened according to working conditions.

Figure 25:
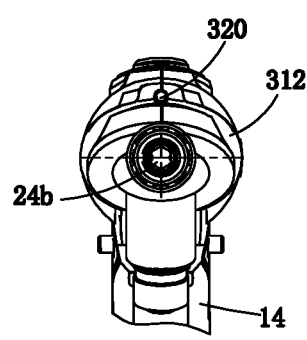
FIG. 25 is a local left view of the handheld power tool as shown in FIG. 24.
Figure 26:
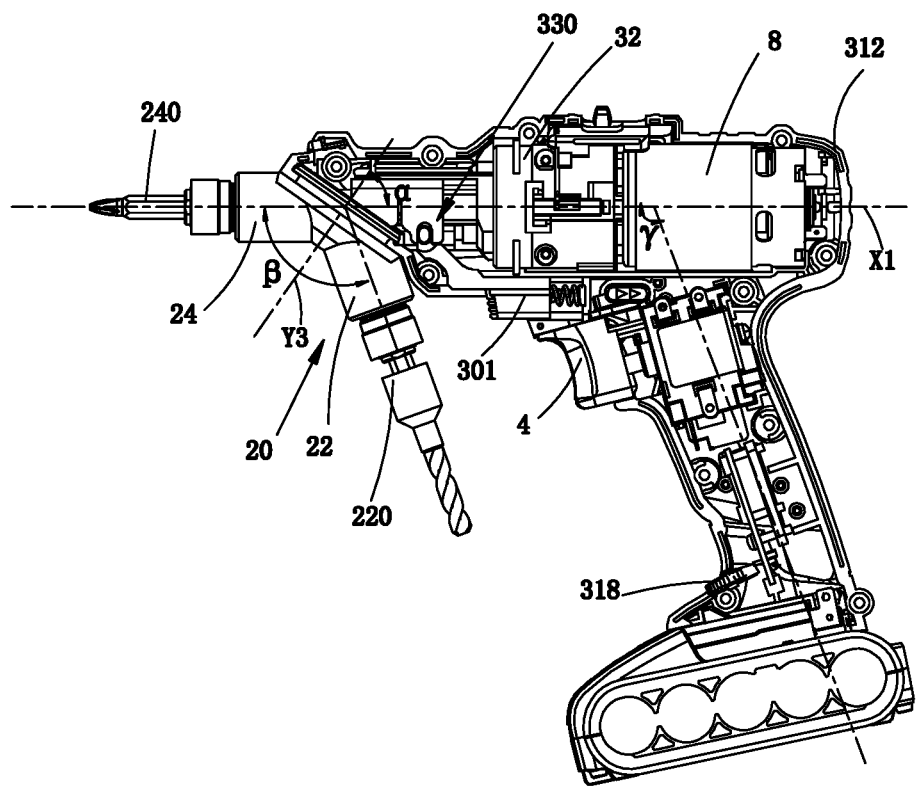
FIG. 26 is a section view of a main view direction of the handheld power tool as shown in FIG. 23.

One end of the handle 14 is connected to the main body 312, and the other end is connected to a battery pack 18. The working chucks 22 and 24 are respectively provided with working shafts 22a and 24a. Referring to FIG. 25, the working shafts 22a and 24a are respectively provided with hexagonal containing holes for being matched and connected with the work heads (only the containing hole 24b of the working shaft 24a is shown in the drawing), such that a screwdriver bit and a drill bit with a hexagonal handle can be fast mounted or detached, and a complex process of locking or releasing operation of a tri-jaw working chuck is avoided. The working chucks 22 and 24 are structurally improved, such that the integral structure of the working component 20 is more compact.

The handle 14 has a central line along an extending direction thereof, an included angle γ between the central line of the handle and the axis X1 of the output shaft is approximately same as β, that is to say, the axis of the working shaft of the working chuck 22 in the nonworking position and the central line of the handle are approximately parallel. By such disposing manner, a gravity ratio of the handheld power tool is more reasonable and more compact in structure.

By taking the free tail end of the working chuck 22 in the working position as an initial position of a whole machine length of the handheld power tool 300, and by taking the tail on the housing 310 away from the working chuck 22 as the final end position of the whole machine length L1, a distance between the gravity center G of the handheld power tool 300 to the free tail end of the working chuck 22 is L2, the distance L2 is about 5/10 to 8/10 of the whole machine length L1, preferably, the distance L2 is about 7/10 of the whole machine length L1, that is to say, the position of the gravity center G of the handheld power tool 300 is nearby the holding part of the handle 14, such that according to the handheld power tool, the wrist of an operator is prevented from generating a torque due to the approach of the gravity center to the working component 20 in an operation process of the handheld tool, and operation fatigue is reduced. The handheld electric power tool 300 of the present invention is light and easy to operate and convenient to carry.

In the present embodiment, the longitudinal axis of the main body 312 and the axis X1 of the output shaft are coincided, and the main body 312 comprises a main body portion containing a motor 8 and a speed reduction box 32 in the longitudinal extending direction, and a front end portion disposed close to the working component 20 and used to contain the control mechanism 330. The distance from the longitudinal axis to the top of the main body portion of the main body 312 is H1; the distance from the longitudinal axis to the top of the front end portion of the main body 312 is H2; when one of the working chucks of the working component 20 is in the working position, the distance between the longitudinal axis to the top of the working chuck in the working position is H3; then in the present embodiment, the distance H3 is smaller than distance H2, and the distance H2 is smaller than the distance H1. The housing height of the main body 312 is disposed in such manner such that when the work head contained in the working chuck executes work in smaller space or special angle, the accessibility of the work head relative to the workpiece is good, and the problem that the work head cannot enter the space due to the limitation of the volume or shape of a main enclosure is avoided.

The end part of the handle 14 close to the battery pack 18 is provided with a control button 318 controlling a torque, when the working chuck 24 is converted to the working position, the screwdriver bit 240 clamped in the working chuck 24 is used for executing bolt screwing work, and the output torque required by work execution of the screwdriver bit 240 can be adjusted by adjusting the control button 318.

Figure 27:
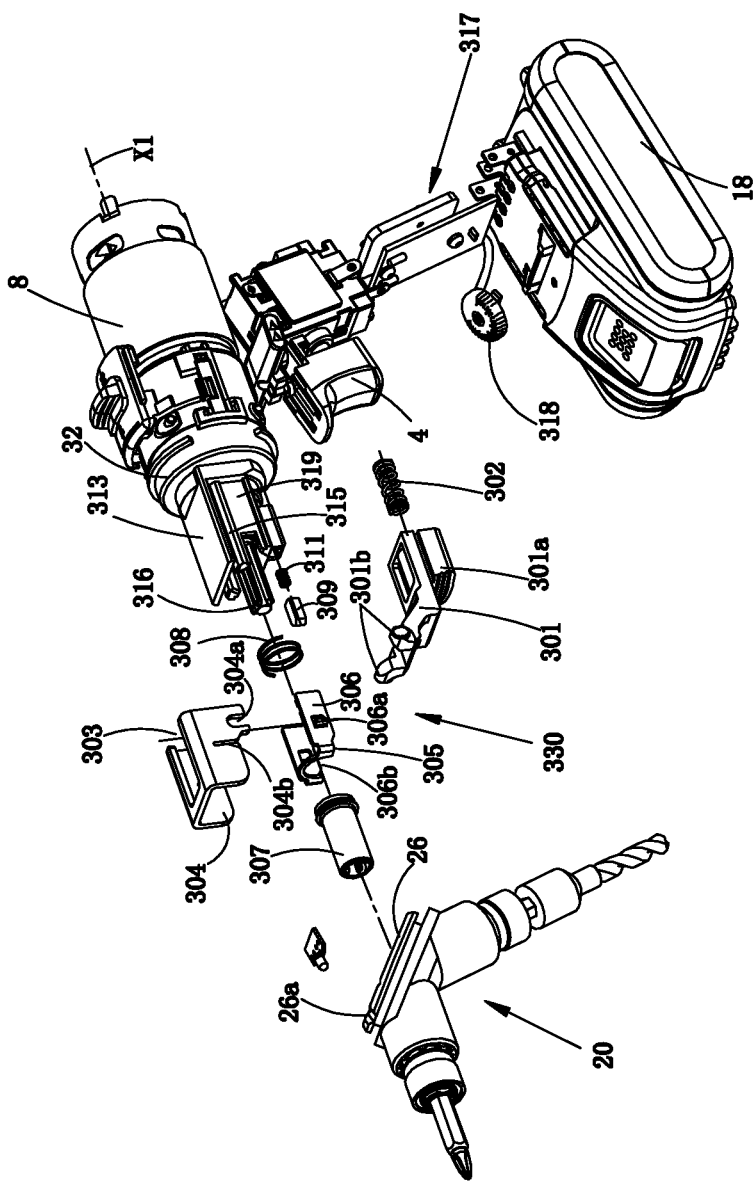
FIG. 27 is a stereoscopic exploded schematic diagram that a housing is removed from the handheld power tool as shown in FIG. 23.

Referring to FIG. 27, the control button 318 is electrically connected to a control panel 317 disposed in the handle 14, an adjustable resistor or capacitor is integrated in the control panel 317, the control button 318 is operated to change a resistance value or capacitance value, and the control panel 317 realizes torque adjustment through an electronic manner. Compared with conventional setting, that is, a mechanical device is disposed in the main body and the torque is adjusted mechanically, according to the manner for controlling the torque through an electronic manner of the present embodiment, the parts are less, therefore the structure is more compact, and the tool is lightweight; and by effectively using an internal space of the tool, the tool is smaller in size and more flexible to operate.

Referring to FIGS. 27-30, the control mechanism 330 comprises a control part 301 disposed on the handle 14 for manual operation and an elastic part 302 disposed between the control part 301 and the housing 310, wherein the elastic part 302 is elastically abutted against the control part 301, such that the control part 301 is kept in a locking position under normal state. The control part 301 is adjacent to the switch 4 and movably disposed relative to the housing 310, and specifically, a moving direction of the control part 301 is parallel with the axis X1 of the output shaft. The control part 301 comprises an unlocking button 301a exposed out of the housing 310 and a matching and connecting part extending into the housing 310. The matching and connecting part comprises a pair of connecting columns 301b. Specifically, the matching and connecting part is located between the switch 4 and the speed reduction box 32. The control part 301 moves along a direction away from the working component 20 to remove the position locking of the working component 20 and control the output shaft 306 to be dis-matched and disconnected with one of the working shafts 22a and 24a.

Because of such disposing manner of the control part 301, an operator can hold the handle 14 and control movement of the control part 301 simultaneously with the hand holding the handle 14, and the switch 4 is operated by the same one hand. While the other hand of the operator can execute other work such as position conversion of the working chucks 22 and 24 without the need of operation of frequently replacing both hands. In addition, the moving direction during unlocking of the control part 301 accords with an operation habit of the user, that is to say, the control part 301 is moved to a direction away from the working component 20, the position locking of the working component 20 relative to the housing 310 is removed, and the control part 301 moves to a direction close to the working component 20, such that the working component 20 is locked relative to the position of the housing 310.

The control mechanism 330 further comprises a locking part 303 driven by the control part 301, and a connector 305 driven by the locking part 303. The locking part 303 of the present embodiment is set into a double-end locking plate, one end surface of the double-end locking plate close to the working component 20 is set into an inverted U shape, and the double-end locking plate comprises a pair of side plates 304 extending along the direction of the output shaft and connected to each other. The inverted U-shaped end surface is selectively matched and connected or disengaged from the working component 20, when the U-shaped end surface is matched and connected with the working component 20, the working component 30 is locked on the enclosure 310; when the U-shaped end surface is disengaged from the working component 20, the elastic part 302 provides an elastic force for the control part 301 to drive the locking part 303 to approach to the working component 20, and the working component 30 is released from the locking position; therefore, the position conversion of the working chuck can be performed by rotation around the pivoting axis Y3 relative to the enclosure 310. A clutch device in linkage and matched and connected with the connector 305 is disposed between the working component 20 and the output shaft 316; and the clutch device of the present embodiment is set to movably sleeve a clutch cover 307 on the output shaft 316. One end on the clutch cover 307 close to the output shaft 316 is provided with a reset spring 308, and one end of the clutch cover 307 away from the output shaft 316 is selectively axially matched and connected with or disengaged from one of the working shafts 22a and 24a.

The side plates 304 are respectively provided with containing grooves 304a, and the containing grooves 304a are oppositely disposed and are used to be respectively matched and connected with the collecting columns 301b of the control part 301. The side plates 304 are further provided with a pair of clamping grooves 304b oppositely disposed. The connector 305 is contained in a space formed by the locking part 303 and is matched and connected together with the locking part 303. Specifically, the connector 305 comprises a pair of side arms 306 and a cross arm connected to the side arms 306; the side arms 306 are located on the inner side of the pair of side plates 304 and is parallel with the side plates 304, the cross arm is approximately vertical to the side arms 306, the cross arm is provided with a U-shaped notch 306b matched and connected with the clutch cover 307, the side arms 306 are respectively provided with clamping parts 306a which are transversely protruded outwards, and are used for being matched and connected with the clamping grooves 304b of the side plates 304.

The control part 301, the locking part 303, the connector 305 and the clutch cover 307 of the control mechanism are connected in such a manner, so that when an operator overcomes the action force of the elastic part 302 and the reset spring 308 to push the control part 301 to enable the same to slide to an unlocking position to a direction away from the working component 20, the control part 301 drives the double-end locking plate to move in parallel with the output shaft 316, while moving, the double-end locking plate drives the connector 305 to move along the same direction, such that the clutch sleeve 307 is driven on the output shaft 316 to slide to a direction away from the working component 30 to be dis-matched and disconnected with one of the working shafts 22a and 24a. When the clutch cover 307 slides to a position where it is disengaged from one of the working shafts 22a and 24a, the locking part 303 correspondingly moves to the position where it is disengaged from the working component 20. At this point, the operator pivots the working component 20 relative to the enclosure 310 to covert the positions of the working chucks 22 and 24.

Once the working chucks 22 and 24 finish position conversion, the operator releases the control part 310, when the position conversion of the working chucks 22 and 24 is finished, the control part 310 is automatically returned to the locking position under the action of the elastic part 302; at this point, under the action force of the reset spring 308, the clutch cover 307 is automatically returned to the position where it is matched and connected with one of the working shafts 22a and 24a, such that the working component 20 is locked relative to the position of the enclosure 310, and at this point, by triggering the switch 4, the motor is operated to drive the work head to execute corresponding work.

The control mechanism 330 is disposed in such manner that when the control part 301 is in the locking position, not only is the output shaft 316 matched and connected with one of the working shafts 22a and 24a, but also the locking part 303 locks the working component 20 relative to the position of the housing 310, such that when the work head executes specific work such as drilling or bolt screwing, shaking of the working component 20 relative to the housing 310 is avoided, and the working is more stable and more precise.

In order to fast realize position conversion of the working chucks 22 and 24 and correctly judge when the position conversion is in-place, the handheld power tool 300 is further provided with an in-place reminding mechanism. The in-place reminding mechanism of the present embodiment is disposed between the working component 20 and the housing 310 and has a meshing state and a separating state, during the meshing state, one of the at least two working chucks is in a working position, and during the separation state, the at least two working chucks are both in the nonworking position. The in-place reminding mechanism comprises a positioning pin 309 disposed on the housing, an elastic part 311 abutted against the positioning pin 309 and a positioning groove 26a disposed on the mounting plate 26 of the working component 20. The positioning pin 309 always keeps a trend of obliquely pressing the mounting plate 26 under the action of the elastic part 311. When the working component 20 is pivoted relative to the housing 310, once the position conversion of the working chucks 22 and 24 is in-place, the positioning pin 309 automatically slides into the positioning groove 26a from the mounting plate 26, such that the positioning pin 309 and the positioning groove 26a are matched and connected, and at this point, the working chucks 22 and 24 are basically located relative to the position of the enclosure 310. The positioning pin 309 of the present embodiment is made of a metal material, the working component 20 is made of a plastic material, therefore, when the positioning pin 309 slides into the positioning groove 26a under the action of the elastic part 311, a clear click sound can be heard to give an in-place hint to the operator, meanwhile, there is also a hand feel of in-place conversion, that is, the operator can feel that there is a counteraction force of the in-place reminding mechanism specific to a pivoting force applied to the working component 20. The positions of the positioning pin 309 and the positioning groove 26a in the present embodiment can be interchanged without being limited by the present embodiment.

By releasing the unlocking button 301a of the control part 301, the working component 20 is automatically locked under the action of the control mechanism 330 relative to the position of the housing 310. When the unlocking button 301a moves to an unlocking position, the position locking of the working component 20 relative to the housing 310 is removed, meanwhile, the output shaft 306 is disengaged from one of the working shafts, at this point, as long as the operator applies an action to the working component 20 to overcome the in-place reminding mechanism to disengage the positioning pin 309 from the positioning groove 26a, the working component 20 can be pivoted relative to the housing 310 to realize working position conversion. Of course, the positioning pin 308 and the working component 20 of the present embodiment are not limited to the listed materials and can be replaced with other materials. The number of the positioning groove 26a can be set to be matched with that of the working chucks, such that the positioning action can be realized when the first working chuck is converted to the working position. The position of the positioning groove 26a can be set to correspond to the positions of the working chucks 22 and 24, and can also be set according to a specific structure.

In order to enable the control part 301 to drive the locking part 303 and the connector 305 to stably synchronously move in a moving process, meanwhile, in order to effectively use an internal space of the housing, one end on the speed reduction box 32 close to the working component 20 is provided with a guiding device, that is, the guiding device is disposed on the front end of the speed reduction box 32. The guiding device comprises a guiding plate 313 extending along the axial direction and a pair of guiding columns 315 extending in parallel with the guiding plate 313; a clearance exists between the guiding plate 313 and the guiding columns 315, and the guiding plate 313 and the guiding columns 315 are located above the output shaft 316; the outer sides of the guiding columns 315 are respectively provided with grooves 319 for containing the side arms 306 of the connector 305 (only one is shown in FIG. 25). When the control part 301 is in the locking position, the locking part 303 is located below the front part of the guiding plate 313. The operating part 301 operably drives the locking part 303 to move in the clearance while driving the connector 305 to sliding in the groove 319. By this disposing manner, the control mechanism 330 is more reliable and stable in structure.

Figure 28:
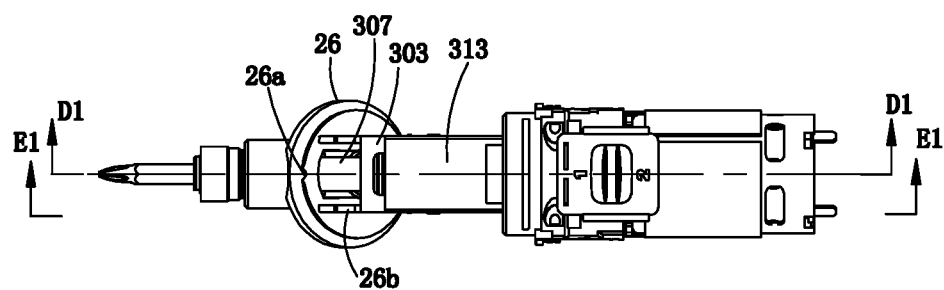
FIG. 28 is a top view after a housing is removed from the handheld power tool as shown in FIG. 23, and at this point, the control part is in a locking position.
Figure 29:
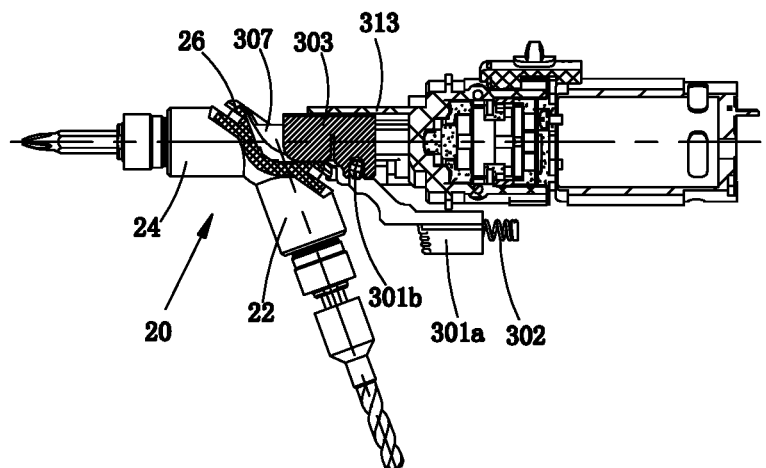
FIG. 29 is a section view of a D1-D1 direction in FIG. 28.
Figure 30:
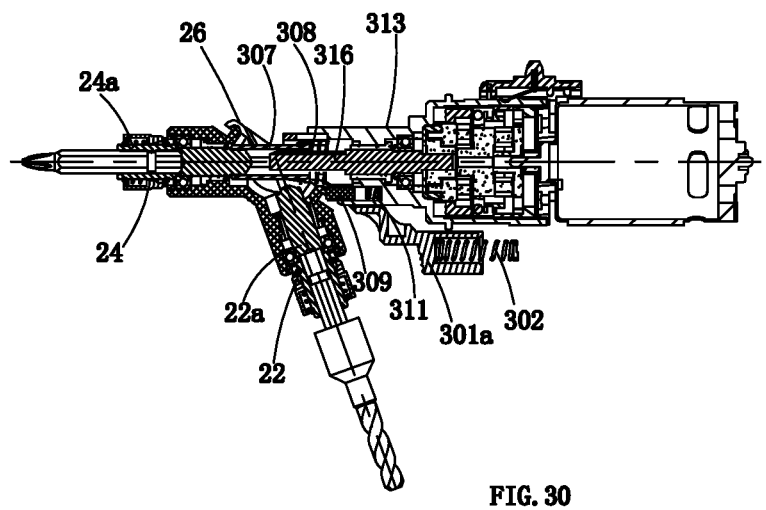
FIG. 30 is a section view of an E1-E1 direction in FIG. 28.
Figure 31:
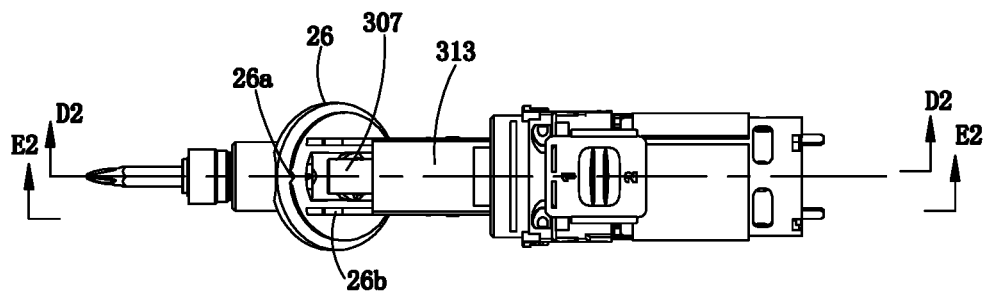
FIG. 31 is a top view after a housing is removed from the handheld power tool as shown in FIG. 23, and at this point, the control part is in an unlocking position.
Figure 32:
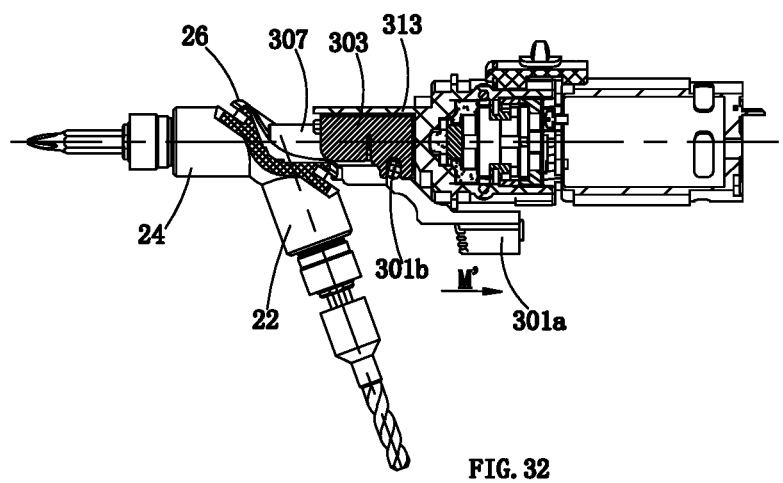
FIG. 32 is a section view of a D2-D2 direction in FIG. 31.
Figure 33:
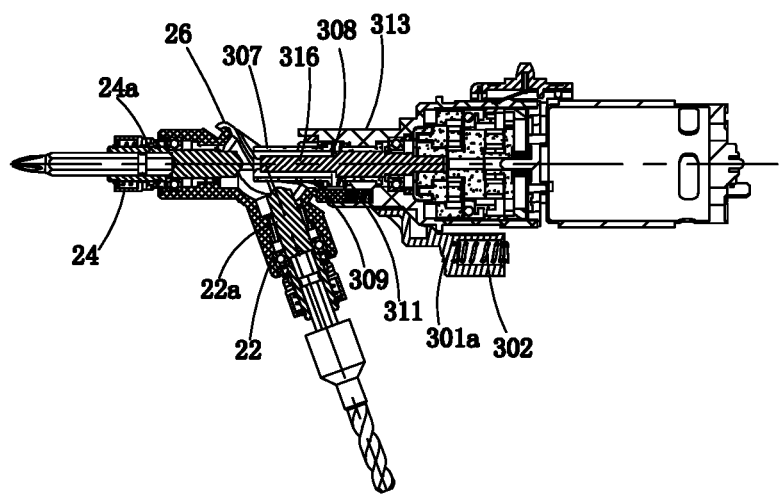
FIG. 33 is a section view of an E2-E2 direction in FIG. 31.

Referring to FIG. 28, the mounting plate 26 is provided with a locking groove 26b, and when the control part 301 is in the locking position, the locking part 303 is matched and locked with the locking groove 26b. In the present embodiment, the end parts of a pair of parallel side plates 304 of the double-end locking plate are respectively meshed in the locking groove 26b, such that the working component 20 is locked in the housing 310; in order to reduce the mechanism size and effectively use the space, an acting surface between the locking groove 26b and the locking part 303 is disposed above the control part 301 and below the axis X1 of the output shaft.

Referring to FIGS. 30-33, when the control part 301 is pushed by overcoming the action force of the elastic force 302 and the reset spring 308 along the direction shown by the arrow M' and parallel with the output shaft 316, the control part 301 can slide to an unlocking position, at this point, the locking part 303 is moved to be just below the guiding plate 313. Movement of the control part 301 drives the locking part 303 and the connector 305 to move along corresponding directions, such that the clutch cover 307 is dis-matched and disconnected with one of the working shafts 22a and 24a, meanwhile, the locking part 303 is dis-matched and disconnected from the working component 20, and specifically, a pair of parallel side plates 304 of the double-end locking plate are demeshed with the locking groove 26b. At this point, the operator pivots the working component relative to the housing 310 to convert the positions of the working chucks 22 and 24. Once the position conversion of the working chucks 22 and 24 is finished, the in-place reminding mechanism will give a clear sound or a handfeel of in-place conversion occurs. The control part 310 is released and the control part 310 will be automatically returned to the locking position under the action of the elastic part 302.

Figure 34:
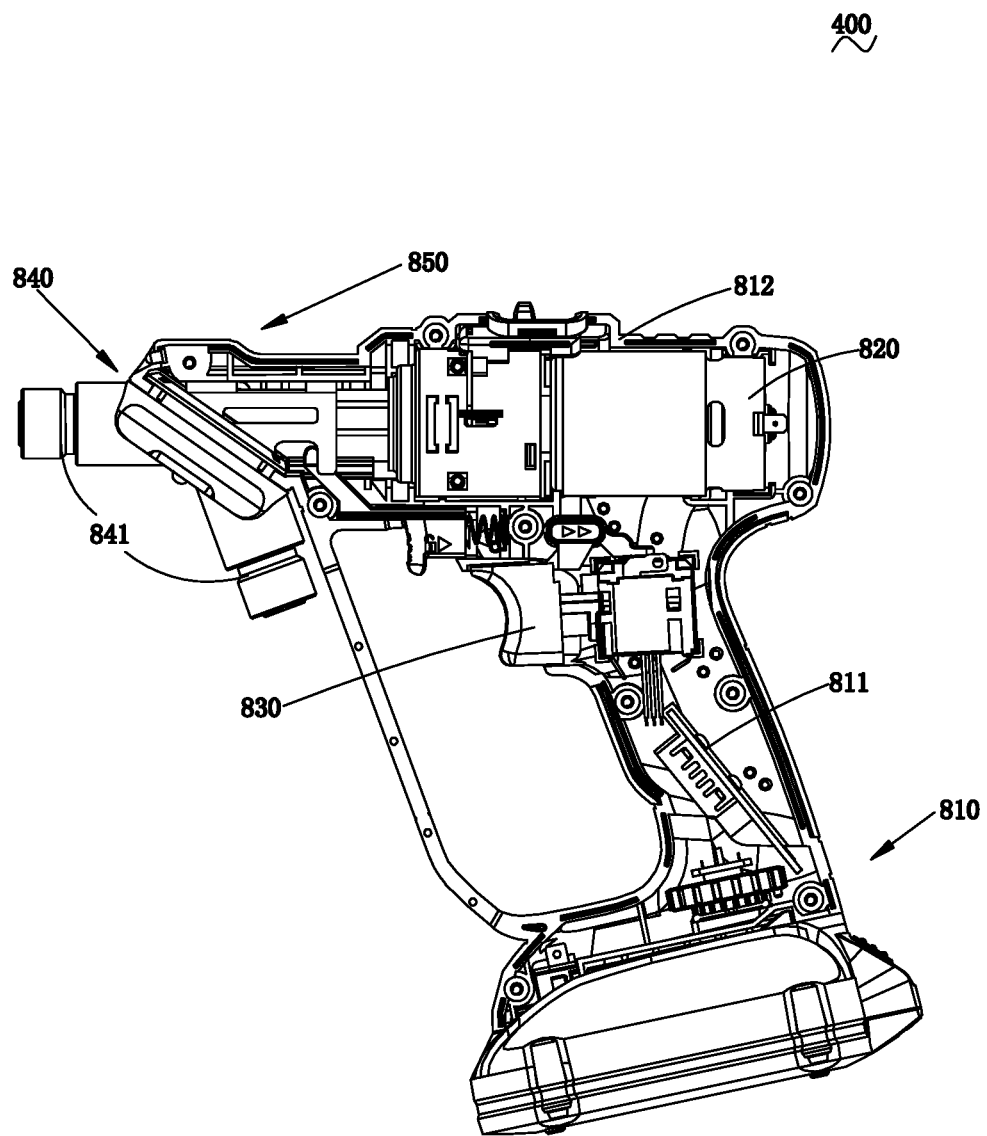
FIG. 34 is a schematic diagram of an integral structure of a handheld power tool of a fourth embodiment of the present invention.
Figure 35:
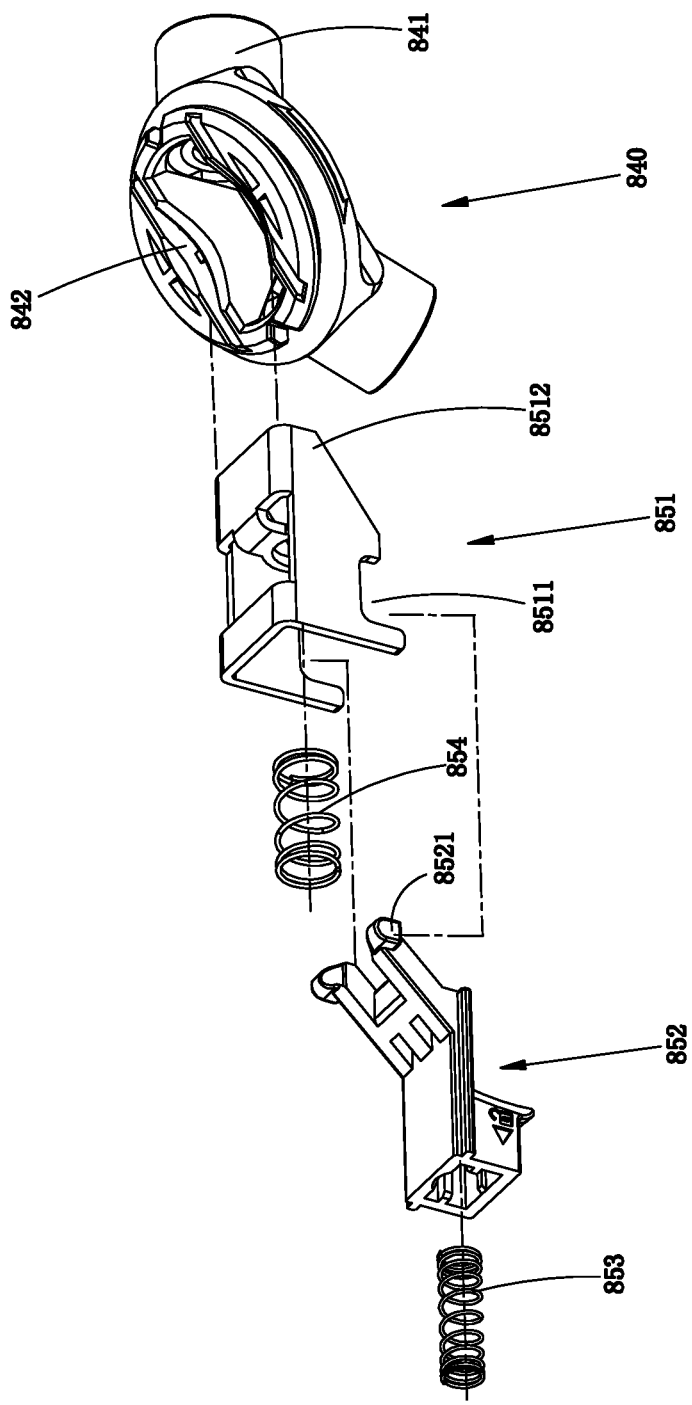
FIG. 35 is a stereoscopic exploded schematic diagram of a control mechanism in FIG. 34.

A handheld power tool 400 disclosed by a fourth embodiment of the present invention is an electric drill, referring to FIGS. 34 and 35, the handheld power tool comprises a housing 810, a drive mechanism 820, a switch 830, a working component 840 and a control structure 850; the drive mechanism 820 is disposed in the housing 810, wherein the housing 810 comprises a handle 811 and a main enclosure 812, the handle 811 and the main enclosure 812 are disposed at an angle, the handle 811 in the present embodiment is approximately vertical to the main enclosure 812, but the present invention is not limited thereto. The drive mechanism 820 comprises an electromotor and an output shaft 821, and the electromotor drives the working component 840 to work by the output shaft 821. The switch 830 is used to control the electromotor to work, besides the switch 830 can be disposed in a position close to the handle 811, thus it is favorable for an operator to control the electromotor to rotate by the switch 830 while holding the handle.

Figure 36:
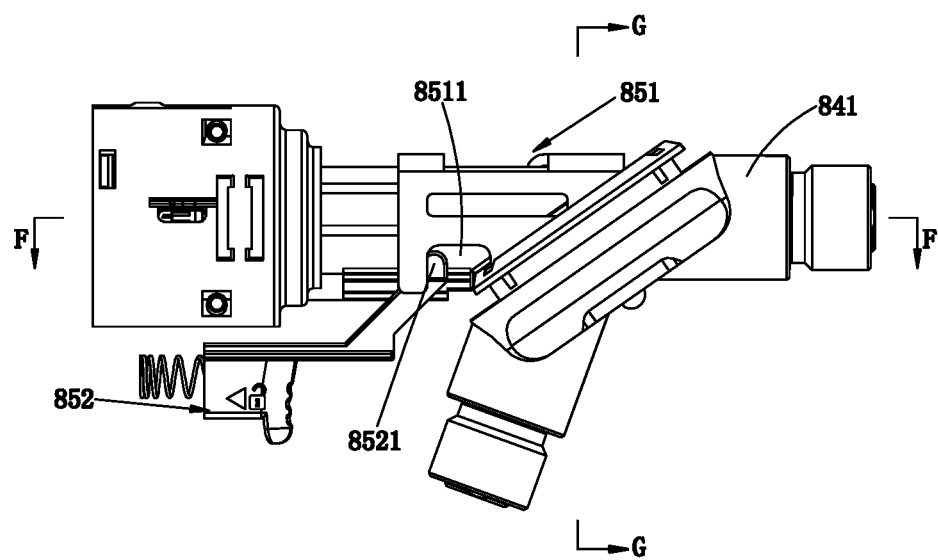
FIG. 36 is a side schematic diagram of the control mechanism in FIG. 34.

The working component 840 is located on one end of the main enclosure 812, the working component 840 is disposed in a pivoted manner relative to the main enclosure 812, the working component 840 comprises at least two working chucks 841, which are used to fix a work head, the working component 840 can be pivoted relative to the housing 810 to realize conversion of each working chuck between the working position and the nonworking position. Specifically, the working chucks 841 comprise working shafts 8411, when one of the working chucks 841 is in the working position, generally, as shown in FIGS. 36 and 37, the working shaft 8411 located in the working chuck 841 can be matched and connected with the output shaft 821 of the drive mechanism 820, such that the electromotor drives the working shaft 8411 to rotate by the output shaft 821, and further the work head fixed on the working chuck is controlled to rotate.

The control mechanism 850 can lock relative positions of the working component 840 and the housing 810, the control mechanism 850 comprises a locking part 851 and a control part 852, wherein the locking part 851 has a first position and a second position, the control part 852 has a third position and a fourth position, when the locking part is in the first position, the locking part 851 locks the position of the working component and enables the output shaft to be matched and connected with the working component, a worker can move the control part 852 from the third position to the fourth position by moving the control part 852 along a direction away from the working component, and further the locking part 851 in the first position is driven to move to a direction away from the working component, when the locking part 851 moves to the second position, the locking part 851 removes the position locking of the working component 840 and enables the output shaft to be dis-matched and disconnected from the working component; after the locking part 851 removes the position locking of the working component 840, the working component 840 can rotate relative to the housing 810, after the working component 840 rotates to a preset position, the locking part 851 can be automatically reset to the first position from the second position, and the working component 840 is subjected position locking again.

To be specific, the locking part 851 comprises a U-shaped notch 8511 and a limiting part 8512, wherein the notch 8511 is generally disposed in an edge position of the locking part 851, for the notch, the control part 852 has a bulge part 8521 located in the notch 8511 of the locking part 851, the worker can control the control part 851 to translate, such that the bulge part 8521 located in the notch 8511 is matched with the edge of the notch 8511, the control 852 moves to the fourth position from the third position, further the locking part 851 in the first position is driven to move to the second position along a direction away from the working component, wherein the limiting part 8512 is used to limit the rotation of the working component 840 relative to the housing 810, generally, a moving direction of the control part 852 is parallel with the output shaft, to be more specific, the working component has at least one limiting groove 842, disposed corresponding to the position of the limiting part 8512, when one of the working chucks 841 of the working component 840 is in the working position, the limiting part 8512 of the locking part 851 in the first position is located in the limiting groove 842, such that the position of the working component 840 is locked, at this point, the working shaft of the working chuck 841 in the working position can be matched and connected with the output shaft of the drive mechanism 820, such that the electromotor of the drive mechanism 820 can drive the working shaft in the working chuck 841 to rotate by the output shaft, and further, the work head connected to the working chuck 841 is driven to work. When a worker controls the control part 852 in the third position to move to the fourth position to the direction away from the working component, the bulge part 8521 in the notch 8511 can be matched with the edge of the notch 8511, the locking part in the first position is driven to move to the second position along a direction away from the working component, such that the limiting part 8512 is separated from the limiting groove 842, further the working component 840 can rotate relative to the housing, at this point, the output shaft of the drive mechanism 820 is dis-matched and disconnected from the working shaft in the working chuck 841, and the electromotor cannot drive the working shaft to rotate by the output shaft.

Next, after the limiting part 8512 is separated from the groove 842, the worker cannot control the control part 852, the control part 852 in the fourth position can be automatically reset to the original third position, specifically, the control mechanism 850 comprises a first elastic part 853 connected to the control part 852 and used to provide an elastic force for the control part 852. A reserved space exists between the bulge part located in the notch 8511 and the notch 8511, and the reserved space is sufficient to enable the control part 852 in the fourth position to be freely reset to the third position without being limited by the locking part 851. Thus, after the control part 852 separates the limiting part 8512 of the locking part 851 from the limiting groove 842, the worker can control the working component 840 to rotate relative to the housing 810, before one of the working chucks 840 of the working component 840 rotates to the preset position, since the limiting part 8512 cannot be aligned with the limiting groove 842, the locking part 851 in the second position cannot be reset to the first position, but because of the reserved space between the control part 852 and the notch 8511, the control part 852 may be not limited by the locking part 851, and can be freely reset to the third position from the fourth position.

Finally, when one of the working chucks 841 of the working component 840 rotates to the working position, the limiting part 8512 and the limiting groove 842 are aligned, besides, the locking part 851 uses the elasticity generated by connecting the second elastic part 854, such that the locking part 851 in the second position is reset to the first position, further the limiting part 8512 is located in the limiting groove 842, further position locking is realized again, at this point, as shown in FIG. 38, the output shaft 821 of the drive mechanism 820 is meshed with the working shaft 8411 of the working chuck 841 located in the working position, the drive mechanism 820 can drive the working shaft to rotate by the output shaft, and further the work head fixed on the working chuck 841 is enabled to work.

But in an actual operation process, even if one of the working chucks 841 of the working component 840 rotates to the preset working position, as shown in FIG. 38, since the working shaft 8411 of the working chuck 841 just cannot be meshed with the output shaft 821 of the drive mechanism 820 because of interference, as a result, the locking part 851 in the second position cannot be reset to the first position, but even so, the control part 852 can be reset to the third position from the fourth position, the worker only needs to control the output shaft of the drive mechanism 820 to rotate by the switch 830 according to the original steps, then the output shaft can be automatically meshed with the working shaft of the working chuck 841, such that the electric drill 400 is in a normal working state.

Of course, except that the locking part 851 is matched with the control part by the notch to enable the control part to control the locking part to move, the locking part 851 can be provided with a chute at one side, the bulge part 8521 of the control part 852 is in the chute, the bulge 8521 is matched with the edge of the chute, the locking part 851 is pulled to move, after the position locking of the working component 840 is removed, the control part can be automatically reset in the chute by using the bulge part 8521, and an implementing mode is not limited as long as it can realize essential content of the present invention.

The control part 852 can be freely reset, even if since one of the fixing parts 841 of the working component 840 rotates to the preset position in an actual operation process, and the working shaft in the fixing part 841 is not totally meshed with the output shaft of the drive mechanism 820, the locking part cannot be reset, the reset of the control part 850 will not be affected, thus the misunderstanding that the work head is not converted in place cannot be brought to the worker. Referring to FIG. 39, as long as the worker controls the output shaft 821 of the drive mechanism 820 to rotate by the switch, then the output shaft 821 will be meshed with the working shaft of the fixing part 841 in the working position without affecting normal work of the electric drill.

Because of such disposing manner of the control part 852 of the present embodiment, the operator can operate the handheld power tool with one hand. That is to say, the operator uses the one hand holding the handle 811 to move the control part 852 simultaneously to realize unlocking, and the user uses other body parts or external devices to realize position conversion work of the two working chucks 841 of the working component 841, such that the working component 840 is locked in position relative to the housing 810, even if the working shaft and the output shaft are not matched and connected in place, that is to say, the working shaft 8411 is dis-matched and disconnected from the output shaft 821 at this point, the control part 852 can be automatically reset under the action force of the elastic part. Relative to prior art, in the position conversion process of the two working chucks on the working component, the working component easily rotates to a position relative to the housing to be locked, but the case that the working shaft and the output shaft are not matched and disconnected in place easily occurs, at this point, the control part 852 cannot be normally reset and needs to be repeatedly operated by the operator till the working shaft and the output shaft are matched and connected in place, and such operation is troublesome.

In an operation process of the power tool of the present embodiment, the operator firstly unlocks the control part 852 with the one hand holding the handle 811, then rubs the working component 841 with the leg or the external device, such that the working component 841 is rotated to the locking relation relative to the position of the housing 810, then the control part 852 can be released, while when the operator retriggers the switch to rotate the output shaft 821, the output shaft 821 will be meshed with the working shaft of the fixing part 841 in the working position and the control part 852 will be automatically reset.

Figure 40:
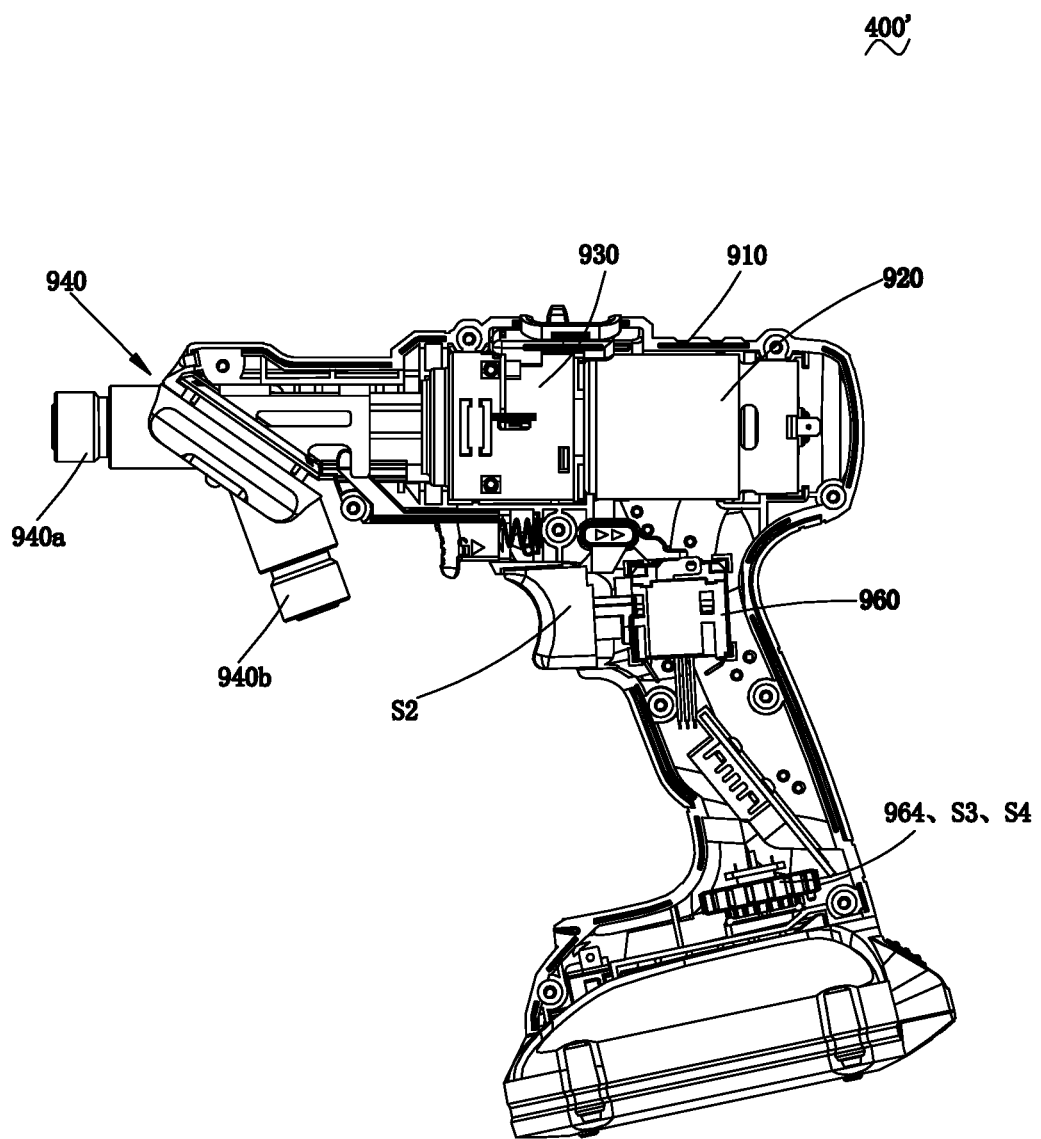
FIG. 40 is a schematic diagram of a handheld power tool of a fifth embodiment of the present invention.

Referring to FIG. 40, the handheld power tool 400' of a fifth embodiment of the present invention, such as an electric drill or a screwdriver, has a structure similar to the former embodiment. In order to facilitate expression, the same structure is not repeated and different structures will be described in detail hereinafter.

For the handheld electric tool, such as the electric drill or the screwdriver, usually, the output torque needs to be limited to prevent the workpiece damage or motor burning up.

In the industry, a general electric drill or screwdriver is provided with a mechanical overload clutch between a cutter carrying part and an electromotor to limit the output torque. However, the mechanical overload clutch is larger in size and the precision of torque adjustment is lower.

There are still some electric drills or screwdrivers which adopt an electronic manner to limit torque output, since the torque of a permanent magnet-excited direct current motor is approximately in proportion with the electromotor current, and by limiting the electromotor current, the corresponding torque can be limited basically. Compared with the mechanical overload clutch, such manner has the advantages that the size is reduced and precision is improved to some extent. However, a user with less experience does not know how to set a proper target torque under different working conditions, and the set target torque is often overlarge or oversmall. If the set target torque is overlarge, then the workpiece is damaged, and if the set target torque is oversmall, then the workpiece cannot reach an expected position or depth, and it is very necessary to improve the existing handheld electric tool.

The handheld electric tool 400' comprises a housing 910, an electromotor 920 disposed in the housing 910, a transmission device 930 connected to the electromotor 920, a clamp 940 driven by the transmission device 930 to work, a power supply module 950 used for supplying power to the electromotor 920 and a control circuit 960 used to control the electromotor 920. The clamp 940 of the present embodiment comprises a first chuck 940a and a second 940b, wherein the first chuck 940a and the second chuck 940b respectively comprise a working shaft, and the working shafts are alternatively driven by the transmission device 930 to rotate. The first chuck 940a and the second chuck 940b can be used for clamping work heads of different types to execute work of different working conditions. For example, the first chuck 940a is used to clamp a drill bit, and the second chuck 940b is used to clamp a screwdriver bit. By such disposing manner, torque outputs required for the first chuck 940a and the second chuck 940b to correspond to different working conditions are also different. When the first chuck 940a or the second chuck 940b of the present embodiment is in the working position, the torque output of the working shaft can be controlled through an electronic manner.

Figure 41:
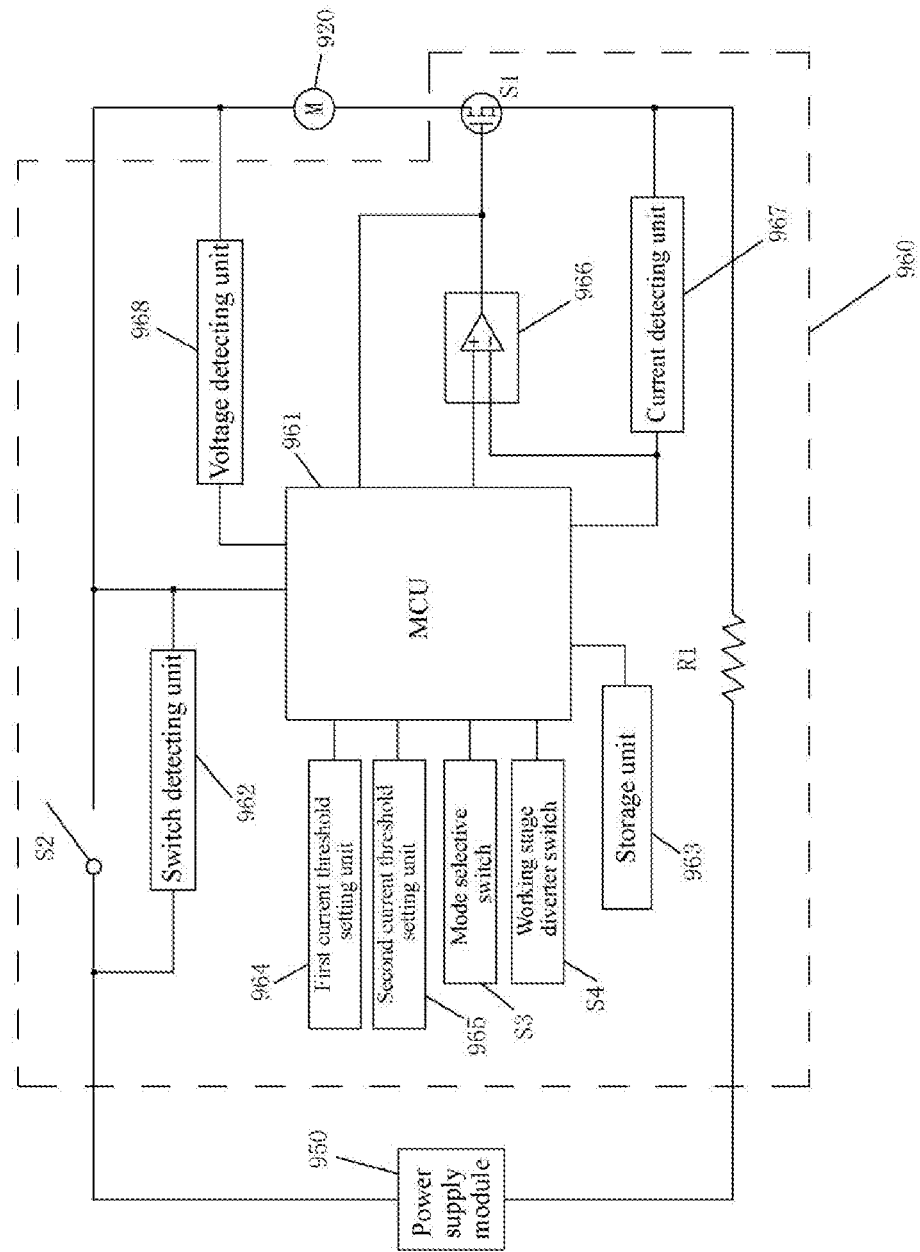
FIG. 41 is a circuit schematic diagram of the handheld power tool as shown in FIG. 40.

Referring to FIG. 41, the control circuit 960 has a controller 961, an electronic switch S1, an electromotor switch S2, a mode selective switch S3, a working stage diverter switch S4, a resistor R1, a switch detecting unit 962, a storage unit 963, a first current threshold setting unit 964, a second current threshold setting unit 965, a current limiting units 966, a current detecting unit 967 and a voltage detecting unit 968.

An anode of the electromotor 920 is connected to that of the power supply module 950 by the electromotor switch S2, and a cathode is connected to a first end of the electronic switch S1. A second end of the electronic switch S1 is connected to a first end of the controller 61, and a third end is connected to the cathode of the power supply module 950 by a resistor R1.

A second end of the controller 961 is connected to a node between the electromotor switch S2 and the electromotor 20, a third end is connected to the anode of the electromotor 920 by the voltage detecting unit 968, a fourth end is connected to the second end of the electronic switch S1 by the current limiting current 966, a fifth end is connected to a third end of the electronic switch S1 by the current detecting unit 967, a sixth end is connected to the first current threshold setting unit 964, a seventh end is connected to the second current threshold setting unit 965, an eighth end is connected to the mode selective switch S3, a ninth end is connected to the working stage diverter switch S4, and a tenth end is connected to the storage unit 963. In the present embodiment, the controller 61 is an MCU, and it outputs a first drive signal to the electronic switch S1.

The current limiting unit 966 is further connected to the current detecting unit 967. The first end of the switch detecting unit 962 is connected to the anode of the power supply module 950 and the second end is connected to the second end of the controller 961.

The handheld electric tool 400' of the present invention can work selectively under an artificial mode or automatic mode. Under the artificial mode, the user performs torque adjustment by the first current threshold setting unit 964 to obtain very high precision; under the automatic mode, the handheld electric tool 400' has a first working stage in which the current threshold is automatically set and a second working stage in which torque is limited according to the set current threshold, it is convenient for the user with less experience to operate the handheld electric tool 400', and the workpieces are enabled to reach a consistent depth.

The user can select the switch S3 according to needs to switch to the artificial mode or automatic mode. In the automatic mode, the working stage diverter switch S4 is operated to switch to a first working stage or a second working stage of the automatic mode.

In the present embodiment, the mode selector switch S3, the working stage diverter switch S4 and the first current threshold setting unit 964 can be triggered by the same triggering part, which is a toggle switch. When the toggle switch is toggled to different positions, different working modes, different working stages or different current threshold are triggered.

The artificial mode and automatic mode of the handheld electric tool 400' are respectively explained in combination with drawings.

Figure 42:
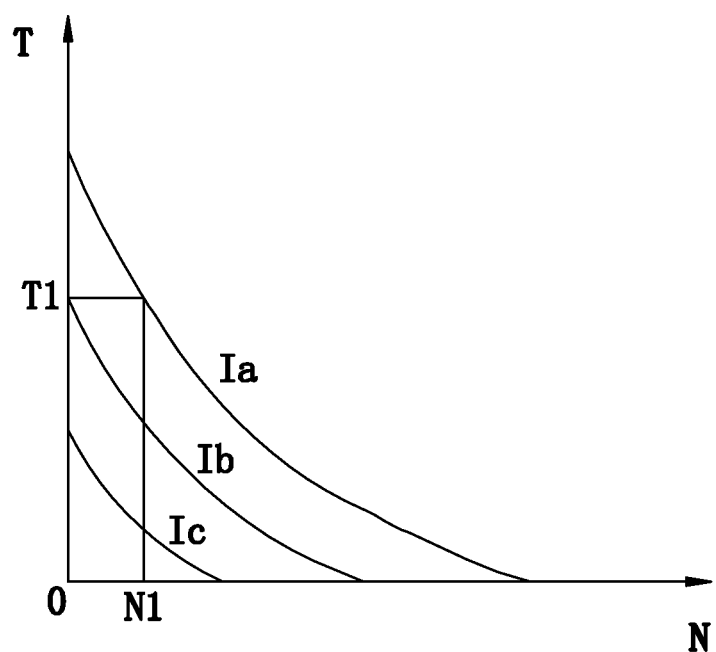
FIG. 42 is a diagram of a relation curve among a torque, an electromotor current and an electromotor rotary speed of the handheld power tool as shown in FIG. 40.

Referring to FIG. 42, a relation between an output torque T of the electromotor 920, an electromotor rotary speed N and an electromotor current is: when the electromotor current is a fixed value, the higher the electromotor rotary speed N is, the smaller the torque T is; when the electromotor rotary speed N is a fixed value, the larger the electromotor current is, the larger the torque T is; when the torque T is a fixed value, the larger the electromotor current is, the higher the electromotor rotary speed N is. Therefore in a case that the electromotor rotary speed N is determined, a corresponding relation exists between the torque T and the electromotor current, and by limiting the torque T of the electromotor 920 through limiting the electromotor current, the precision of torque adjustment will be greatly improved.

Figure 44:
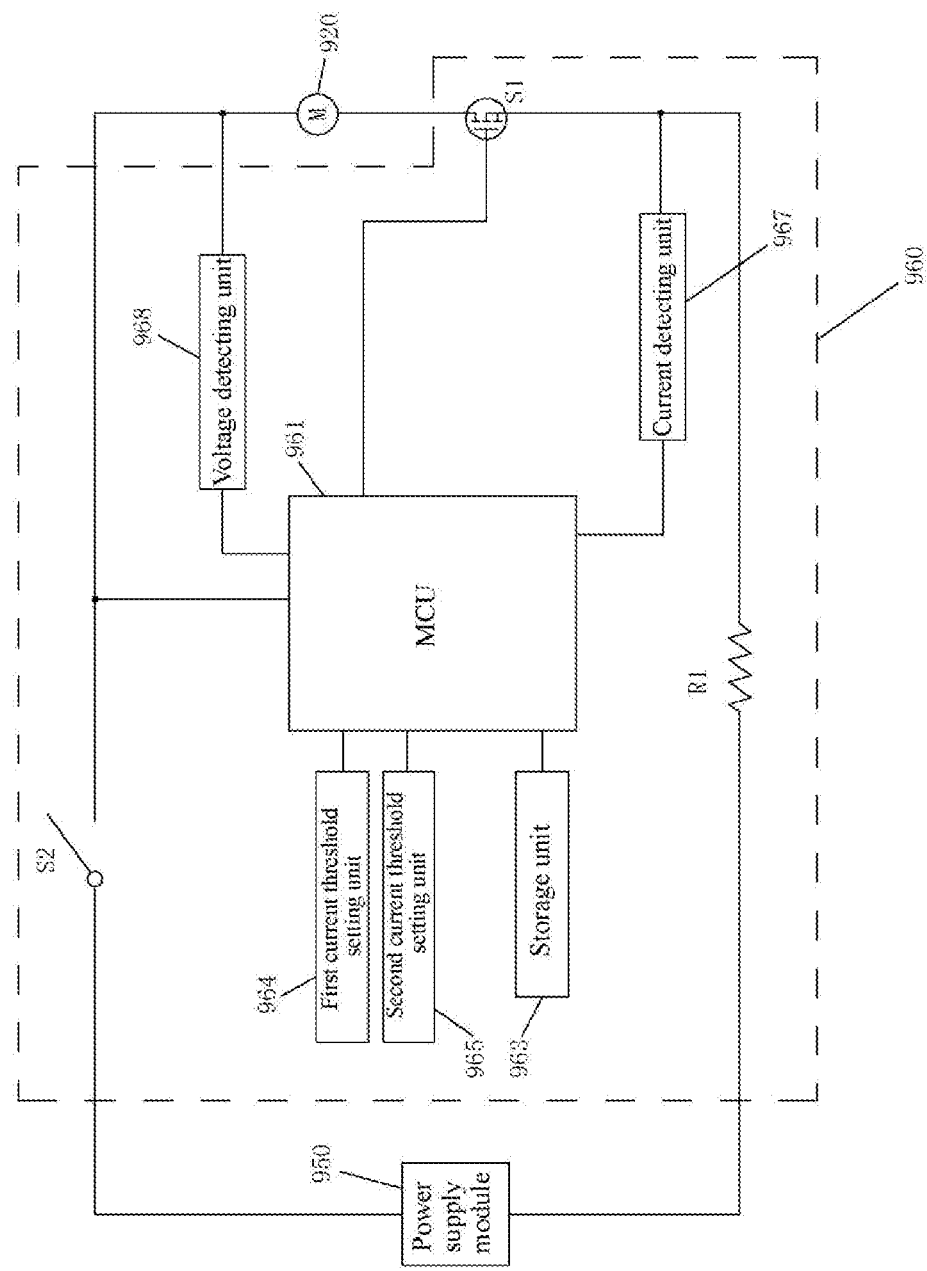
FIG. 44 is a circuit schematic diagram of a first preferred embodiment of an artificial mode of the handheld power tool as shown in FIG. 40.

Referring to FIG. 44, in the first preferred embodiment of the artificial mode of the handheld electric tool 400' of the present invention, the control circuit 960 has a controller 961, an electronic switch S1, an electromotor switch S2, a resistor R1, a voltage detecting unit 968, a current detecting unit 967, a first current threshold setting unit 964, a second current threshold setting unit 965 and a storage unit 963. The electromotor 920 is controlled by the controller 961 and the electronic switch S1.

The user operates the first current threshold setting unit 964 to artificially set the first current threshold I1

The second current threshold setting unit 965 sets a second current threshold I2 lower than the first current threshold I1. In the present embodiment, a plurality of predetermined constants are stored in the storage unit 963, all predetermined constants corresponding to different first current thresholds, the second current threshold setting unit 965 is a single subtractor, and the second current threshold setting unit 65 subtracts the predetermined constant from the first current threshold I1 to obtain the second current threshold I2. The second current threshold I2 can be also be obtained by calculating in a software manner, that is, the controller 961 also has a function of the second current threshold setting unit 965, and calculates to obtain the second current threshold I2. In other embodiments, the user can directly operate the second current threshold unit 65 to manually set the second current threshold I2.

The storage unit 963 stores the first current threshold I1 and the second current threshold I2.

The electromotor switch S2 is a trigger, and the user presses down the trigger of the handheld electric tool 400' to start the electromotor 920.

The current detecting unit 967 detects electromotor current. The controller 61 compares the detected current with the second current threshold I2, when the electromotor current reaches the second current threshold I2, the controller 961 controls the rotary speed of the electromotor 920 to be kept at a rotary speed predetermined value N1. The rotary speed predetermined value N1 is lower than the electromotor rotary speed during a general working state, so that the electromotor can fast make a response in subsequent control.

Figure 43:
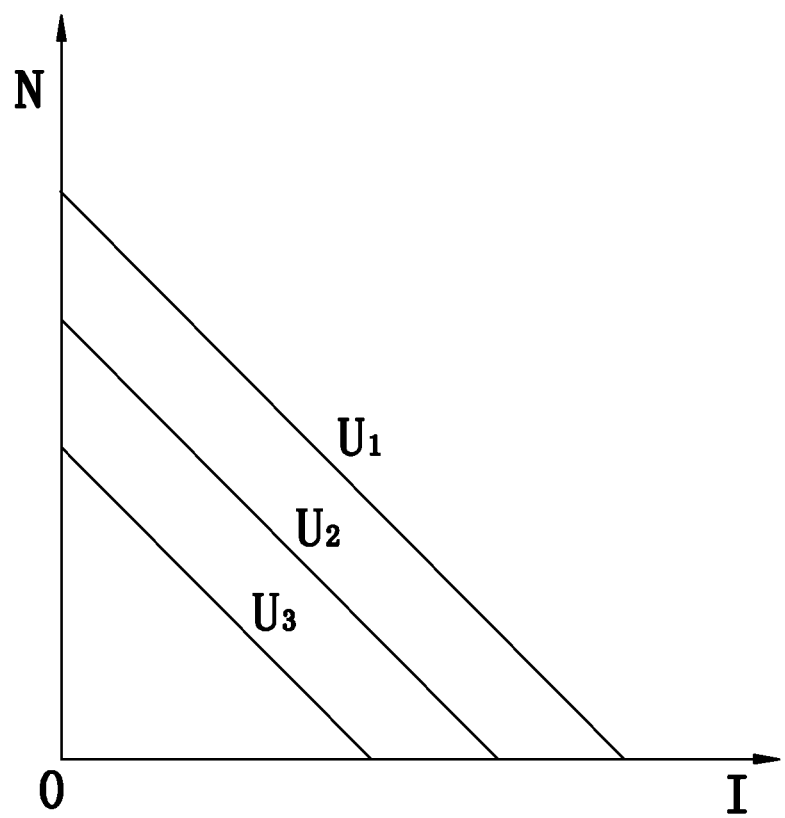
FIG. 43 is a diagram of a relation curve among an electromotor current, an electromotor voltage and an electromotor rotary speed of the handheld power tool as shown in FIG. 40.

Referring to FIG. 43, since the electromotor rotary speed N is related to the electromotor voltage and the electromotor current I, when the load is increased, the electromotor current I is also correspondingly increased, if the electromotor rotary speed N needs to be kept, then the corresponding electromotor voltage needs to be increased. Therefore, a voltage value required for keeping the rotary speed predetermined value N1 can be calculated according to the determined electromotor current I, and then the actual voltage of the electromotor 920 is adjusted to be the calculated voltage value to keep the electromotor rotary speed to be the rotary speed predetermined value N1.

In the present embodiment, the rotary speed predetermined value N1 is stored in the storage unit 963, the current detecting unit 967 detects the electromotor current, and the controller 961 calculates the voltage value required for keeping the rotary speed predetermined value N1 according to the rotary speed predetermined value N1 and the detected electromotor current. The controller 961 takes the calculated voltage value as a reference voltage. The voltage detecting unit 968 detects an actual voltage of the electromotor 920 in real time, the controller 961 adjusts the first drive signal output by the controller 961 according to the difference between the detected actual voltage and the reference voltage, so as to keep the electromotor rotary speed.

In the present embodiment, the first drive signal is a pulse width modulation signal, if the actual voltage of the electromotor 920 exceeds the reference voltage, the controller 961 reduces a duty cycle of the first drive signal; and if the actual voltage of the electromotor 920 is smaller than the reference voltage, the controller 961 increases the duty cycle of the first drive signal.

While the electromotor rotary speed is kept, the controller 961 continues to detect the electromotor current by the current detecting unit 967 and compares the detected electromotor current with the first current threshold I1, and when the electromotor current reaches the first current threshold I1, the controller 961 stops outputting the first drive signal to control the electromotor 920 to be shutdown.

Figure 45:
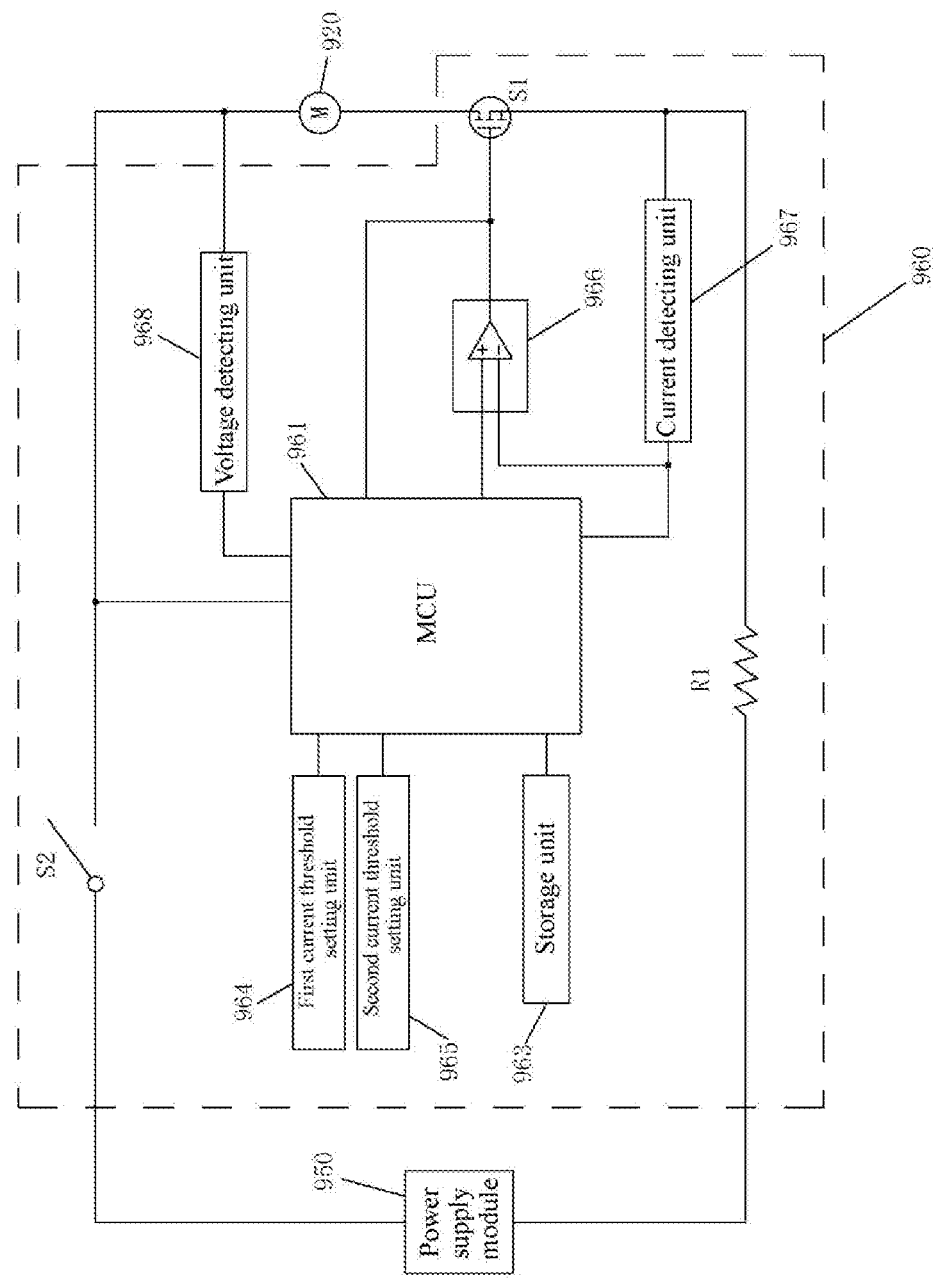
FIG. 45 is a circuit schematic diagram of a second preferred embodiment of an artificial mode of the handheld power tool as shown in FIG. 40.
Figure 46:
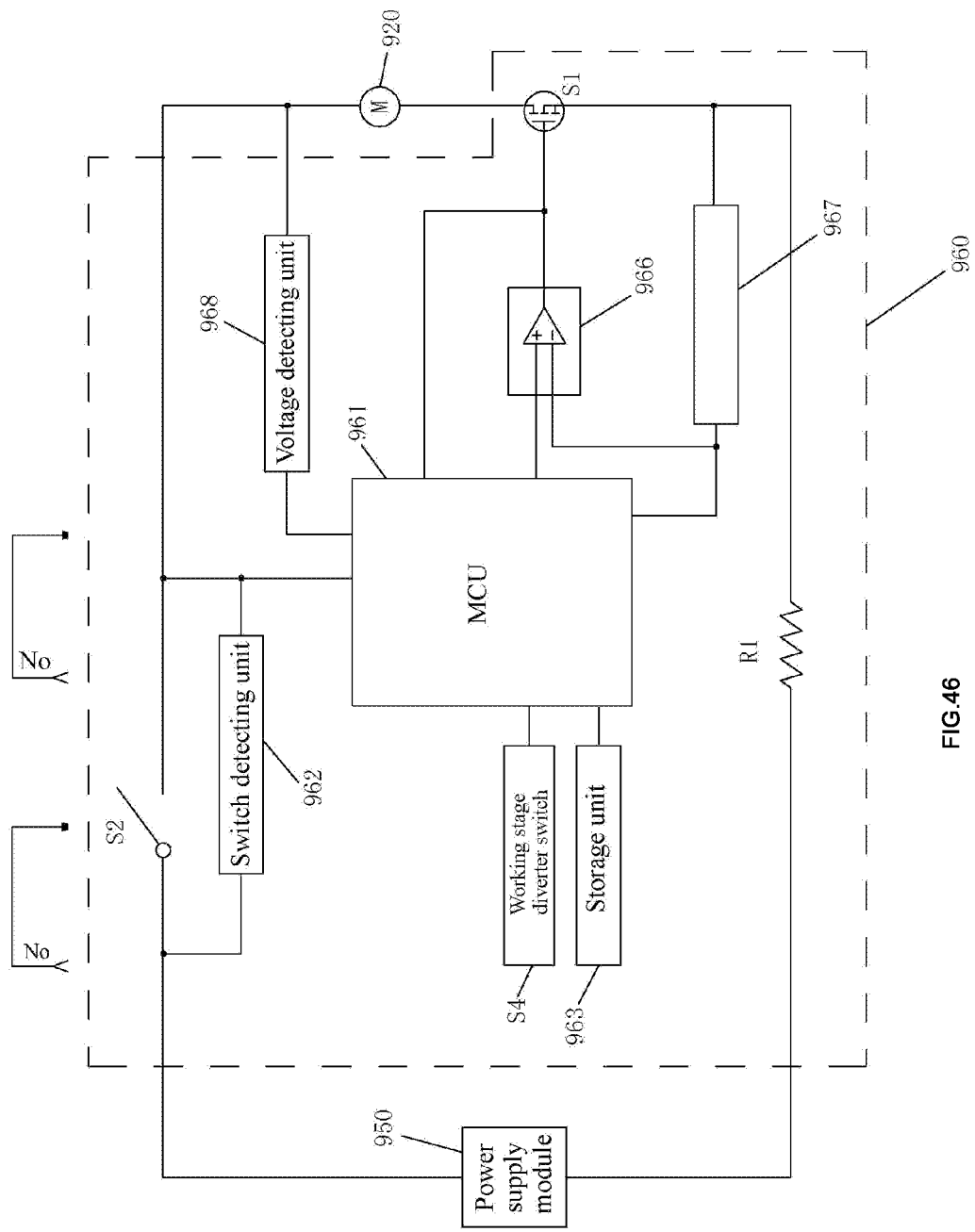
FIG. 46 is a circuit schematic diagram of an automatic mode of the handheld power tool as shown in FIG. 40.

Referring to FIG. 45, in a second preferred embodiment of the artificial mode of the handheld electric tool 400' of the present invention, the control circuit 60 has a controller 961, an electronic switch S1, an electromotor switch S2, a resistor R1, a voltage detecting unit 968, a current detecting unit 967, a current limiting unit 966, a first current threshold setting unit 964, a second current threshold setting unit 965 and a storage unit 963.

The second current threshold setting unit 965 sets a second current threshold I2 lower than a first current threshold I1. In the present embodiment, a plurality of predetermined constants are stored in the storage unit 963, all predetermined constants corresponding to different first current thresholds, the second current threshold setting unit 965 is a single subtractor, and the second current threshold setting unit 965 subtracts the predetermined constant from the first current threshold I1 to obtain the second current threshold I2. The second current threshold I2 can be also be obtained by calculating in a software manner, that is, the controller 61 also has a function of the second current threshold setting unit 965, and calculates to obtain the second current threshold I2. In other embodiments, the user can directly operate the second current threshold unit 65 to manually set the second current threshold I2.

The storage unit 963 stores the first current threshold I1 and the second current threshold I2.

The electromotor switch S2 is a trigger, and the user presses down the trigger of the handheld electric tool 400' to start the electromotor 920.

The current detecting unit 967 detects electromotor current. The current limiting unit 966 compares the electromotor current with the second current threshold I2, when the electromotor current reaches the second current threshold I2, the current limiting unit 966 controls the electromotor current to be kept at the second current threshold I2, and at this point, the rotary speed of the electromotor 920 is reduced accordingly.

Specifically, the current limiting unit 966 has a comparator, which outputs an ON signal when the detected electromotor current is smaller than the second current threshold I2, and outputs an OFF signal when the detected electromotor current is larger than or equal to the second current threshold I2. The ON/OFF signal is fed back into the first drive signal output by the controller 961 to obtain a second drive signal such that the electromotor current is kept at the second current threshold I2.

While the electromotor current is kept, the controller 961 judges the rotary speed of the electromotor 920 and controls the rotary speed of the electromotor 920 to be kept at a rotary speed predetermined value N1 when the electromotor rotary speed is reduced to a predetermined value N1. The rotary speed predetermined value N1 is lower than the electromotor rotary speed during a general working state, such that the electromotor can fast make a respond in the subsequent control.

Referring to FIG. 43 again, when the electromotor current is constant, the smaller the electromotor voltage is, the lower the electromotor rotary speed is, and the controller 961 detects an actual voltage of the electromotor 920 by the voltage detecting unit 968 so as to judge the electromotor rotary speed.

The rotary speed predetermined value N1 is stored in the storage unit 963, the controller the electromotor voltage when the electromotor rotary speed is N1 and the electromotor current is I2, the voltage detecting unit 968 detects the actual voltage of the electromotor 920, and when the actual voltage of the electromotor 920 is reduced to the electromotor voltage value calculated by the controller 961, the controller 961 controls the rotary speed of the electromotor 920 to be kept at the rotary speed predetermined value N1.

The controller 961 calculates the voltage value for keeping the rotary speed predetermined value N1 according to the rotary speed predetermined value N1 and the detected electromotor current, and takes the voltage value required for keeping the rotary speed predetermined value N1 as reference voltage. The controller 961 detects the actual voltage of the electromotor 920 by the voltage detecting unit 968, and adjusts the first drive signal output by the controller 961 according to the difference between the detected actual voltage and the reference voltage, so as to keep the electromotor rotary speed.

While the electromotor rotary speed is kept, the controller 961 continues to detect the electromotor current by the current detecting unit 967, and compares the detected electromotor current with the first current threshold I1, and when the detected electromotor current reaches the first current threshold I1, the controller 961 stops output of the first drive signal to control the electromotor 920 to be shutdown.

In the automatic mode of the handheld electric tool 40' of the present invention, the control circuit 960 has a controller 961, an electronic switch S1, an electromotor switch S2, a resistor R1, a working stage diverter switch S4, a voltage detecting unit 968, a current detecting unit 967, a storage unit 963, a current limiting unit 966 and a switch detecting unit 962. The electromotor 920 is controlled by the controller 961 and the electronic switch S1.

The working stage diverter switch S4 is operated to switch the handheld electric tool 400' to the first working stage, at this point, the user with rich experience operates the handheld electric tool 400', and the controller 961 controls the rotary speed of the electromotor 920 to be kept at the rotary speed predetermined value N1.

Specifically, the rotary speed predetermined value N1 is stored in the storage unit 963, the current detecting unit 967 detects the electromotor current, the controller 961 calculates the voltage value required for keeping the rotary speed predetermined value N1 according to the rotary speed predetermined value N1 and the detected electromotor current and takes the voltage for keeping the rotary speed predetermined value N1 as the reference voltage. The controller 961 detects the actual voltage of the electromotor 920 by the voltage detecting unit 968, and adjusts the first drive signal output by the controller 961 according to the difference between the detected actual voltage and the reference voltage, so as to keep the electromotor rotary speed.

While the electromotor rotary speed is kept, a user disconnects the electromotor switch S2 to control the electromotor 920 to be shutdown according to working conditions, such as an expected depth of the workpiece, a position and the like. The switch detecting unit 962 detects the state of the electromotor switch S2 and sends a corresponding signal to the controller 961.

When the switch detecting unit 962 detects that the electromotor switch S2 is closed, the controller 961 records the electromotor current Ia at this point by the current detecting unit 967, and automatically sets a current threshold Ib according to the electromotor current Ia during shutdown, and the current threshold Ib corresponds to a corresponding target torque.

Specifically, the controller 961 calculates the torque T1 when the electromotor current is Ia and the electromotor rotary speed is the rotary speed predetermined value N1 according to a relation among the electromotor current, the torque T and the electromotor rotary speed N in FIG. 41, then calculates the electromotor current when the torque is T1 and the electromotor rotary speed is 0 and determines the electromotor current as the current threshold Ib.

In the second working stage of the automatic mode, the current detecting unit 967 detects the electromotor current. The current limiting unit 966 compares the detected electromotor current with the current threshold Ib, when the detected electromotor current reaches the current threshold Ib, the current limiting unit 966 controls the electromotor current to be kept at the current threshold Ib, so as to control the electromotor current to be not larger than the current threshold Ib, and at this point the electromotor rotary speed is reduced.

Specifically, the current limiting unit 966 has a comparator, which outputs an ON signal when the detected electromotor current is smaller than the current threshold Ib, and outputs an OFF signal when the detected electromotor current is larger than or equal to than the current threshold Ib, and feeds the ON/OFF signal back into the first drive signal to obtain a second drive signal, so as to keep the electromotor current value to be the current threshold Ib.

While the electromotor current is kept, the controller 961 judges the rotary speed of the electromotor 20 and when the electromotor rotary speed is reduced to a fixed value, the controller 961 controls the electromotor 920 to be shutdown. Since when the electromotor current is constant, the smaller the electromotor current is, the lower the electromotor rotary speed is, therefore the electromotor rotary speed can be judged by detecting the electromotor voltage.

In the present embodiment, the controller 961 detects a duty cycle of the second drive signal, when the duty cycle of the second drive signal is lower than 0.1, it is indicated that the electromotor voltage is lower than a predetermined value, and further indicated that the electromotor rotary speed is lower than the fixed value, at this point, the controller 961 stops output of the first drive signal, so as to control the electromotor 920 to be shutdown.

The present invention further provides two control methods for a handheld electric tool 400': an artificial mode and an automatic mode.

Figure 47:
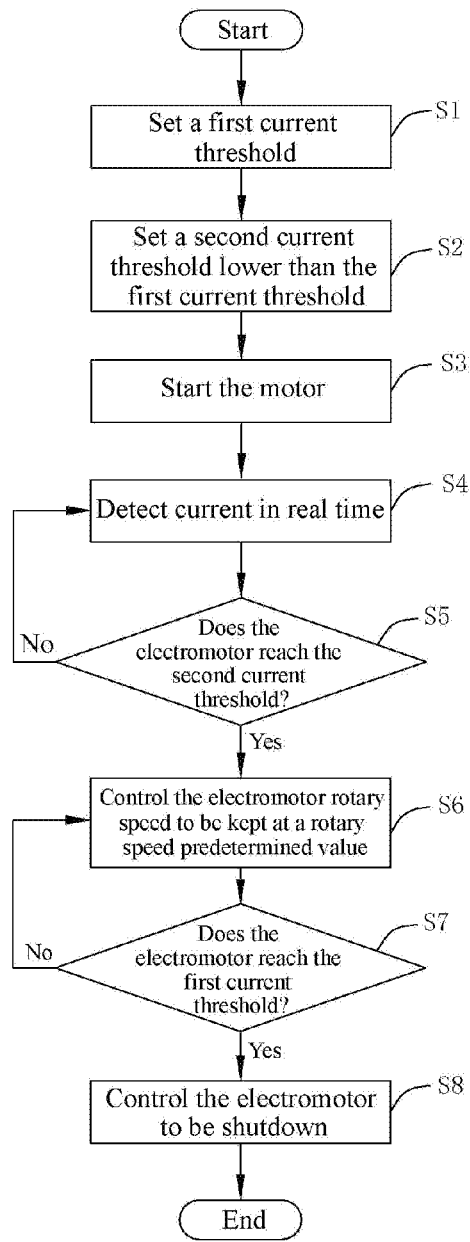
FIG. 47 is a flowchart of a first preferred embodiment of an artificial mode of a control method of the handheld power tool as shown in FIG. 40.

Referring to FIG. 47, a first preferred embodiment of the artificial mode comprises the following steps:

Step S1: artificially setting a first current threshold I1, wherein a user can set the current threshold corresponding to a target torque by operating the first current threshold setting unit 964 on the handheld electric tool 400'.

Step S2: artificially setting or automatically calculating a second current threshold I2, wherein the second current threshold I2 is smaller than the first current threshold I1, and the first current threshold I1 equals to the sum of the second current threshold I2 and a predetermined constant. In the present embodiment, the second current threshold I2 is calculated by the controller 961 in the handheld electric tool 400'.

Step S3: pressing down, by the user, a trigger of the handheld electric tool 400' to start the electromotor 920.

Step S4: detecting the electromotor current in real time.

Step S5: judging whether the electromotor current reaches the second current threshold I2, entering step S6 if yes, otherwise returning back to step S4.

Step S6: when the electromotor current reaches the second current threshold I2, controlling the rotary speed of the electromotor 920 to be kept at the rotary speed predetermined value N1 which is lower than the electromotor rotary speed during a general working state.

Step S7: judging whether the electromotor current reaches the first current threshold I1, entering step S8 if yes, otherwise returning back to the step S6.

Step S8: controlling the electromotor 920 to be shutdown when the electromotor current reaches the first current threshold I1.

Figure 48:
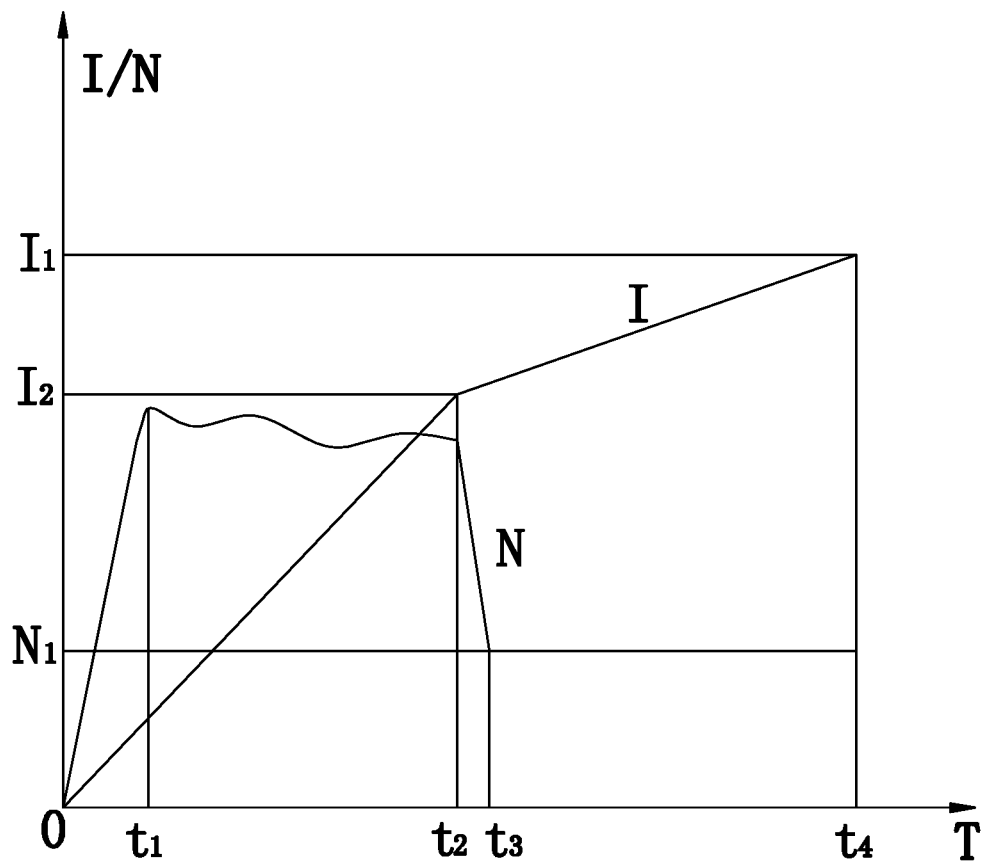
FIG. 48 is a curve schematic diagram of a first preferred embodiment of an artificial mode of a control method of the handheld power tool as shown in FIG. 40.

As shown in FIG. 48, in time t1, at the moment that the electromotor 920 is started, the electromotor rotary speed N is fast risen, and the electromotor current I is stably risen; in time t1-t2, with increase of a load, the electromotor current I is continuously risen; in time t2-t3, the electromotor rotary speed N is controlled to be fast reduced to the rotary speed predetermined value N1; in time t3-t4, the electromotor rotary speed N is kept at the rotary speed predetermined value N1, meanwhile, the electromotor current I is continuously risen; in time t4, the electromotor current I reaches the first current threshold I1, and the electromotor 920 is controlled to be shutdown. In the present embodiment, when the electromotor current I reaches the first current threshold I1, the controller 961 stops output of the first drive signal so as to control the electromotor 920 to be shutdown.

Referring to FIG. 43, since the electromotor rotary speed N is related to the electromotor voltage and electromotor current I, and when the load is increased, the electromotor current I is increased accordingly, if the electromotor rotary speed N needs to be kept, then the corresponding electromotor voltage needs to be increased. Therefore, the voltage value required for keeping the rotary speed predetermined value N1 can be calculated according to the detected electromotor current I, and then the electromotor voltage is regulated to keep the electromotor rotary speed N at the rotary speed predetermined value N1.

In the present embodiment, the rotary speed predetermined value N1 is stored in the storage unit 963, the current detecting unit 967 detects the electromotor current, and the controller 961 calculated the voltage value required for keeping the rotary speed predetermined value N1 according to the rotary speed predetermined value N1 and the detected electromotor current. The controller 961 takes the voltage required for keeping the rotary speed predetermined value N1 as reference voltage. The controller 961 detects the actual voltage of the electromotor 920 in real time by the voltage detecting unit 968, and adjusts the first drive signal output by the controller 961 according to the difference between the detected actual voltage and the reference voltage so as to keep the electromotor rotary speed.

Figure 49:
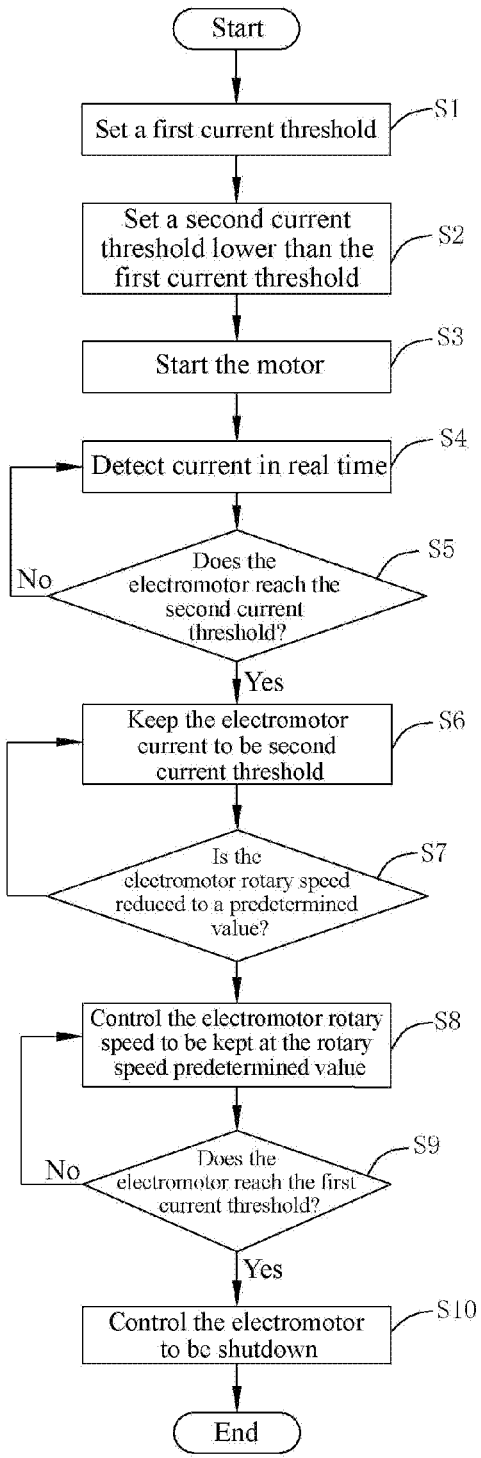
FIG. 49 is a flowchart of a second preferred embodiment of an artificial mode of a control method of the handheld power tool as shown in FIG. 40.

Referring to FIG. 49, in the second preferred embodiment of the artificial mode, the second current threshold I2 is taken as a reference threshold at first, the current threshold is kept for certain time, and then the electromotor rotary speed is kept to fasten a workpiece. Sudden change of the electromotor current is prevented before the workpiece is fastened, and the electromotor 920 is effectively protected. Specifically, the second preferred embodiment of the artificial mode comprises the following steps:

Step S1: artificially setting a first current threshold I1.

Step S2: artificially setting or automatically calculating a second current threshold I2, wherein the second current threshold I2 is smaller than the first current threshold I1, and the first current threshold I1 equals to the sum of the second current threshold I2 and a predetermined constant.

Step S3: pressing down, by the user, a trigger of the handheld electric tool 400' to start the electromotor 920.

Step S4: detecting the electromotor current in real time.

Step S5: judging whether the electromotor current reaches the second current threshold I2, entering step S6 if yes, otherwise returning back to step S4.

Step S6: when the electromotor current reaches the second current threshold I2, keeping the electromotor current as the second current threshold I2.

Step S7: judging whether the electromotor rotary speed is reduced to the rotary speed predetermined value N1, entering step S8 if yes, otherwise, returning back to step S6. The rotary speed predetermined value N1 is lower than the electromotor rotary speed during a general working state.

Step S8: keeping the rotary speed of the electromotor 920 at the rotary speed predetermined value N1.

Step S9: judging whether the electromotor current reaches the first current threshold I1, entering step S10 if yes, otherwise, returning back to step S8.

S10: controlling the electromotor 920 to be shutdown when the electromotor current reaches the first current threshold I1.

Figure 50:
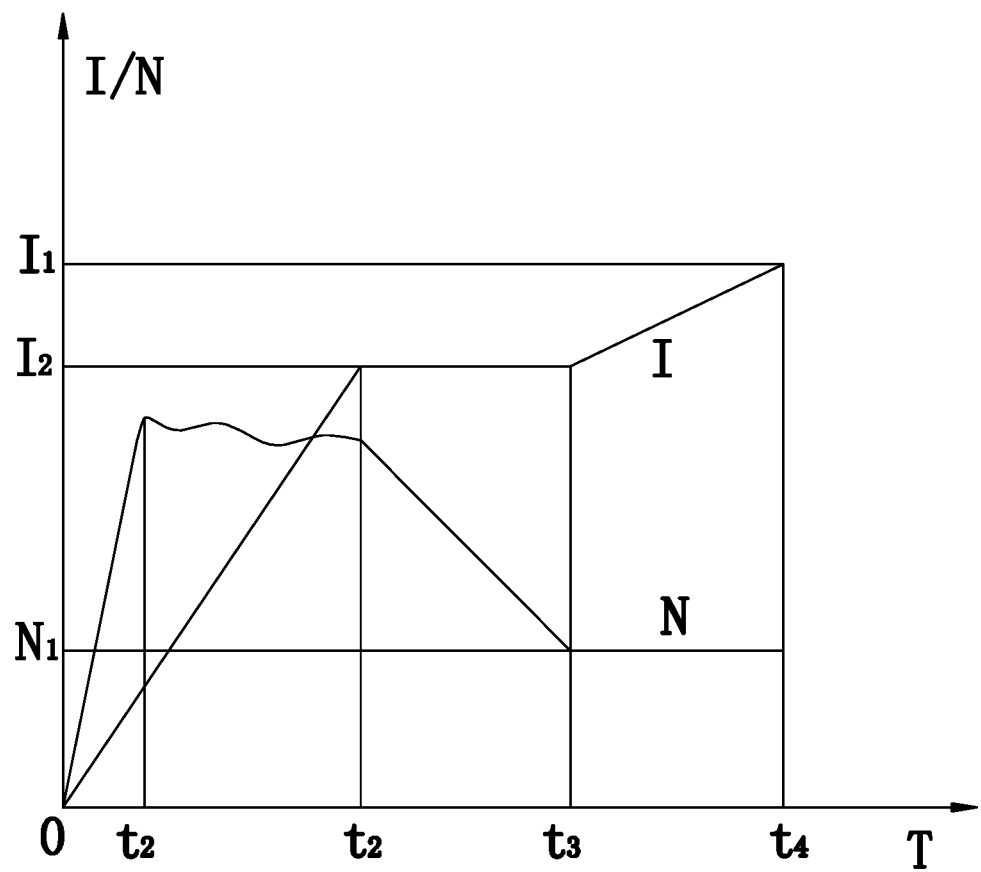
FIG. 50 is a curve schematic diagram of a second preferred embodiment of an artificial mode of a control method of the handheld power tool as shown in FIG. 40.

As shown in FIG. 50, in time t1, at the moment that the electromotor 920 is started, the electromotor rotary speed N is fast risen, and the electromotor current I is stably risen; in time t1-t2, with increase of a load, the electromotor current I is continuously risen; in time t2-t3, the electromotor current reaches the second current threshold I2, the electromotor current is kept at the second current threshold I2, meanwhile the electromotor rotary speed is reduced; in time t3-t4, the electromotor rotary speed N is kept at the rotary speed predetermined value N1, meanwhile, the electromotor current I is continuously risen; in time t4, the electromotor current I reaches the first current threshold I1, and the electromotor 920 is controlled to be shutdown.

Under the artificial mode, when the electromotor current reaches the second current threshold I2, the electromotor rotary speed N is controlled to be constant, when the electromotor current reaches the first current threshold I1, the electromotor 920 is controlled to be shutdown, so as to limit the electromotor current I, and further the output torque T of the electromotor 920 is limited such that the precision of the torque adjustment is greatly improved.

The automatic mode has a first working stage and a second working stage, during the first working stage, the handheld electric tool 400' automatically sets a parameter threshold, and during the second working stage, the handheld electric tool 400' performs torque limitation according to the set parameter threshold.

Figure 51:
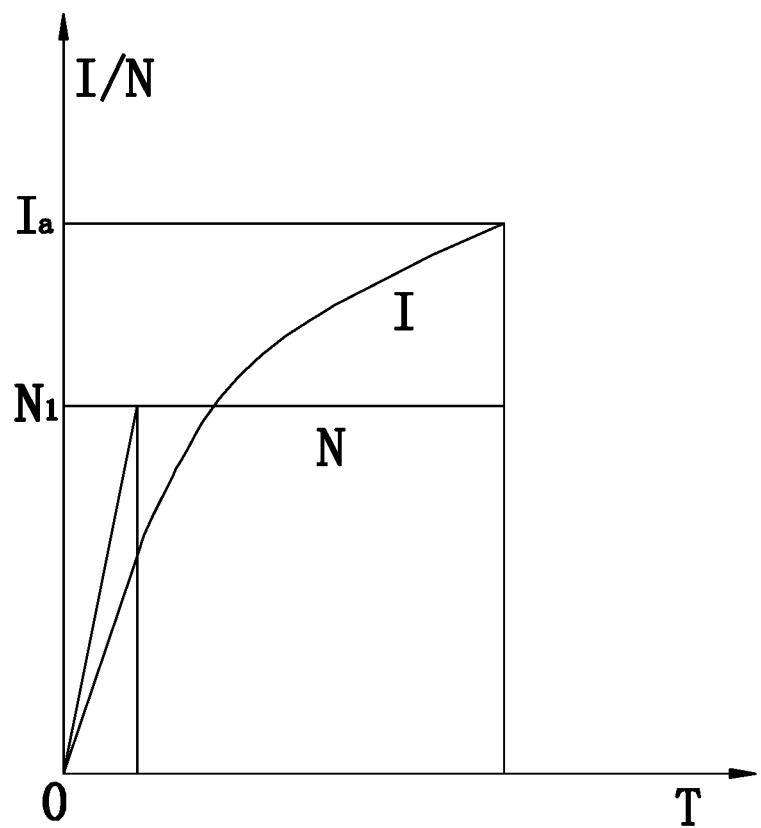
FIG. 51 is a curve schematic diagram of a first working stage of an automatic mode of the handheld power tool as shown in FIG. 40.

Referring to FIG. 51, in the first working stage, the user with rich experience operates the handheld electric tool 400', the user disconnects the electromotor switch S2 to control the electromotor 920 to be shutdown according to working conditions, such as an expected depth of the workpiece, a position and the like, at least one electromotor parameter during shutdown is automatically detected, the parameter threshold is automatically set according to the electromotor parameter, and the parameter threshold corresponds to a corresponding target torque.

In the second working stage, the electromotor 920 is restarted, the user with less experience operates the handheld electric tool 400', detects a corresponding electromotor parameter in real time and compares the detected electromotor parameter with the parameter threshold, when the electromotor parameter reaches the parameter threshold, the electromotor parameter is controlled to be not larger than the parameter threshold, such that the torque is not larger than the target torque and the workpiece reaches a depth consistent with that during the first working stage, and it is convenient for user with less experience to operate.

In the present embodiment, the electromotor parameter is electromotor current, the electromotor current Ia during shutdown is recorded in the first working stage, and the current threshold Ib is set according to the electromotor current Ia. Referring to FIG. 42 again, when the electromotor rotary speed N is fixed value, the larger the electromotor current is, the larger the torque I is, therefore, in the first working stage, the electromotor rotary speed is kept, such that the parameter threshold set according to the electromotor current during shutdown is more precise. In order to facilitate design, in the present embodiment, the electromotor rotary speed in the first working stage is kept at the rotary speed predetermined value N1.

In the present embodiment, the electromotor voltage is kept at the rotary speed predetermined value N1 by adjusting the electromotor voltage, and the specific method is same as the step S6 in the first preferred embodiment of the artificial mode.

According to a data relation among the electromotor current, the torque T and the electromotor rotary speed N in FIG. 42, the controller 961 calculates the torque T1 when the electromotor current is Ia and the electromotor rotary speed is the rotary speed predetermined value N1, then calculates the electromotor current when the torque is T1 and the electromotor rotary speed is 0, and determines the electromotor current as the current threshold Ib.

In the second working stage, when the electromotor current reaches the current threshold Ib, the current value of the electromotor 920 is kept to be the current threshold Ib, so that the electromotor current is controlled to be not larger than the current threshold Ib.

Figure 52:
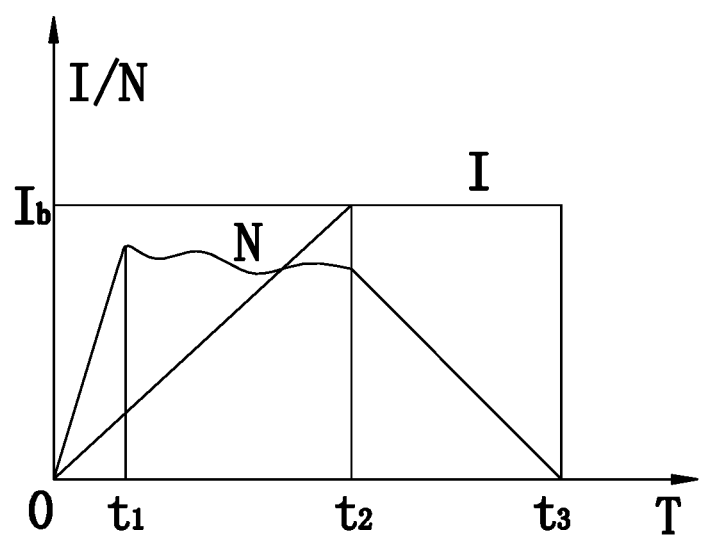
FIG. 52 is a curve schematic diagram of a second working stage of an automatic mode of the handheld power tool as shown in FIG. 40.

As shown in FIG. 52, in time t1, at the moment that the electromotor 920 is started, the electromotor rotary speed is fast risen, and the electromotor current is stably risen; in time t1-t2, with increase of a load, the electromotor current is continuously risen; in time t2-t3, the electromotor rotary speed is controlled to be kept at the current threshold Ib when the electromotor current reaches the current threshold Ib, meanwhile the electromotor rotary speed is reduced. In time t3, when the electromotor rotary speed is reduced to fixed value (for example, the rotary speed is zero), the electromotor 920 is controlled to be shutdown.

In other embodiments, other manners for torque limiting can be adopted in the second working stage, as shown in FIG. 48, at this point, the first current threshold I1 is the current threshold Ib automatically set in the first working stage.

The handheld electric tool 400' of the present embodiment has an artificial mode and an automatic mode. Under the artificial mode, first and second current threads are artificially set, when the electromotor current reaches the second current threshold, the electromotor rotary speed is kept, when the electromotor current reaches the second current threshold, the electromotor 920 is controlled to be shutdown, so as to improve the precision of torque adjustment. During the first working stage of the automatic mode, the user with rich experience controls the electromotor 920 to be shutdown according to working conditions and sets a parameter threshold according to the electromotor parameter during shutdown, when the electromotor parameter reaches the parameter threshold, the electromotor parameter is controlled to be not larger than the parameter threshold, such that the workpieces reach a consistent depth, and it is convenient for the user with less experience to operate the handheld electric tool 400'.

Figure 53:
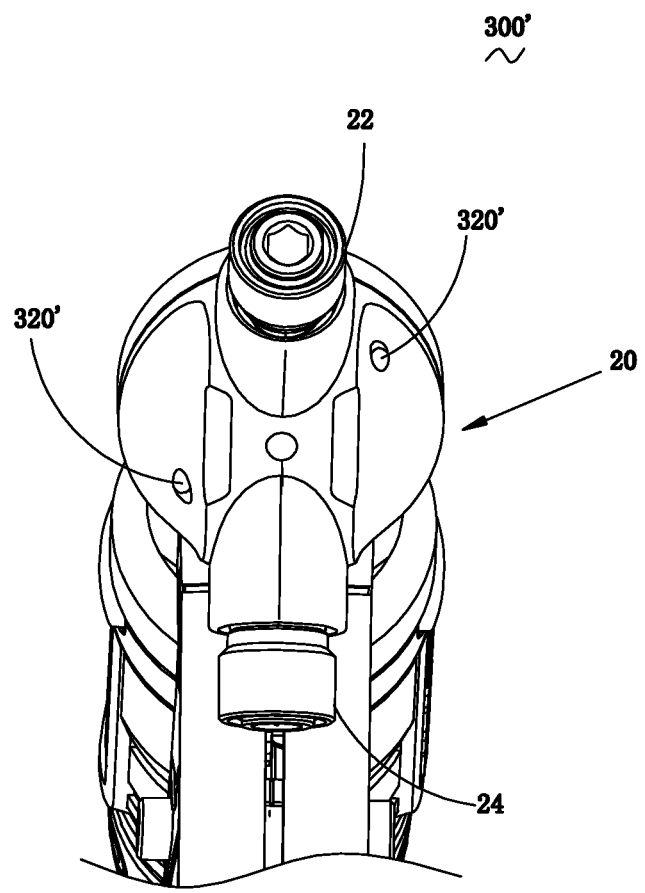
FIG. 53 is a local schematic diagram of a handheld power tool of a sixth embodiment of the present invention.
Figure 54:
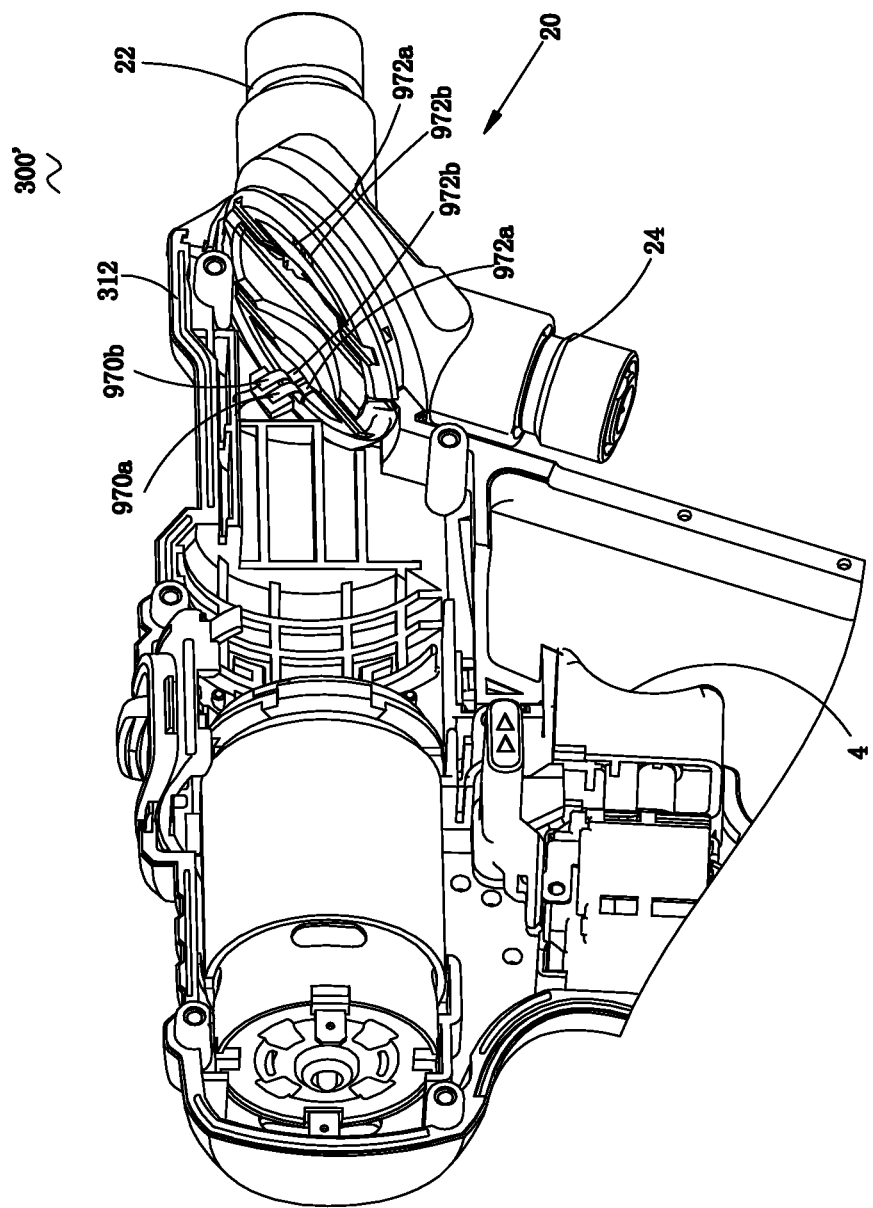
FIG. 54 is an internal structural schematic diagram after part of housing is moved in a main view direction of the handheld power tool of FIG. 53.

Referring to FIGS. 53 and 54, the present embodiment is a transformation of the third embodiment, in order to facilitate expression, the same structures are not repeated. Working lamps 320' are fixedly disposed relative to the working component 20, and the number of the working lamps 320' is consistent with that of the working chucks. The two working lamps 320' in the present embodiment correspond to the working chucks 22 and 24 respectively, and each working lamp 320' is located on the same side of the working chucks 22 and 24. When one of the working chucks 22 and 24 is converted to the working position, the working lamp 320' close to the working chucks 22 and 24 provides illumination for the working chucks 22 and 24 in the current working position, that is, illuminates a machining region in front of the handheld power tool 300'. The working lamps 320' preferably adopt an LED lamp which is energy-saving and good in illumination effect, of course, those skilled in the art can adopt other similar illumination devices for replacement, which is not limited by the present embodiment. The working lamps 320' are controlled by the switch 4 and are supplied with power by a battery pack (not shown); and of course, the working lamps 320' can also be independently controlled by other manners, and can be selectively opened according to working conditions.

Referring to FIG. 54, an anode contact 970a and a cathode contact 970b are disposed in the main body 312, and a pair of chuck anode contact 972a and a chuck cathode contact 972b used to make contact with the anode contact 970a are respectively disposed in the working component 20 by corresponding to the working chucks 22 and 24. When one of the working chucks 22 and 24 is converted to the working position, the corresponding chuck anode contact 972a is electrically connected to the anode contact 970a, the corresponding chuck cathode contact 972b is electrically connected to the cathode contact 970b, such that the working lamp 320' at one side of the working chuck works. While for the other working chuck in the nonworking position, the chuck anode contact 972a and the chuck cathode contact 972b corresponding thereto and the anode contact 970a and the cathode contact 970b are respectively staggered in position and thus cannot be electrically connected, therefore, the working lamp 320' corresponding to the working chuck does not work. Because of this disposing manner, it is favorable for the working lamps 320' to work alternatively, and greater energy saving effect is achieved; meanwhile, the aim that the working chuck in the working position and the working lamp 320' work at the same time is ensured.

Figure 24:
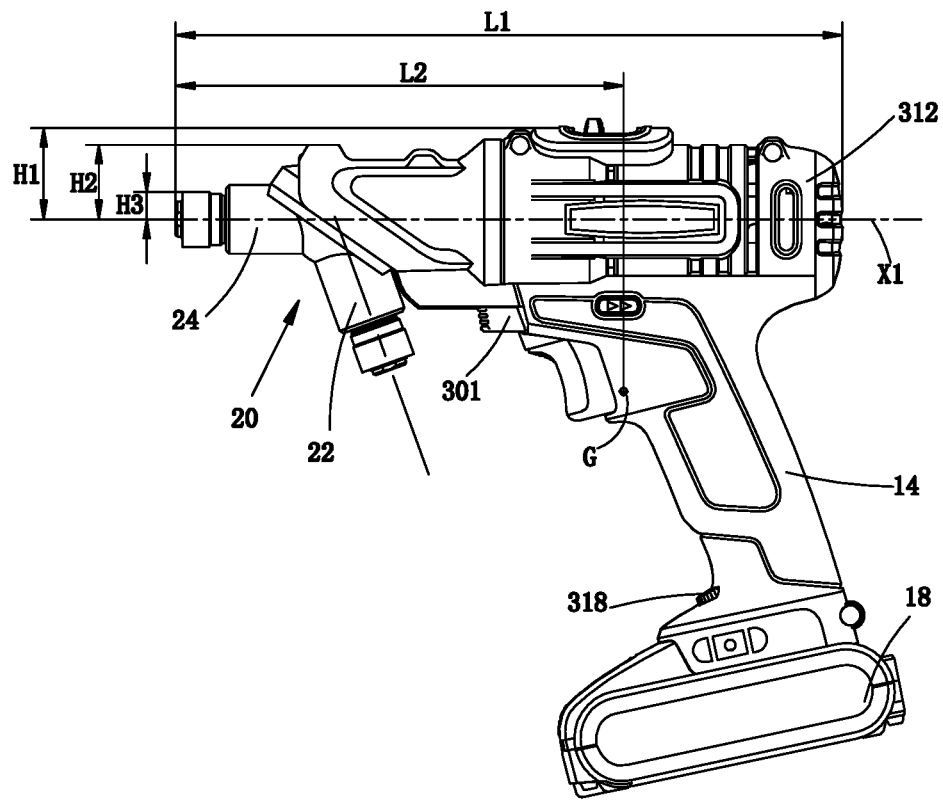
FIG. 24 is a main view that a work head is removed from the handheld power tool as shown in FIG. 23.
Figure 55:
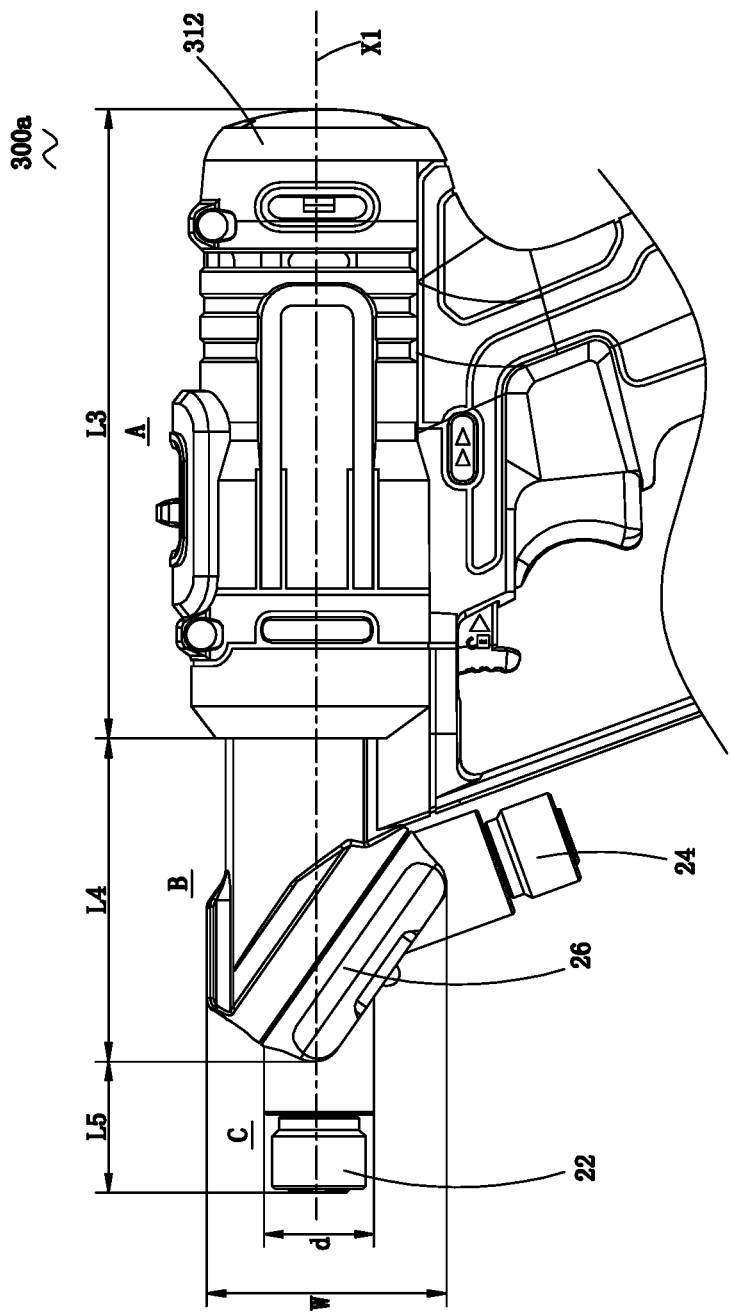
FIG. 55 is a local schematic diagram of a main view direction of a handheld power tool of a seventh embodiment of the present invention.

Referring to FIG. 55, in combination with FIGS. 24 and 27, the present embodiment is further detailed based on the handheld power tool in the third embodiment. In order to facilitate expression, the same structures are not repeated. The main body 312 comprises three parts along the longitudinal axis X1 of the main body. The first part contains the motor 8 and the speed reduction box 32 and is called as A zone; the second part contains the output shaft 316 and at least part of the control mechanism 330 and called as B zone; the third part contains the working shafts, that is, the parts of the working chucks extending on the mounting plate 26, and called as C zone. A length of the A zone along the longitudinal axis X1 of the main body is L3, the length of the B zone is L4, and the length of the C zone is L5. Two steps are formed in the length direction of the A zone, B zone and C zone along the longitudinal axis X1, and are formed by height differences among the H1, H2 and H3 as shown in FIG. 27. The heights of the A zone, B zone and C zone are disposed in such manner so that the A zone is the highest, the B zone has the second height and the height of the C zone is equal to the height of a common electric drill; that is to say, the working chuck in the current working position can extend into the narrow working region for working; while the B zone is lower than the A zone, such that the handheld power tool has better accessibility.

The B zone of the present embodiment is actually a function conversion zone of the working chucks 22 and 24, the control mechanism 330 of the handheld power tool 300a is basically in the B zone and comprises a control part 301, a locking part 303 driven by the control part 301, a connector 305 and a clutch cover 307, these functional parts axially extend along the output shaft 316, projections on the axial direction of the output shaft and the output shaft 316 are partially overlapped, such that the length of the B zone is smaller, the size of the whole machine is smaller, and the structure is more compact. A length range of the B zone is 50-70 cm and preferably 61 cm; while a preferable length L1 of the A zone is 125 cm, wherein a length ratio of the B zone to the A zone is between 2:5 to 3:5. A length range of the C zone is 0-34 cm, and preferably 27 cm, and a length ratio of the C zone to the B zone is smaller than 3:5. A total length L1 of the main body 312 is between 175 cm to 229 cm, and preferably 213 cm. The B zone and C zone are disposed in such manner that a length proportion of the three parts of the main body is coordinated, it is favorable for the gravity center of the whole machine to backwards move to approach to the holding part of the handle, such that a twisting force of the operator's wrist is smaller, the operation is comfortable and stable and good in balance and requirements of humanized operation are met.

Referring to FIG. 55, the height of the C zone, that is, the outer diameter d of the working chuck is between 0-26 cm, and the largest height of the B zone, i.e., a height W of the mounting plate is approximately 48 cm; and a height ratio of the B zone to C zone is smaller than 1:2.

Figure 56:
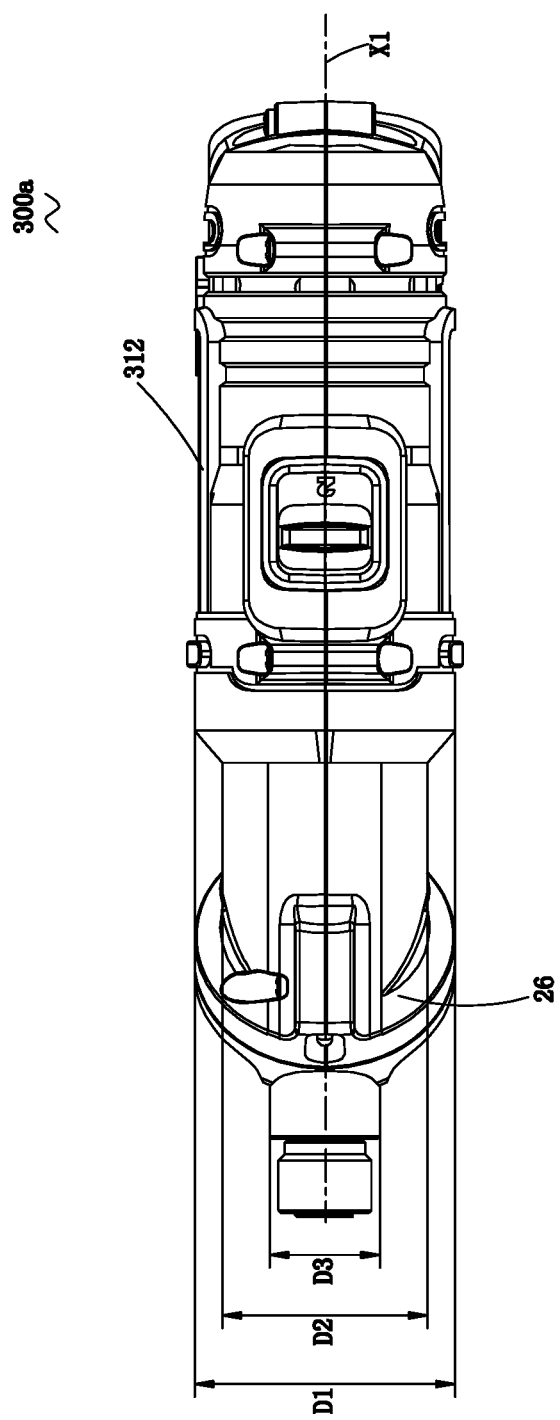
FIG. 56 is a local schematic diagram of a top view direction of the handheld power tool in FIG. 55.

Further referring to FIG. 56, a width D2 of the B zone is not larger than a width D1 of the main body 312, the largest width of the B zone in the present embodiment, i.e., the width of the mounting plate 26 is basically same as the width D1 of the A zone, and the largest width of the B zone is preferably 51 cm; in addition, a smallest width D2 of the B zone is 30 cm to 40 cm, and preferably 40 m. A width D3 of the C zone, i.e., the diameters of the working chucks 22 and 23 are respectively smaller than D2 and D3. A length width ratio L1/D1 of the main body 312 is between 3 to 4.5, and preferably 4. By such setting manner, the whole machine body is good in coordination, and light and easy to operate, and during package, the size in the width direction is saved and used most effectively.

Respective technical features of the embodiments above can be freely combined, in order for precise description, not all possible combinations of the respective technical features in the embodiments mentioned above are described, however, as long as these feature combinations do not have contradiction, they are considered to be in a scope recorded in the present specification.

The embodiments mentioned above merely express some embodiments of the present invention, are described in a manner of relatively specific and more details, but shouldn't be understood as limitation to the scope of the invention patent. It should be pointed out that for those ordinary skilled in the art, under the premise of not departing from a concept of the present invention, a plurality of transformations and improvements can be made, and they all fall within a protective scope of the present invention. Therefore, the protective scope of the present invention patent takes the appended claims as a criterion.

What is claimed is:

1. A handheld power tool, comprising:
a housing;
a motor being disposed in the housing;
an output shaft being driven to rotate by the motor;
a working component comprising at least two working chucks;
a switch for controlling the motor;
wherein each of the at least two working chucks respectively comprise a working shaft, the power tool further comprises a control mechanism for locking and releasing the working component with respect to the housing, the control mechanism comprises a control part adjacent to the switch, and the control part is movable relative to the housing, and the control part moves along a direction away from the working component to release the working component from the housing and to control the output shaft to be disconnected with one of the working shafts,
wherein the control mechanism comprises a locking part in linkage with the control part and the locking part is selectively disengage from and connected with the working component, and
wherein the handheld power tool further comprises a clutch device in linkage with the locking part, one end of the clutch device is movably connected with the output shaft, and the other end of the clutch device is selectively disengaged from and connected with one of the working shafts.

2. The handheld power tool according to claim 1, wherein the working shaft is provided with a hexagonal containing hole for receiving a work head.

3. The handheld power tool according to claim 1, wherein the working shafts each respectively have an axis, and the axes of the working shafts are coplanar.

4. The handheld power tool according to claim 3, wherein an angle is formed between the axes of the working shafts and the angles ranges from 60 degrees to 130 degrees.

5. The handheld power tool according to claim 1, wherein the working component is pivotally disposed relative to the housing, and a pivoting axis of the working component and an axis of the output shaft are coplanar and are at an angle.

6. The handheld power tool according to claim 5, wherein at least two working chucks are fixedly connected and are symmetrically disposed relative to the pivoting axis of the working component.

7. The handheld power tool according to claim 1, wherein the moving direction of the control part is parallel with the axis of the output shaft.

8. The handheld power tool according to claim 1, wherein the control mechanism further comprises an elastic part biasing against the control part, and the elastic part provides an elastic force for the control part to drive the locking part to move close to the working component.

9. The handheld power tool according to claim 1, wherein the control mechanism further comprises a connector to connect the locking part with the clutch device, and a reset spring is disposed between the clutch device and the output shaft.

10. The handheld power tool according to claim 1, wherein the housing comprises a longitudinally extending main body, and a handle holding part connected with the main body, the working component is connected to one end of the main body, the motor is disposed in the main body and away from the working component, the handle holding part and the main body are at an angle, the handheld power tool further comprises a battery pack which is connected to the handle holding part and away from the main body, and the gravity center of the handheld power tool is located within the handle holding part.

11. The handheld power tool according to claim 10, wherein the main body comprises a main body portion for containing a speed reduction box and a front end portion close to the working component, and a distance from the longitudinal axis of the main body to the top end of the front end portion is smaller than that from the longitudinal axis of the main body to the top end of the main body portion.

12. The handheld power tool according to claim 11, wherein when one of the at least two working chucks is in the working position, a distance from the longitudinal axis of the main body to the top of such working chuck is smaller than that from the longitudinal axis of the main body to the top of the front end portion.

13. The handheld power tool according to claim 1, wherein the handheld power tool further comprises an electronic torque control device, which is used to operably adjust an output torque of at least one of the working shafts.

14. The handheld power tool according to claim 1, wherein the handheld power tool further comprises an in-place reminding mechanism which has an engaging state and a disengaging state, wherein when the in-place reminding mechanism is in engaging state, one of the at least two working chucks reaches the working position, and when the in-place reminding mechanism is in disengaging state, the at least two working chucks get away from the working position.

15. The handheld power tool according to claim 14, wherein the in-place reminding mechanism comprises a positioning pin disposed on one of the housing and the working component, a positioning groove disposed on the other one of the housing and the working component, and an elastic part biasing against the positioning pin, and wherein the positioning pin is selectively connected with and disengaged from the positioning groove, such that the in-place reminding mechanism is in the engaging state or disengaging state.

16. The handheld power tool according to claim 1, wherein the working component is movably connected to the housing such that each of the at least two working chucks is convertable between a working position and a non-working position, and wherein while one of the at least two working chucks is in the working position, the working shaft of the one of the at least two working chucks is axially connected with the output shaft, while the rest of the at least two working chucks is in the non-working position, and an angle is formed between the working shaft of the rest working chucks and the output shaft.

17. An operation method of a handheld power tool, wherein the handheld power tool is as mentioned according to claim 1, the operation method comprises the following steps: moving the control part to allow the working component to be moved relative to the housing; rotating the working component to enable the working component to be locked relative to the housing; and releasing the control part to move and reset the control part.

18. The operation method of a handheld power tool according to claim 17, wherein the method further comprises the following step: after the control part is released, triggering the switch to start the drive mechanism, such that one of the working shafts is connected with the output shaft.

* * * * *